United States Patent [19]

Rusterholz et al.

[11] Patent Number: 4,858,115
[45] Date of Patent: Aug. 15, 1989

[54] LOOP CONTROL MECHANISM FOR SCIENTIFIC PROCESSOR

[75] Inventors: John T. Rusterholz, Roseville; James R. Hamstra, Plymouth, both of Minn.

[73] Assignee: Unisys Corporation, Blue Bell, Pa.

[21] Appl. No.: 760,718

[22] Filed: Jul. 31, 1985

[51] Int. Cl.⁴ .................. G06F 15/347; G06F 9/30; G06F 7/50; G06F 9/18
[52] U.S. Cl. ................................. 364/200; 364/900
[58] Field of Search ............... 364/300, 200 MS File, 364/900 MS File, 726, 570, 736, 748

[56] References Cited

U.S. PATENT DOCUMENTS

| | | | |
|---|---|---|---|
| 4,071,744 | 1/1978 | Pollock | 364/570 |
| 4,128,880 | 12/1978 | Cray, Jr. | 364/200 |
| 4,156,920 | 5/1979 | Winograd | 364/726 |
| 4,161,784 | 7/1979 | Cushing et al. | 364/748 |
| 4,308,589 | 12/1981 | Joyce et al. | 364/748 |
| 4,463,422 | 7/1984 | Storer et al. | 364/300 |
| 4,467,409 | 8/1984 | Potash et al. | 364/736 |
| 4,541,046 | 9/1985 | Nagashima et al. | 364/200 |
| 4,566,063 | 1/1986 | Zolnowsky et al. | 364/200 |
| 4,592,005 | 5/1986 | Kregness | 364/736 |
| 4,594,682 | 6/1986 | Drimak | 364/200 |
| 4,649,475 | 3/1987 | Scheuneman | 364/200 |
| 4,651,274 | 3/1987 | Omoda et al. | 364/200 |
| 4,652,993 | 3/1987 | Scheuneman et al. | 364/200 |
| 4,652,997 | 3/1987 | Kloker | 364/200 |
| 4,656,581 | 4/1987 | Ohwada | 364/200 |
| 4,658,354 | 4/1987 | Nukiyama | 364/200 |
| 4,660,143 | 4/1987 | King et al. | 364/200 |
| 4,685,076 | 8/1987 | Yoshida | 364/200 |

FOREIGN PATENT DOCUMENTS 0085435 10/1983 Japan .

Primary Examiner—Gareth D. Shaw
Assistant Examiner—Viet Q. Nguyen
Attorney, Agent, or Firm—Charles A. Johnson

[57] ABSTRACT

A loop control mechanism is described for use in a vector-oriented scientific data processing system. Because of the vector-oriented nature of scientific programs used on digital data processing systems the efficient control of program loops is of major importance. It can be shown that a procedure coded as N nested DO loops in FORTRAN will generally require 2N-1 nested loops of scientific processor object code, given a vector register architecture. Except for the innermost level, it is necessary at each level to iterate by strips up to the vector length and within that vector length strip to iterate by elements. For the innermost loop, iteration by element is not needed, but is implicit in vector operations. The present mechanism accomplishes this loop control optimization by maintaining the parameters for loop control in separate loop control registers. The use of this special facility for these parameters provides for their efficient management. The novelty of this invention centers around having special registers and unique instructions dedicated to the handling of the loop parameters. The use of these special registers and instructions for the controlling of these loops make it possible to efficiently precompute loop-counts, thereby enhancing the speed of the scientific processor.

13 Claims, 35 Drawing Sheets

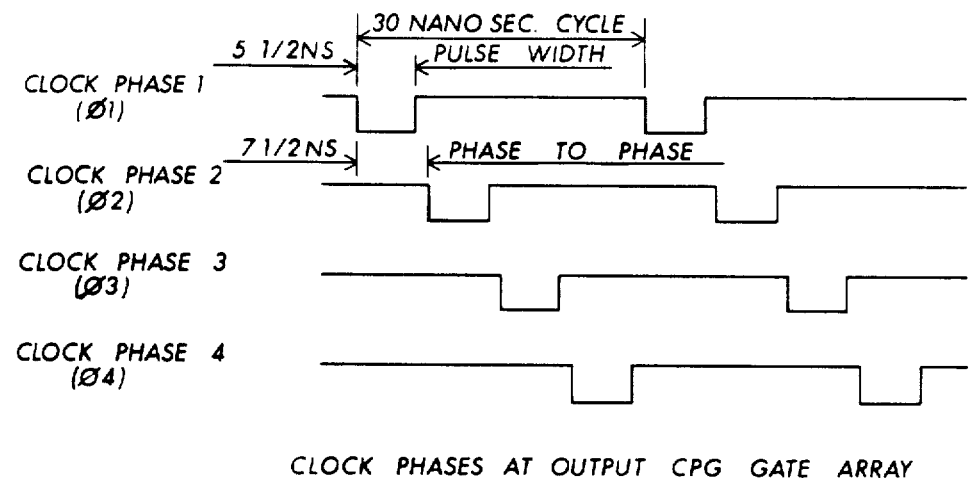
CLOCK PHASES AT OUTPUT CPG GATE ARRAY
FIG. 7
FIG. 6
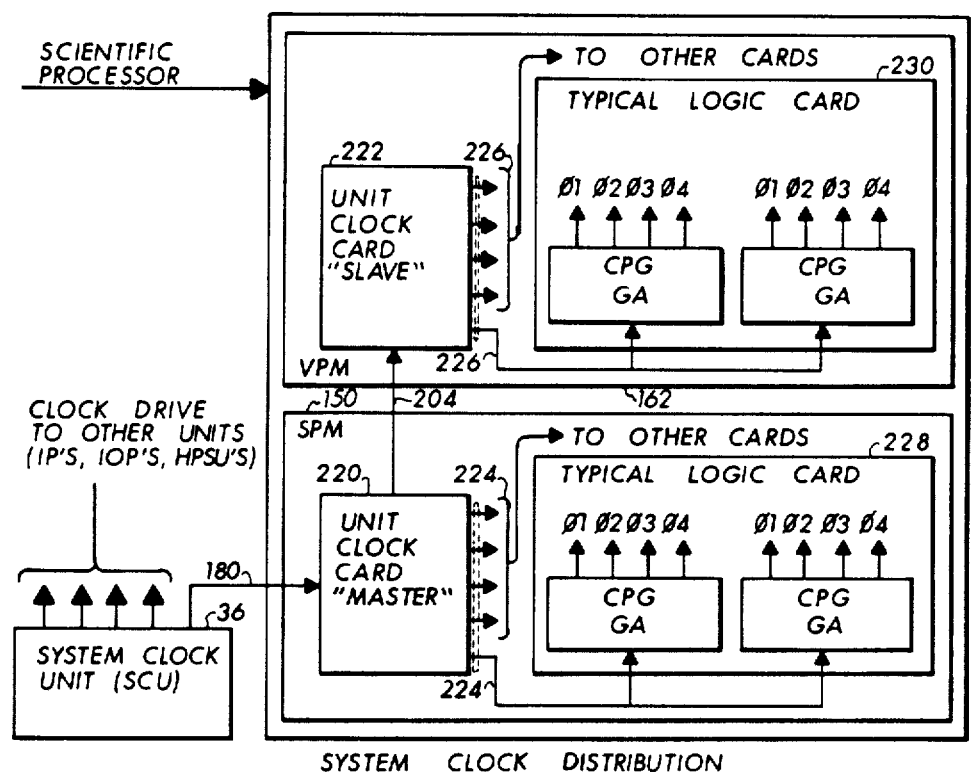
SYSTEM CLOCK DISTRIBUTION

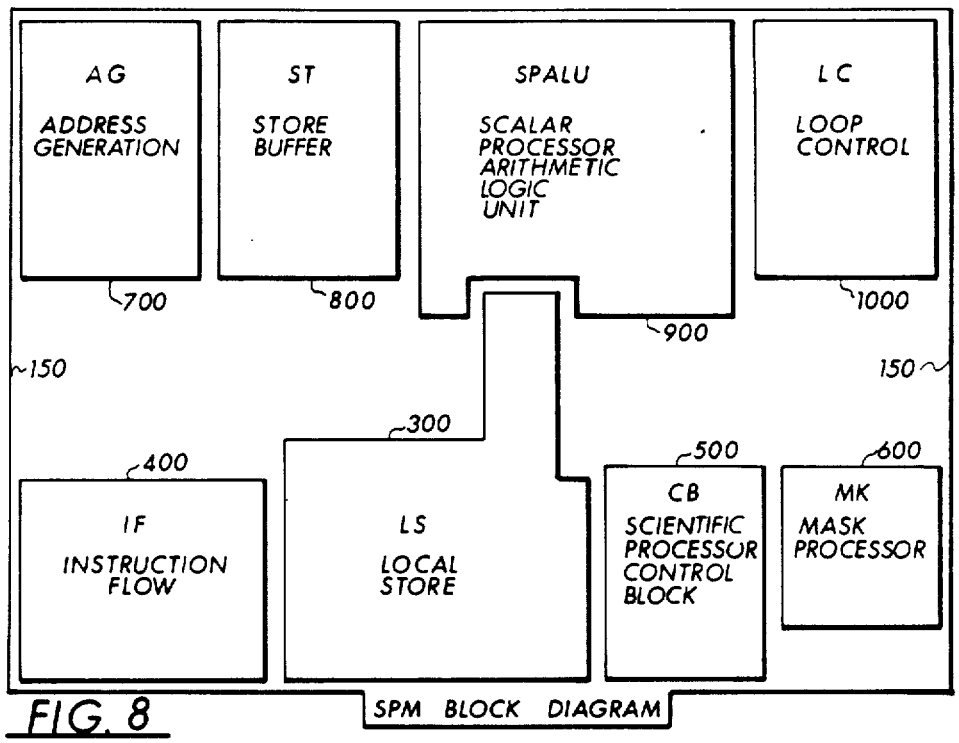
FIG. 8  SPM BLOCK DIAGRAM
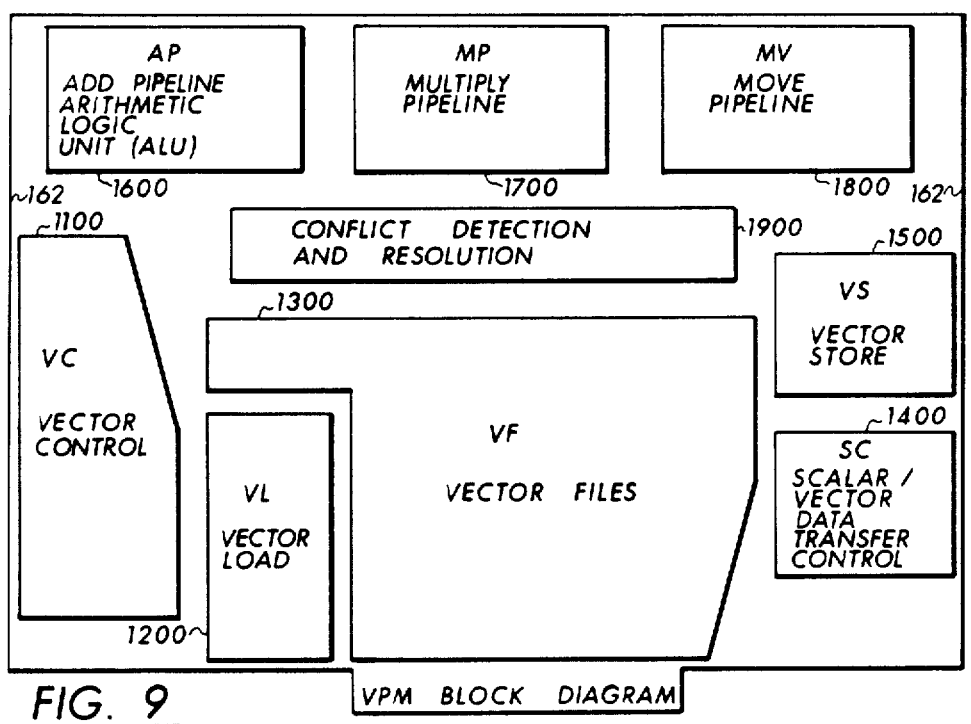
FIG. 9  VPM BLOCK DIAGRAM

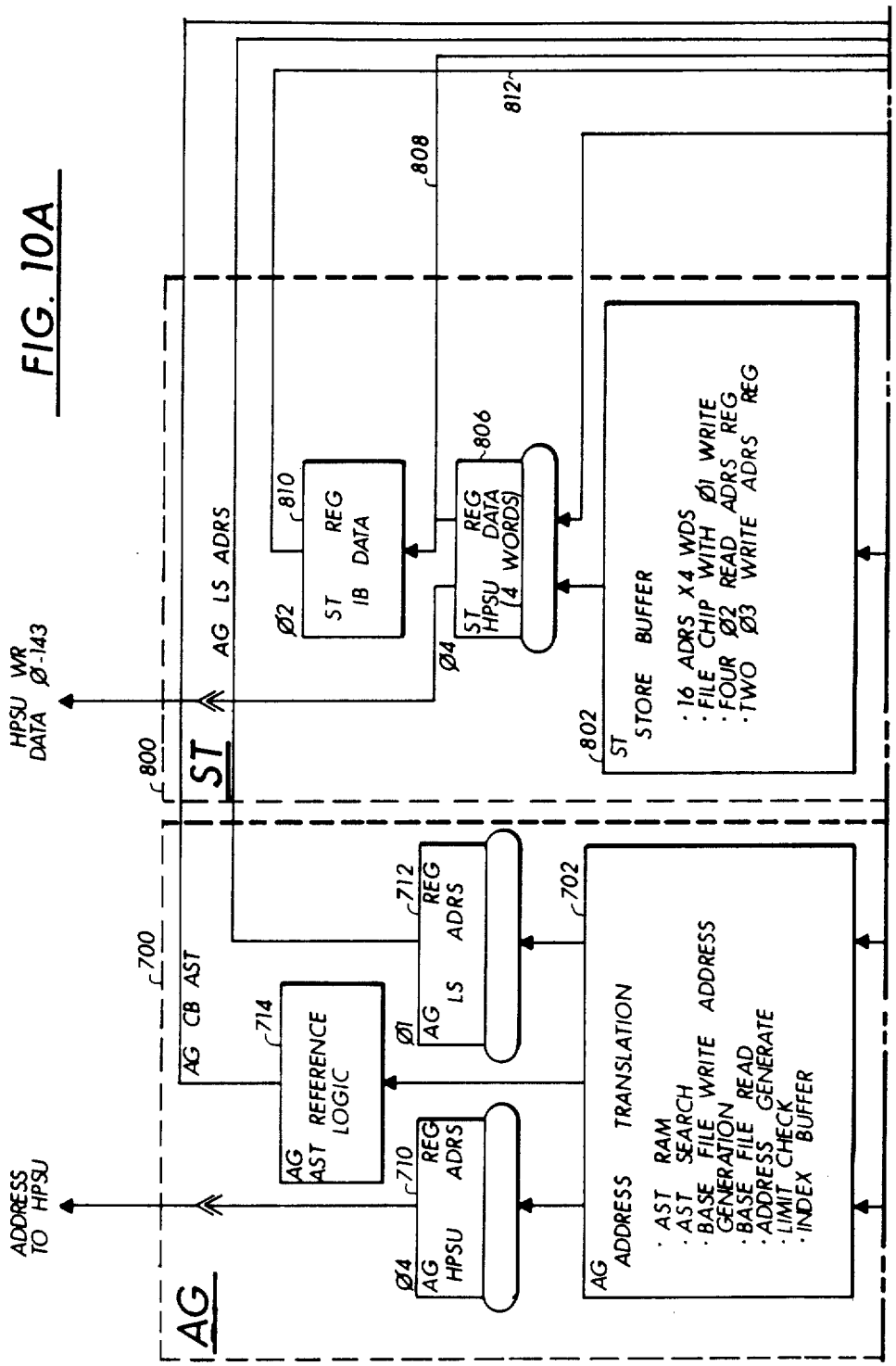

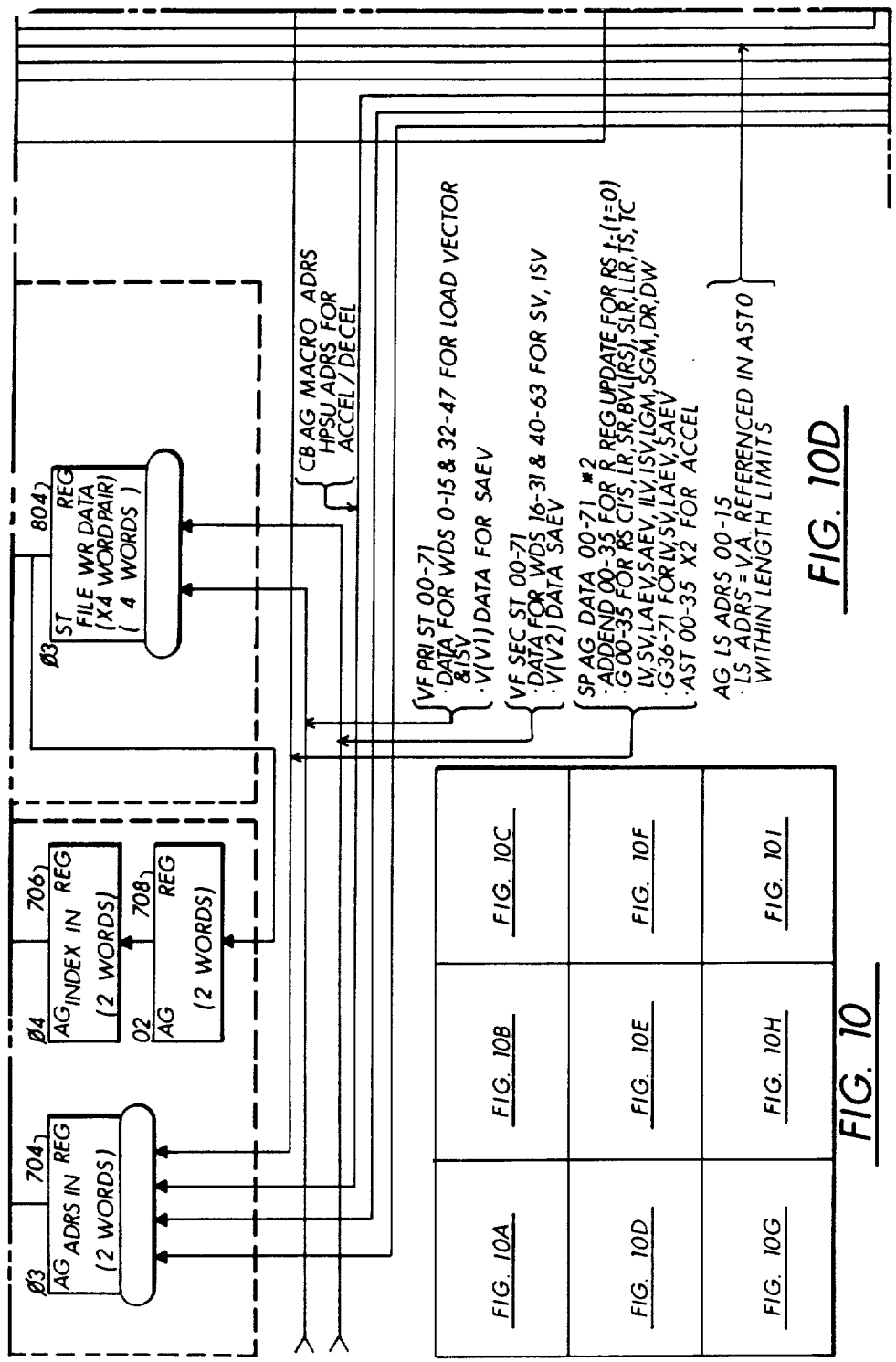

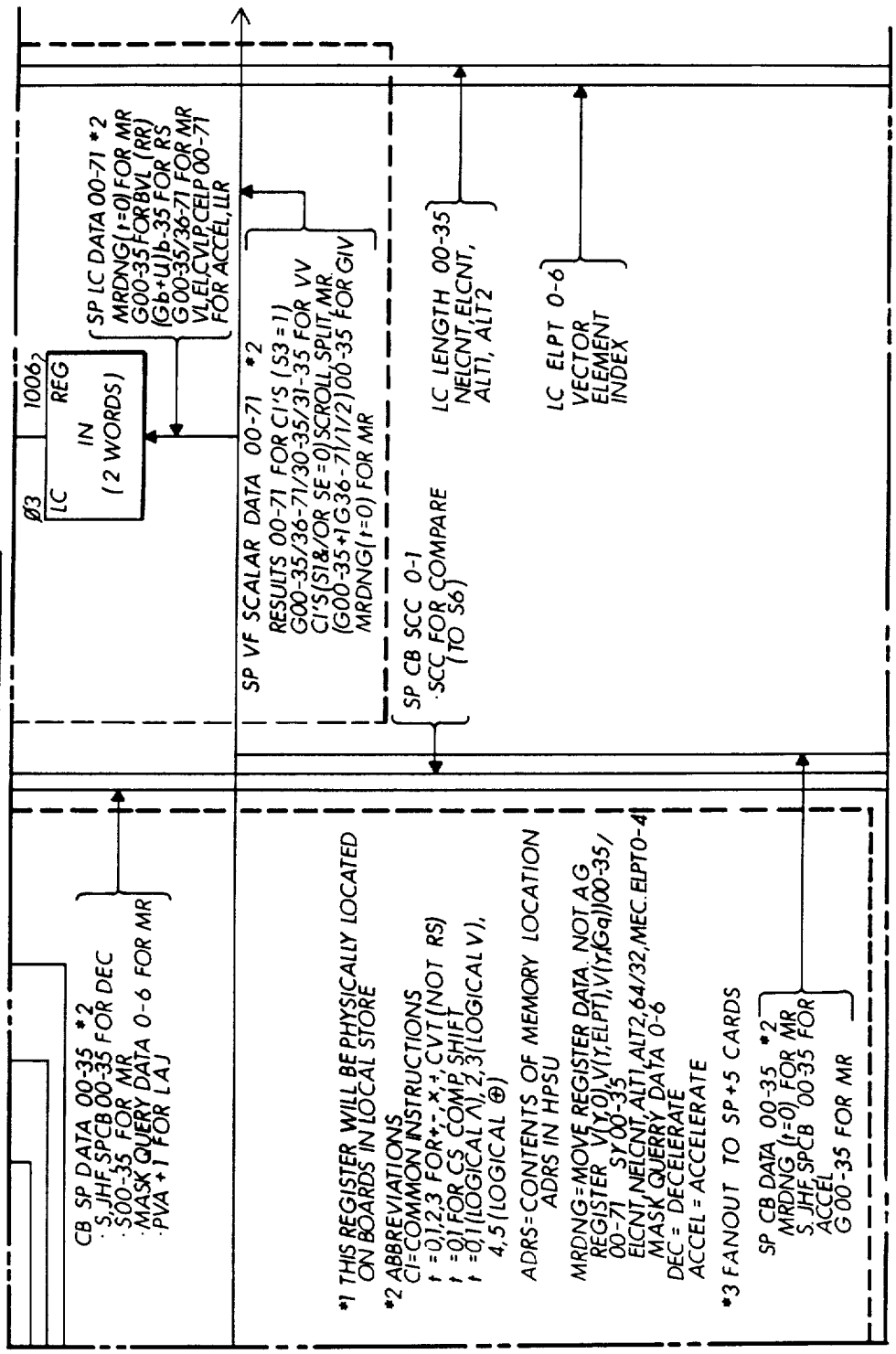

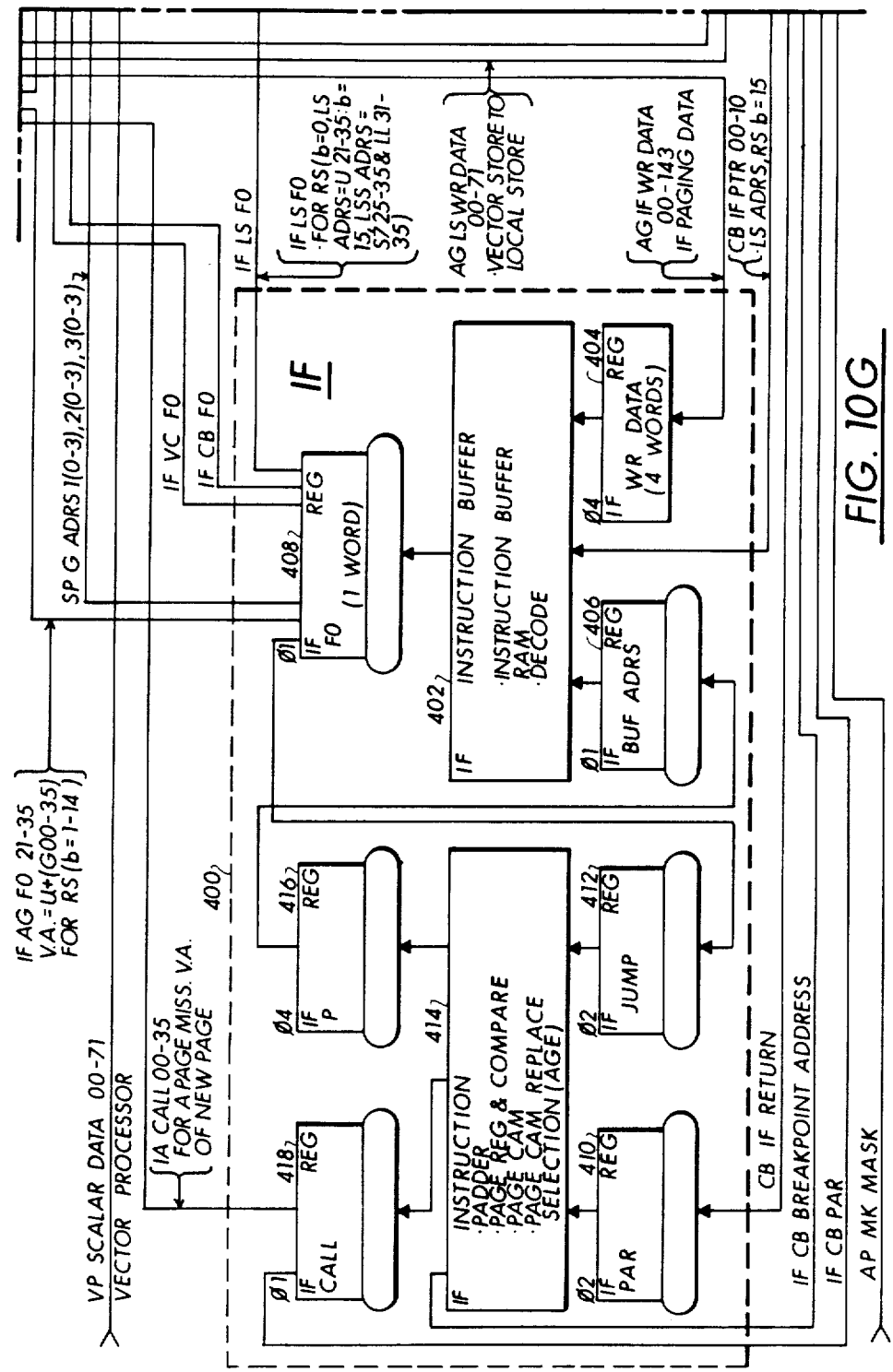

LENGTHS AND POINTER
INTERFACE
BLOCK DIAGRAM

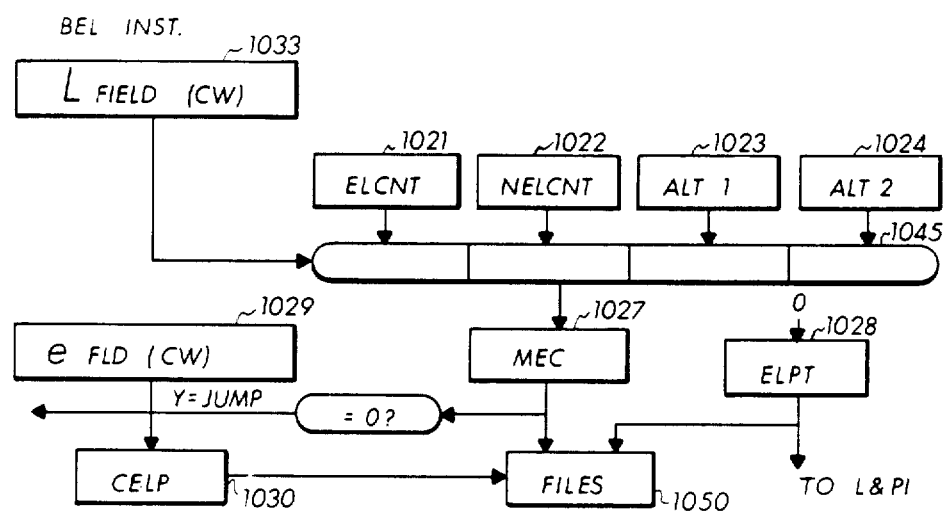
FIG. 22
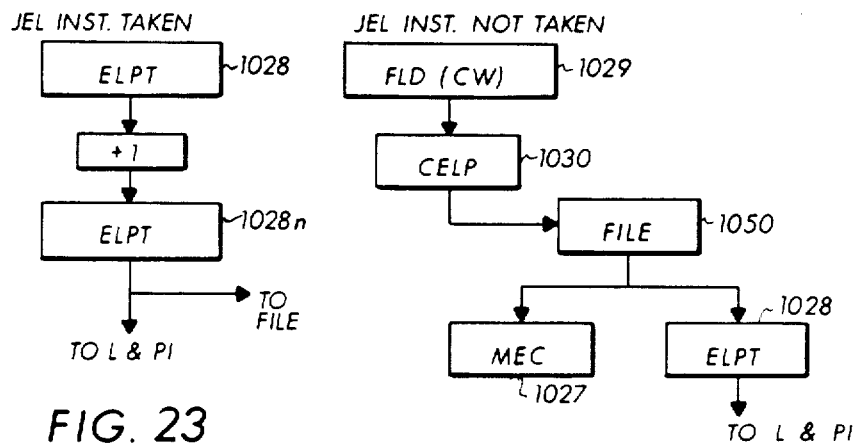
FIG. 23
FIG. 24

LENGTH/PTR VALIDS
ELCNT REG
VFO

ELCNT VALID ⟵ 6 Ø'S ⟶
Ø3       Ø1

ALSO:
• ALTCNT VALID
• ELPT VALID

INST. ISSUE
F1 ISSUE
LOAD F2
SP GO INST

• LOAD F2 FROM IFC
• GO INST FROM SP
• LOAD/GO MUTUALLY EXCLUSIVE
• ISSUE MAY COME UP AND WAIT

AUGEND VALID
AUG. REG
RCVR (RL)

AUG VALID

• USED ON BVL, MOV
• RCVING SECT. MUST FILTER

GO INST (LLCR/SLCR)
WAIT GO
GO INST
LLCR TC
⟵ NOTE ⟶

LLCR TC = WAIT GO * GO * LLCR

LOOP CONTROL MECHANISM FOR SCIENTIFIC PROCESSOR

RELATED PATENT APPLICATIONS

The following co-pending patent applications are assigned to the assignee of this invention, and their teachings are incorporated herein by reference:
Title: HIGH PERFORMANCE STORAGE UNIT
 Inventor: James H. Scheuneman
 Serial No.: 596,130 now U.S. Pat. No. 4,633,434
 Filed: Apr. 2, 1984
Title: MULTIPLE UNIT ADAPTER
 Inventor: James H. Scheuneman
 Serial No.: 596,205, abandoned in favor of U.S. Ser. No. 07/047579 which is now U.S. Pat. No. 4,722,052
 Filed: Apr. 2, 1984
Title: A SCIENTIFIC PROCESSOR
 Inventors: Louis B. Bushard, Larry L. Byers, James R. Hamstra, Charles H. Homan, Archie E. Lahti, John T. Rusterholz
 Ser. No.: 761,201
 Filed: Jul. 31, 1985

BACKGROUND OF THE INVENTION

A. Field of the Invention

The present invention relates to Scientific Data Processing Systems. More particularly, it relates to those scientific data processing systems which include the execution and manipulation of strings of elements known as vectors. Because of the length of these vectors, it is usually necessary to accomplish their execution in unique program steps called program loops. The present invention is a mechanism for the control of these program loops.

B. Prior Art

Loop control mechanisms in the past usually shared registers and instructions which were generally used in the operation of the main data processing system. As a consequence, loop operations were interspersed with other instructions and were handled in the usual sequential manner. Because of this sharing of these registers, any computation of loop counts was accomplished during the loop operation.

Increases in computing rates have been achieved through advances in physical technologies relating to hardware and hardware functioning. The advent of integrated circuitry gave rise to circuit components operable at very fast computing rates, and capable of performing complex functions while remaining economically feasible. Access and cycle time of memories has also been markedly decreased.

In addition to the changes and developments in the hardware, there have been continuing advances in the organizational architecture of data processing system that provide for ever-increasing utilization of the various data processing components. While many examples of optimization of utilization of the components comprising the data processing systems can be described, attention will be directed to the concept of increasing data processing rates by providing for an overlap of macro instruction execution.

It has been known for some time that instructions in data processing systems that basically provide for the steps of instruction procurement and instruction decoding, instruction operation, and storage of results, could be overlapped such that once an existing instruction was procured from the memory and the current instruction passed into execution, the memory would be available for accessing for the next instruction. This allowed overlapping of the instructions primarily based upon the availability of access to the memory unit. This type of instruction overlapping was most common in the data processors that involved so-called hardwired instruction repertoire and control.

This invention addresses the problem of overlap of instructions of the type just described, and provides a system that enhances the system operation by accomplishing the overlap of instructions.

It is therefore a purpose of this invention to introduce a unique mechanism for the control of these loop programs in a vector-oriented data processing system. The mechanism proposed provides a high-performance means of handling the parameters associated with these program loops in a scientific data processing system, particularly those involved with vector processing.

BRIEF DESCRIPTION OF THE INVENTION

A. Objects of the Invention

It is therefore an object of this invention to provide an improved loop control mechanism for the control of program loops in a vector oriented scientific digital data processor.

It is a further object of the present invention to provide a high performance means of handling the parameters associated with program loops in a scientific processor, particularly those involved with vector processing.

It is also an object of the present invention to provide a loop control mechanism for a scientific vector data processing system whose novelty centers around the use of special registers and machine instructions dedicated to the handling of the loop parameters.

It is a further object of the present invention to provide a loop control mechanism for a scientific vector oriented data processing system having special registers and instructions for controlling program loops which special registers and instructions make it possible to efficiently pre-compute loop-counts to thereby enhance the operational speed of the scientific processor.

It is still a further object of this invention to provide a loop control mechanism for a vector oriented scientific data processing system which mechanism is capable of separating a single FORTRAN DO-loop into a vector loop and an element loop within it, the vector loop processing one strip per pass and the element loop processing one element position per pass.

B. Summary of the Invention

A loop control mechanism is described for use in a vector-oriented scientific data processing system. Because of the vector-oriented nature of scientific programs used on digital data processing systems the efficient control of program loops is of major importance. It can be shown that a procedure coded as N nested DO loops in FORTRAN will generally require $2N-1$ nested loops of scientific processor object code, given a vector register architecture. Except for the innermost level, it is necessary at each level to iterate by strips up to the vector length and within that vector length strip to iterate by elements. For the innermost loop, iteration by element is not needed, but is implicit in vector operations. The present mechanism accomplishes this loop control optimization by maintaining the parameters for loop control in separate loop control registers. The use of this special facility for these parameters provides for their efficient management. The novelty of this invention centers around having special registers and unique instructions dedicated to the handling of the loop parameters. The use of these special registers and instructions for the controlling of these loops make it possible to efficiently precompute loop-counts, thereby enhancing the speed of the scientific processor.

BRIEF DESCRIPTION OF THE DRAWINGS

The foregoing objects and the above summary will be more readily understood when read in conjunction with the accompanying drawings in which:

FIG. 6 is a block diagram of the clock distribution system of the Scientific Data Processing System;

FIG. 7 is a timing diagram showing the various clock phases at the output of the CPG gate array;

FIG. 8 is a block diagram of the Scalar Processor Module of the Scientific Data Processing System;

FIG. 9 is a block diagram of the Vector Processor Module of the Scientific Data Processing System;

FIGS. 10, 10A-I are more detailed logical block diagram of the Scalar Processor Module of FIG. 8;

FIG. 22 is a block diagram showing the register path taken by a Begin Element Loop (BEL) instruction;

FIG. 23 is a block diagram showing the register path taken by a Jump Element Loop (JEL) instruction;

FIG. 24 is a block diagram showing the register path taken when the JEL instruction of FIG. 23 is not taken;

Figure 1:
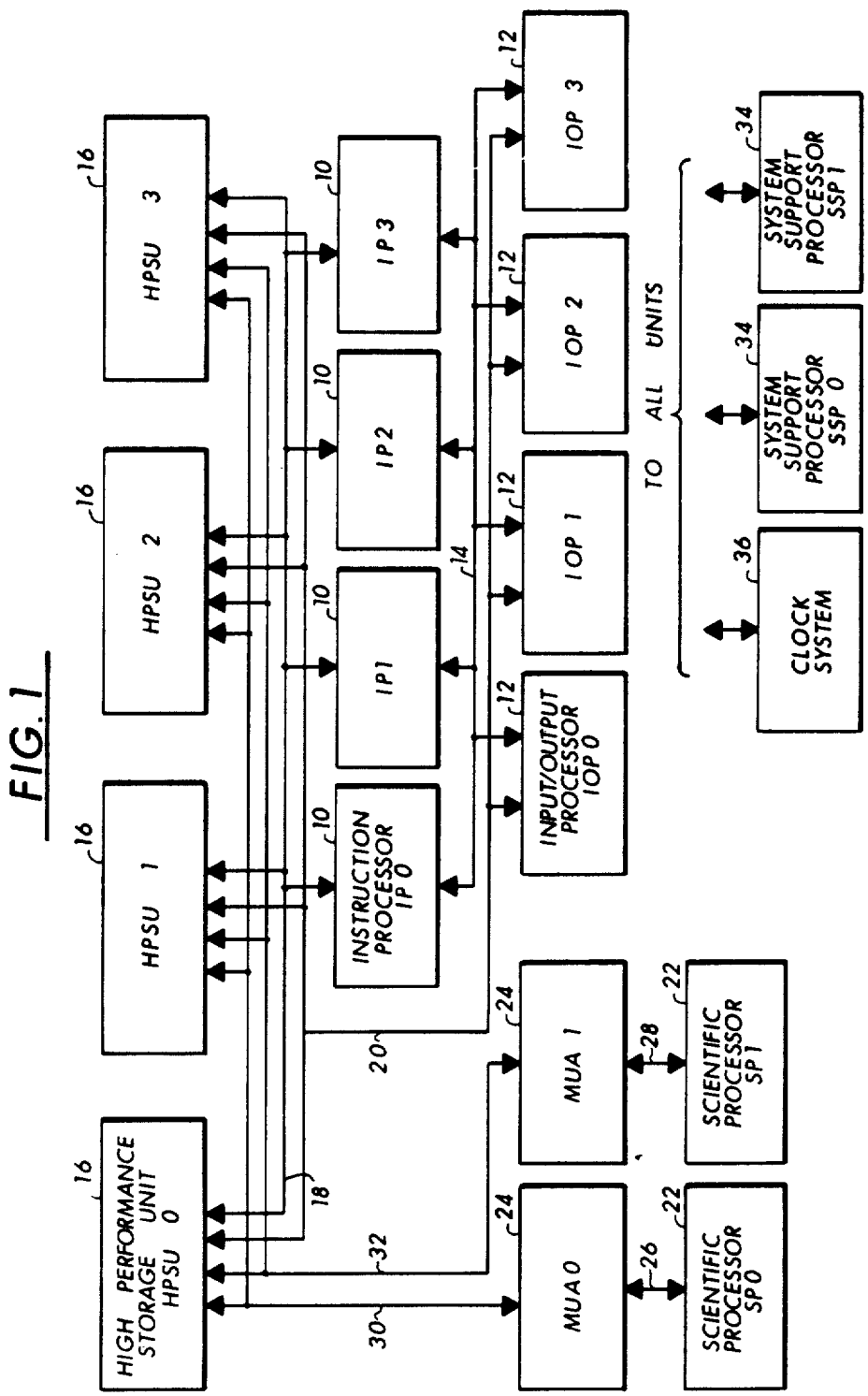
FIG. 1 is a system block diagram of the over-all digital data processing system in which the invention can be utilized.

| GLOSSARY | |
|---|---|
| TERM | DEFINITION |
| ACCEL | ACCELERATE |
| ADD | ADDEND |
| ADRS | ADDRESS |
| AG | ADDRESS TRANSLATION AND GENERATION SECTION |
| AI | ATTENTION INTERRUPT |
| ALT1 | FIRST ALTERNATE ELEMENT COUNT |
| ALT2 | SECOND ALTERNATE ELEMENT COUNT |
| ALU | ARITHMETIC LOGIC UNIT |
| AP | ADD PIPELINE SECTION (ALU) |
| ARM | AVAILABILITY, RELIABILITY, MAINTAINABILITY |
| AST | ACTIVITY SEGMENT TABLE |
| AUG | AUGEND |
| BFR | BUFFER |

-continued

GLOSSARY

| TERM | DEFINITION |
|---|---|
| BNA | BANK NOT AVAILABLE |
| BPA | BOARD-PAIR ASSEMBLY |
| BRKPT | BREAKPOINT |
| BUF | BUFFER |
| BVL | BEGIN VECTOR LOOP |
| CB | CONTROL BLOCK SECTION |
| CAM | CONTENT ADDRESSABLE MEMORY |
| CELP | CURRENT ELEMENT LOOP POINTER |
| CBS | CB MEMORY SHADOW RESIGER |
| CLK | CLOCK |
| CLR | CLEAR |
| COMPR | COMPARE |
| CNT | COUNT |
| CONSIM | CONCURRENT FAULT SIMULATOR |
| CP | CHARACTERISTIC PIPELINE |
| CPG | CLOCK PULSE GENERATOR |
| CTRL | CONTROL |
| CVLP | CURRENT VECTOR LOOP POINTER |
| DBL | DOUBLE |
| DEC | DECELERATE |
| DES | DESIGNATOR |
| DEST | DESTINATION |
| DIAG | DIAGNOSE INSTRUCTION |
| DP | DOUBLE PRECISION |
| DP-FLP | DOUBLE PRECISION FLOATING POINT |
| DP-FXP | DOUBLE PRECISION FIXED POINT |
| EDC | ERROR DATA CAPTURE |
| EI | EXTERNAL INTERRUPT |
| EIF | EXECUTE IMMEDIATE FUNCTION |
| EL | ELEMENT LOOP |
| ELCNT | ELEMENT COUNT |
| ELPT | ELEMENT POINTER |
| EM | EXTERNAL MONITOR INTERFACE SECTION |
| EN | ENABLE |
| FDD | FIELD |
| FLP | FLOATING POINT |
| FXP | FIXED POINT |
| G | G REGISTER |
| GA | GATE ARRAY |
| GIV | GENERATE INDEX VECTOR |
| GOP | G OPERAND |
| HPP | HIGH PERFORMANCE PACKAGING TECHNOLOGY |
| HPSU | HIGH PERFORMANCE STORAGE UNIT |
| IA | INSTRUCTION ADDRESS |
| IDX | INDEX |
| IF | INSTRUCTION FLOW SECTION (CONSISTS OF IFA, IFB, & IFC) |
| IFA | INSTRUCTION FLOW ADDRESSING |
| IFB | INSTRUCTION FLOW BUFFER |
| IFC | INSTRUCTION FLOW CONTROL |
| IIH | INTERFACE INTERRUPT HANDLING |
| INTFC | INTERFACE |
| INTRP | INTERRUPT |
| INVLD | INVALIDATE |
| INTIN | INTERRUPTING INSTRUCTION |
| IP | INSTRUCTION PROCESSOR |
| IOP | INPUT/OUTPUT PROCESSOR |
| IPL | INITIAL PROGRAM LOAD |
| IPCU | INSTRUCTION PROCESSOR COOLING UNIT |
| IUCT | IN UNIT CARD TEST |
| LSB | LEAST SIGNIFICANT BIT ($2^{35}$ IN 36 BIT WORD) |
| JHF | JUMP HISTORY FILE |
| LC | LOOP CONTROL SECTION (VECTOR LOOP & EL LOOP REG.) |
| LCS | LOOP CONTROL STACK |
| LD | LOAD |
| LS | LOCAL STORAGE (4K RAM IN LOCAL STORE |
| LSI | LARGE SCALE INTEGRATED CIRCUITS |
| LSS | LOCAL STORAGE STACK SECTION) |
| LSSA | LOCAL STORAGE SEGMENT ADDRESS |
| MCI | MAINTENANCE AND CONTROL INTERFACE |
| MEC | MAXIMUM ELEMENT COUNT |
| MFLOPS | MILLION FLOATING POINT OPERATIONS PER SECOND |
| MK | MASK PROCESSOR SECTION |
| MP | MULTIPLY PIPELINE |
| MPS | MULTIPLY PIPELINE SECTION |
| MPCD | MULTIPLICAND |

-continued

GLOSSARY

| TERM | DEFINITION |
| --- | --- |
| MPI | MULTIPLE PASS INSTRUCTION |
| MRDNG | MOVE REGISTER DATA-NOT A G REGISTER |
| MSB | MOST SIGNIFICANT BIT ($2^0$ IN 36 BIT WORD) |
| MUA | MULTIPLE UNIT ADAPTER |
| MULTR | MULTIPLIER |
| MUX | MULTIPLEXER |
| MV | MOVE PIPELINE SECTION |
| MZ | STRIP SIZE |
| NELCNT | NEXT ELEMENT COUNT |
| NLJ | NON-LOCAL JUMP |
| NOVLP INST | NONOVERLAPPED INSTRUCTION |
| OLM | ONLINE MAINTENANCE |
| PAR | PROGRAM ADDRESS REGISTER (ADDRESS OF NEXT INSTRUCTION) |
| PT | POINTER |
| PCC | POWER COUPLING CONTROL |
| RAM | RANDUM ACCESS MEMORY |
| RDY | READY |
| REG | REGISTER |
| RR | REGISTER-TO-REGISTER INSTRUCTION FORMAT |
| RSLT | RESULT |
| RS | REGISTER-TO-STORAGE INSTRUCTION FORMAT |
| SAEV | STORE ALTERNATE ELEMENT |
| ST | STORE BUFFER SECTION |
| SC | SCALAR/VECTOR DATA TRANSFER CONTROL SECTION |
| SCC | SCALAR CONDITION CODE |
| SCG | SINGLE CONDITION GENERATE |
| SCU | SYSTEM CLOCK UNIT |
| SCS | SCALAR LOCAL STORE |
| SEDC | SCANSET ERROR DATA CAPTURE |
| SEL | SELECT |
| SI | STORAGE INTERFACE |
| SIMD | SINGLE INSTRUCTION MULTIPLE DATA |
| SLR | STORE LOOP CONTROL REGISTER |
| SP | SCIENTIFIC PROCESSOR |
| SP ALU | SCALAR PROCESSOR ARITHMETIC LOGIC SECTION |
| SP-FLP | SINGLE PRECISION FLOATING POINT |
| SP-FP | SINGLE PRECISION FIXED POINT |
| SPCB | SCIENTIFIC PROCESSOR CONTROL BLOCK |
| SPM | SCALAR PROCESSOR MODULE |
| SPP | SYSTEM PROBE PANEL |
| SRC | SOURCE |
| SS | SCANSET SECTION |
| SSI | SMALL SCALE INTEGRATED CIRCUITS |
| SSP | SYSTEM SUPPORT PROCESSOR |
| ST | STORE BUFFER SECTION |
| SUNA | STORAGE UNIT NOT AVAILABLE |
| SV | STORE VECTOR |
| SVX | STORE VECTOR INDEXED |
| TC | TIMING CHAIN |
| TM | TRACKING MEMORY |
| TS | TIME SLOTS |
| UCM | UNIT CONTROL MODULE |
| UIA | UNIVERSAL INTERFACE ADAPTER |
| UP | UNIVERSAL PROCESSOR INTERFACE SECTION |
| UPI | UNIVERSAL PROCESSOR INTERFACE |
| USC | UNIT SUPPORT CONTROLLER |
| VC | VECTOR CONTROL SECTION |
| VCW | VECTOR CONTROL WORD |
| VF | VECTOR FILE |
| VL | VECTOR LOOP |
| VL | VECTOR LOAD |
| VOP | VECTOR OPERAND |
| VP | VECTOR PROCESSOR |
| VPM | VECTOR PROCESSOR MODULE |
| VPW | VECTOR PARAMETER WORD |
| VS | VECTOR STORE |
| VSO | VIRTUAL SEGMENT OFFSET |
| VS | VECTOR STORAGE SECTION |
| VV | VECTOR STORAGE INSTRUCTION FORMAT |
| WO | WORK CAPACITY |
| WR | WRITE |

DETAILED DESCRIPTION OF THE INVENTION

A. Conventions

Throughout the following description and in the accompanying drawings there are certain conventions employed which are familiar to those that are skilled in the art to which this invention pertains. Within the application, reference numerals will be affixed to elements and items discussed To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor. A group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is covnenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of a High OR function. In a similar fashion, the half-arrowhead convention is applied to define output relationships.

In physical construction of circuits to implement the designated logic functions, it is not uncommon to provide signal inversion in conjuction with the combinatorial logic function. In such cases, the fact of inversion will be designated by the state of the half-arrowhead on the output line or lines In this way, it will be understood that a Low AND circuit having two or more open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead will be considered as the complement thereof. For example, an A symbol having two or more closed half-arrowhead inputs and a right-most closed half-arrowhead would normally indicate and AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various type of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function; and the symbol having a curve at the input and the curve pointed output, often referred to as the "shield" symbol, represents circuits that perform the logical OR function. For the AND function and straight line input or the dot, represents a High AND, and results in a High output signal when all input signals are High. The open circles adjacent the input terminals indicate that the circuit responds to Low signals The straight line output is equivalent to the closed half-arrowhead representation described above, and the circle output designation is equivalent to the open half-arrowhead representation This type of symbol is well known in the art and need not be described further.

B. The System

FIG. 1 is a system block diagram of the over-all digital data processing system in which the invention can be utilized. The over-all system is essentially moduler, and provides for parallel processing.

For the configuration illustrated, from one to four Instruction Processors IP0 through IP3, each labelled 10, can be utilized. Each IP can for example be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control In conjunction with the IPs, from one to four Input/Output Processors IOP0 through IOP3, labelled 12, can be utilized. The interconnections between the IPs and the IOPs, collectively labelled 14, are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified co-pending incorporated patent applications.

Error Correction Code (ECC) is used internally to each HPSU to provide single-bit error correction and double-bit error detection.

In the embodiment illustrated one or two Scientific Processor SP1 and SP2, labelled 22, can be utilized. If a single SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUAO is coupled to each HPSU through interconnection paths 30, and MUA1 is coupled to each HPSU through intercommunication path 32.

Each SP functions under direction of one or more of the IPs to perform scientific type calculations in a support mode. In this regard, the IPs can be considered to be host processors and the SPs can be considered to be support processors, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of informaton, the activation of most maintenance facilities, selecting modes of operation and the like, is done at the control section of the SSP.

A Clock System 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock. The clock system is novel, and is described in one of the above identified co-pending patent applications.

Intercommunication between units is essentially on a Request and Acknowledge basis, and the interfaces will be described in more detail as appropriate.

C. High Performance Storage Unit (HPSU)

Figure 2:
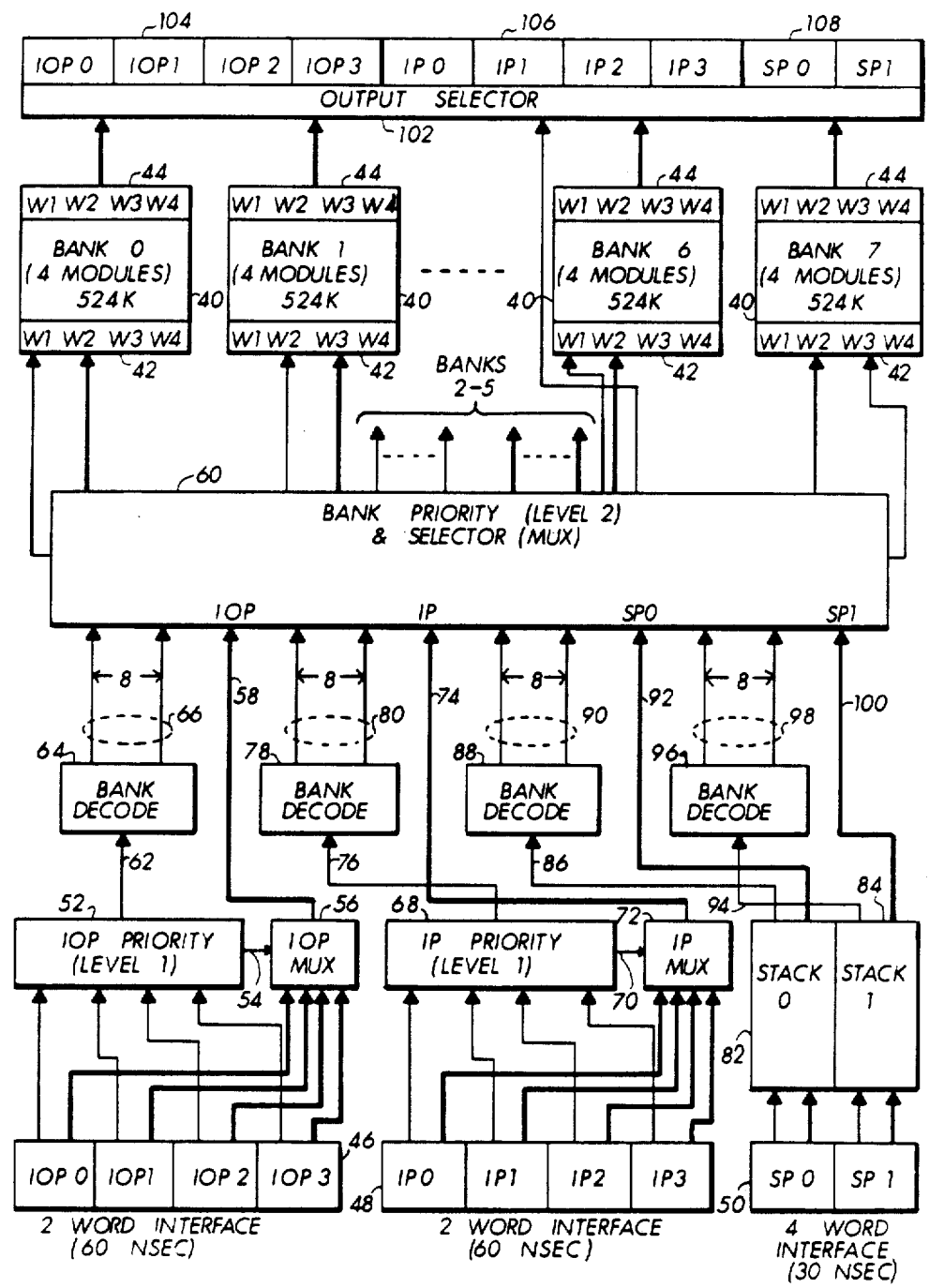
FIG. 2 is a simplified functional blocked diagram of the High Performance Storage Unit.

FIG. 2 is a simplified functional blocked diagram of the High Performance Storage Unit.

The HPSU is a storage device that is commonly accessible by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524 K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IOP0 through IOP3. The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed o the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 74 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in-first-out (FIFO) circulating buffer. The request information feeds out of Stack 0 on line 86 to the Bank Decode 88 which provides a one-of eight selection and data passes on line 92 to the Bank Priority Selector 60. Similarly, request information passes on line 94 to the Bank Decode 96 for making selections on lines 98, while the data passes on line 100.

The Bank Priority and Selector functions to select between the IOP, IP, and the two SP requests presented to it for accessing memory. It also functions to control the Output Selector 102 when reading is to take place. The HPSU has an IOP output 104 capable of handling four IOP ports IOP0 through IOP3. It also has an IP output 106 capable of handling four IP ports labelled IP0 through IP3. Finally, it has an SP output 108 capable of handling two SP output ports labelled SP0 and SP1. Data rates and timing at the output ports 104, 106, and 108 are similar to those for the input ports previously described.

D. Multiple Adapter (MUA)

Figure 3:
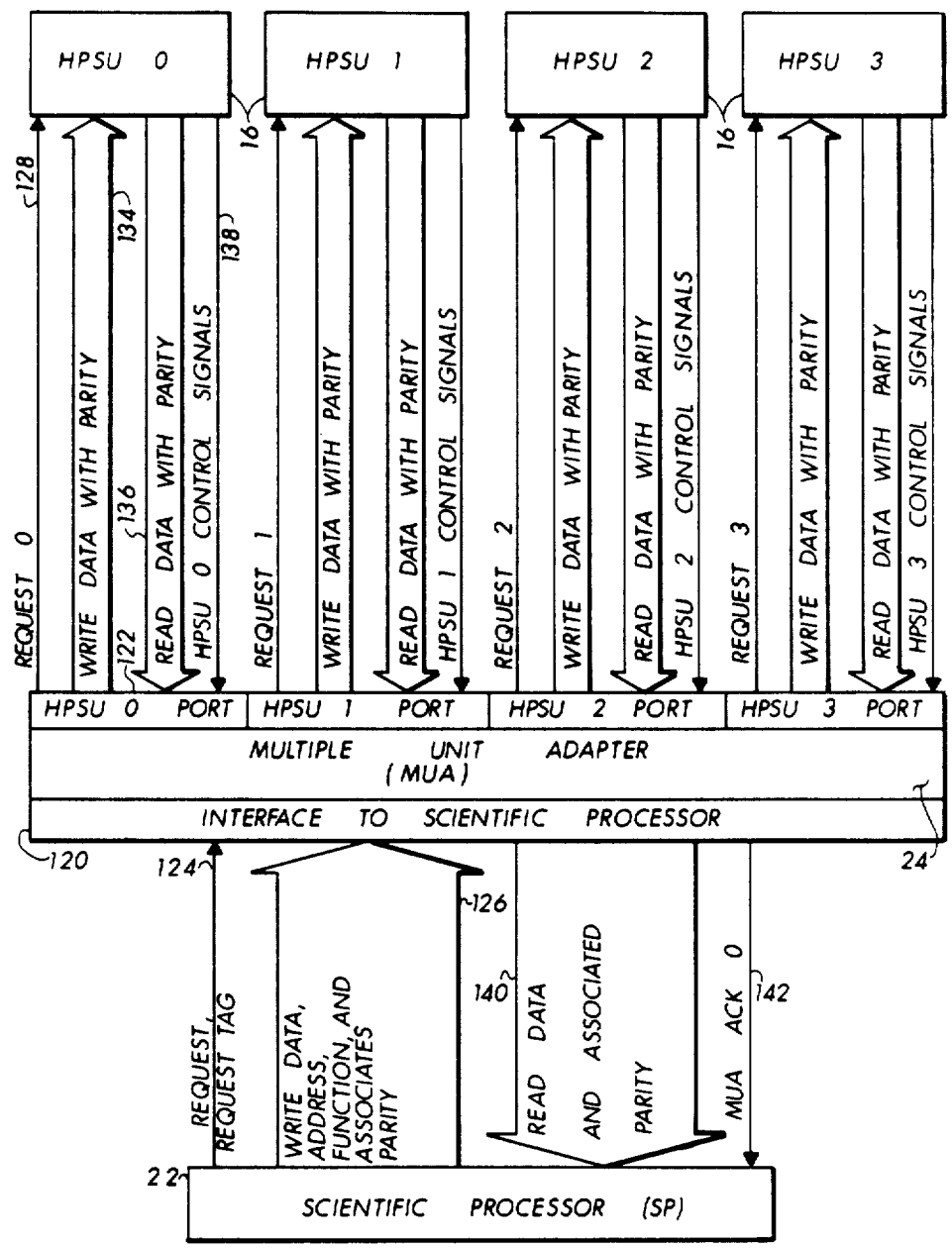
FIG. 3 is a simplified block diagram of the Multiple Unit Adapter (MUA) for providing selective interconnection of a Scientific Processor to one of up to four High Performance Storage Units.

FIG. 3 is a simplified block diagram of the multiple Unit Adapter (MUA) for providing selective interconnection of a Scientific Processor to one of up to four High Performance Storage Units.

The MUA 24 has an Interface to Scientific Processor 120 and up to four HPSU ports 122, each adapted for interconnection to an associated HPSU 16.

A Scientific Processor (SP) issues Request signals on control path 124 to the MUA. For a write operation, the write data, address, function, and associated parity is provided via cable 126. The MUA can accumulate up to eight requests from the SP without acknowledgement, and the requests and the associated data are stored in a first-in-first-out (FIFO) stack (not shown).

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPUS0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) signal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, with the exception of a few special control signals, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. Scientific Processor (SP)

Figure 4:
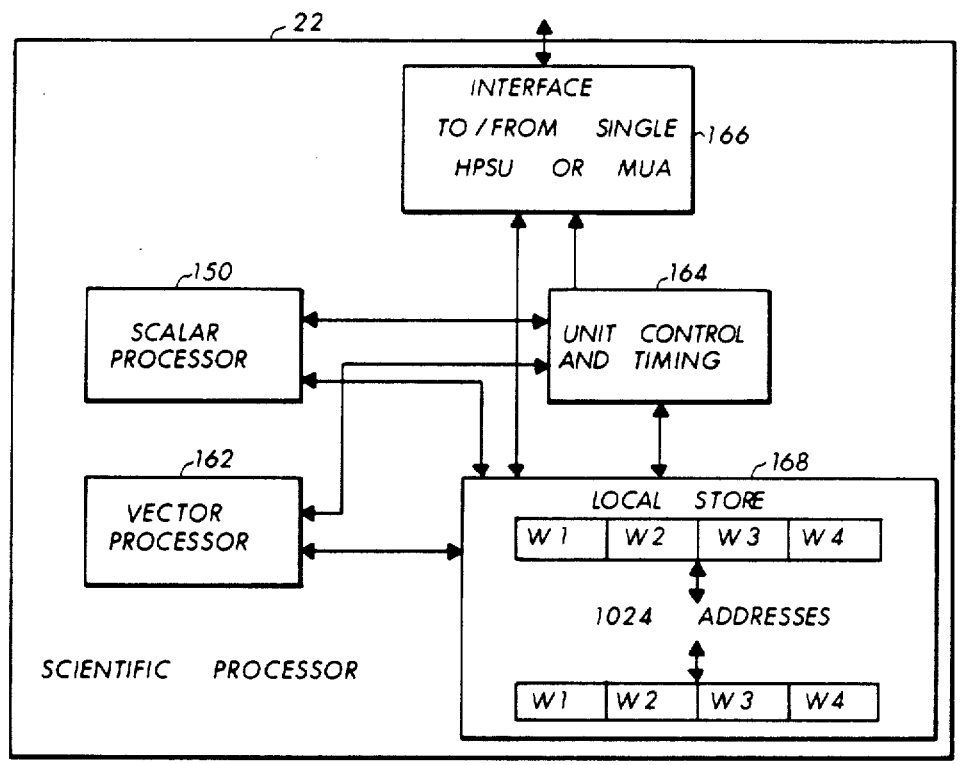
FIG. 4 is a simplified block diagram of the Scientific Processor.

FIG. 4 is a simplified block diagram of the Scientific Processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any priveledged modes of operation. The SP includes distinct modules, the Scalar Processor 150, the Vector Processor 162, the Unit Control Timing 164, the Interface 166, and the Local Store 168.

The Vector Processor Module 162 performs vector calculations. The Scalar Processor Module 150 performs scalar operations, and also has the over-all control function, including instruction fetch and issue. Generally speaking, the Scalar and Vector processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted as distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

The Scientific Processor (SP) 22 is part of a tightly coupled multiprocessor system. The primary purpose of the SP is the high speed execution of vector floating-point arithmetic. As described with reference to FIG. 1 two new units have been designed to allow operation of SP(s) in the 1100/90 multiprocessor system. They are the High Performance Storage Unit HPSU(s) 16, and the Multiple Unit Adapter MUA(s) 24.

Each SP only runs user programs that are set up in an HPSU by one of the IPs. Programs and portions of programs set up for execution on an SP are called activities.

In a minimum multiprocessor system configuration utilizing an SP, the HPSU is central to the system. The SP, the IP, and the IOP all interface to the HPSU. The SP has one special port that allows requests each clock cycle, while other ports only accept requests on a two clock cycle basis. Multiple requests for the same module address range within the HPSU are honored on a certain priority basis and in that case, some of the requesters must wait their turn.

The System Clock Unit (Clock System 36) provides logic clock signals to the HPSU, the SP, the IP and the IOP. Each System Support Processor (SSP) 34 has its own clock source (not shown). The SSP is directly connected to the HPSU, the IOP, the IP and to the SP. It is also indirectly connected to the System Clock Unit 36 and to the Instruction Processor Cooling Units (not shown).

Figure 5:
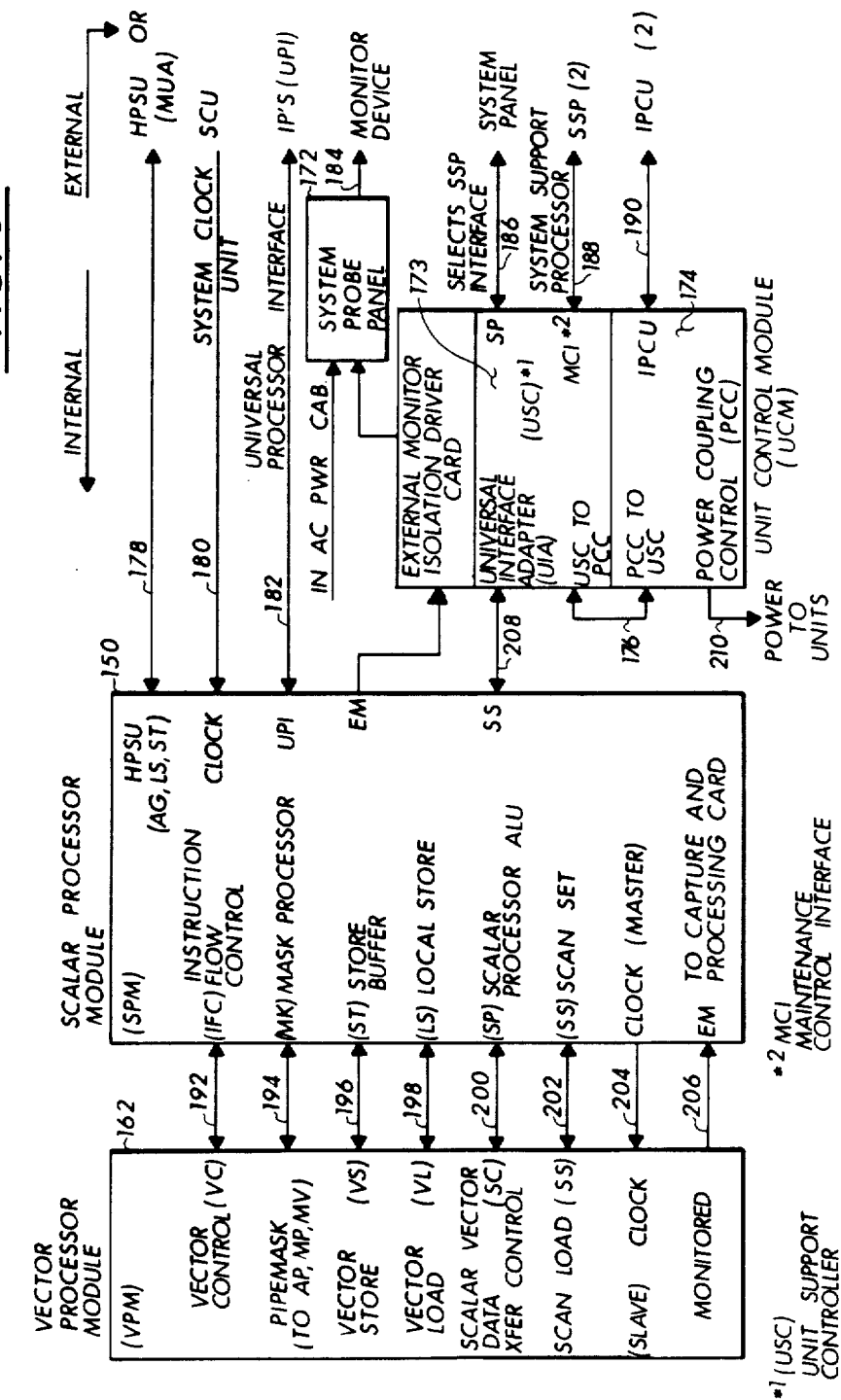
FIG. 5 is a block diagram of the internal and external interfaces of the Scientific Processor.

FIG. 5 is a block diagram of the Scientific Processor (SP) internal and external interfaces. In the Scientific Processor, which is designated as a Type 3068-0 unit available from Sperry Corporation, there are four internal units or modules, namely the Vector Processor Module (VPM) 162, the Scalar Processor Module (SPM) 150, the Unit Control Module (UCM) 170, and the System Probe Panel 172. The Unit Control Module 170 is further partitioned into two logical entities, the Unit Support Controller (USC) 173 and the Power Coupling Controller (PCC) 174. The USC-to-PCC 176 is an internal interface.

The interfaces are shown as lines, but it should be understood that this is illustrative only, and that physically there may be multiple conductors and circuits utilized. The external interfaces, are the interfaces to other units within the central complex, and are listed down the right hand side of the FIG. 5. The read/write data interface via line 178 to the HPSU or MUA interfaces with the SPM 150. The System Clock Unit (SCU) interfaces via lines 180 with the SPM 150. The Universal Processor Interface (UPI) and the Instruction Processor(s) is via line 182. The interface at the System Probe Panel 172, to monitoring device is via line 184. The input from the System Panel interfaces with the Unit Support Controller 173 of the Unit Control Module 170 via line 186. One of the things that this interface does is to select the next interface. There are two interfaces via line 188 to two different System Support Processors 34 which interface with the Maintenance Control Interface (MCI) of the Unit Support Controller 173. The last external interface 190 is from the Power and Cooling Controller 174 to the Instruction Processor Cooling Units (not shown). It selects one of the two cooling units and monitors environmental conditions.

The internal interfaces are the interfaces going between the VPM 162 and the SPM 150. The instruction interface 192 is from the Instruction Flow Control (IFC) logic section of the SPM to the Vector Control (VC) section of the VPM. The mask interface 194 is from the Mask Processor (MK) of the SPM to the Add Pipe (AP) the Multiply Pipe, (MP), and the Move Pipe (MV) in the VPM. These will be described in detail below. The Vector Store (VS) interface 196 provides information stored in the Vector Files to the Store Buffer (ST). It also provides information from main storage, or HPSU or Local Store. The Vector Load (VL) interface 198 transfers data from the Local Store (LS) section to the.. Vector Load (VL), from where it is transferred into the Vector Files. The source of the data in this case is from the HPSU or from the Local Store. The Scalar Vector Data Transfer (SC) interface 200 transfers data from the SPM to the VPM. It also writes Scalar instructions into the Vector Files or broadcasts G operands. Further it transfers data in the opposite direction from the VPM to the SPM. This data could be elements from Vector Files or results or reduction instructions. The Scan Set (SS) interface 202 couples the master Scan Set card in the SPM to the slave Scan Set card in the VPM. The clock interface, 204 is from the master clock card in the SPM to the slave clock card in the VPM. The last interface shown is the External Monitor (EM) interface 806. It involves a collection of key logic signals in the VPM. These signals are routed to the SPM and ultimately they go out of the external monitor interface of the System Probe Panel 172.

There is another internal interface 208 from the SPM to the Unit Support Controller 173. This is the universal interface adapter interface from the Unit Support Controller and connects to the Scan Set card of the SPM. An interface 210 is provided between the Unit Control Module 170 and the power and cooling units (not shown).

FIG. 6 is a block diagram of the Clock Distribution System. The System Clock Unit (SCU) 36 provides multiple drives, with a separate drive for each IP, IOP and HPSU in the system.

The interface 180 from the System Clock Unit SCU comes into the Master unit clock card 220 in the Scalar Processor Module. From there, clock signals are sent to the Slave unit clock card 222 in the Vector Processor Module. The unit clock cards 220 and 222 serve their respective modules. The lines 224 and 226 emanating from the unit clock cards represent the drive to remaining logic cards within the associated module. Typical logic cards 228 and 230 in each module receive the clock drive from the System Clock Unit, and utilizes two Clock Pulse Generator (CPG) Gate Arrays (GA) on each card to derive the four phase clock signals identified as phases 1, 2, 3, and 4 ($\phi 1$, $\phi 2$, $\phi 3$, $\phi 4$) for distribution on that logic card. In other words, each logic card has its associated CPG circuits.

FIG. 7 is a timing diagram of the Clock Phases. The two clock phases illustrated occur at the output of the two Clock Pulse Generators on each logic card. The low portion of each clock pulse is the active level. The time low is the period of the clock pulse that is considered its active time. Four clock pulse phases are generated. The times shown are common to all four phases. The clock cycle is 30 nanoseconds from start of one clock pulse in a phase to the start of the next occurring pulse in that phase. The clock pulses are nominally 5 ½ nanoseconds in duration. The time duration from the beginning of a clock signal in one clock phase to the beginning of a clock signal in the next subsequent clock phase is nominally 7 ½ nanoseconds.

While not illustrated, some of the features of the high performance technology utilized to construct the SP will be described. Emitter coupled subnanosecond circuits including gate arrays and Small Scale Integrated (SSI) circuits, known in the industry as the 100K family are used. The gate array circuits have 168 logic gates, 48 logic pins and power dissapation of up to 5 watts. The SSI packages, or chips as they are called, have 21 logic pins and power dissipation of up to a quarter of a watt. Most of the IP gate arrays plus 13 additional types that were designed specifically for this SP are used. The printed circuit cards have space for a maximum of 227 SSI circuit packages. Gate arrays require two SSI locations. The printed circuit cards are never fully populated with gate array circuit packages or chips, since a certain number of spare circuit locations for possible logic changes were provided. A pair of card pins for logic changes, check out and modifications are also reserved. In some instances power distribution pins on a card are the limiting factor for the necessary interconnections. The printed circuit cards are 11.3 inches wide by 10.8 inches deep, with logic, power, and ground connectors on three edges. Connectors on the rear edges of the cards plug into a back panel of the module through use of a conventional connector. The two side edges of the cards connect to the side panel to the module with Zero Insertion Force (ZIF) connectors. The cards are paired together and have two connectors for logic signals between the cards of the pair. These circuit packages are water cooled by a cold plate between the cards of the pair. Two cards of a cold plate are molded together into a subassembly part for insertion into the card module. Each module has room for a maximum of 52 cards or 26 card pairs. The SPM has 48 cards and the VPM has 52 cards. Ribbon cable and coaxial cable are used for logic interconnect between the SPM and VPM.

FIG. 8 is a block diagram of the Scalar Processor Module (SPM) of the SP. FIG. 9 is a block diagram of the Vector Processor Module (VPM) of the SP. These two drawings taken together illustrate the machine organization at the block diagram level. First, as to the block diagrams in general, there are a total of sixteen major logic sections with eight sections in each of the SPM and the VPM. Several additional auxiliary sections are present, such as the Scan Set and the external monitor however, these will be referred to only briefly since they are not necessary for a complete understanding of the invention. Each section has a character identifier. This identifier is also used as a prefix for all logic signals originating in that section. In the SPM (FIG. 8), break out to the eight logic sections is on a functional basis. These sections provide architectually, required functions. In the VPM (FIG. 9) design of sections was done to accommodate parallel pipelined operation for higher performance.

The sixteen logic sections mentioned for FIG. 8 and FIG. 9 indicate their relative positions on the later detailed block diagrams. Referring now to the SPM block diagram of FIG. 8, there is illustrated the Instruction Flow Control (IF) section 400; the Local Store (LS) section 300; the Control Block (CB) section 500; the Mask Processor (MK) section 600; the Address Generation (AG) section 700; the Store Buffer (ST) section 800; the Scalar Processor Arithmetic Logic Unit (SPALU) 900; and the Loop Control (LC) section 1000. These sections will be described in detail below.

The VPM sections are shown in FIG. 9, and again the relative positions of the various sections are indicated as they will be related to more detailed block diagrams. These major sections include the Vector Control (VC) section 1100; the Vector Load (VL) section 1200; the Vector File (VF) section 1300; the Scalar Vector Data Transfer Control (SC) section 1400; the Vector Store (VS) section 1500; the Add Pipeline (AP) section 1600, which includes an Arithmetic Logic Unit (ALU); the Multiply Pipeline (MP) section 1700; and the Move Pipeline (MV) section 1800. A special control section Conflict Detection and Resolution 1900 is utilized to resolve conflicts between the various pipelined sections.

Figure 10B:
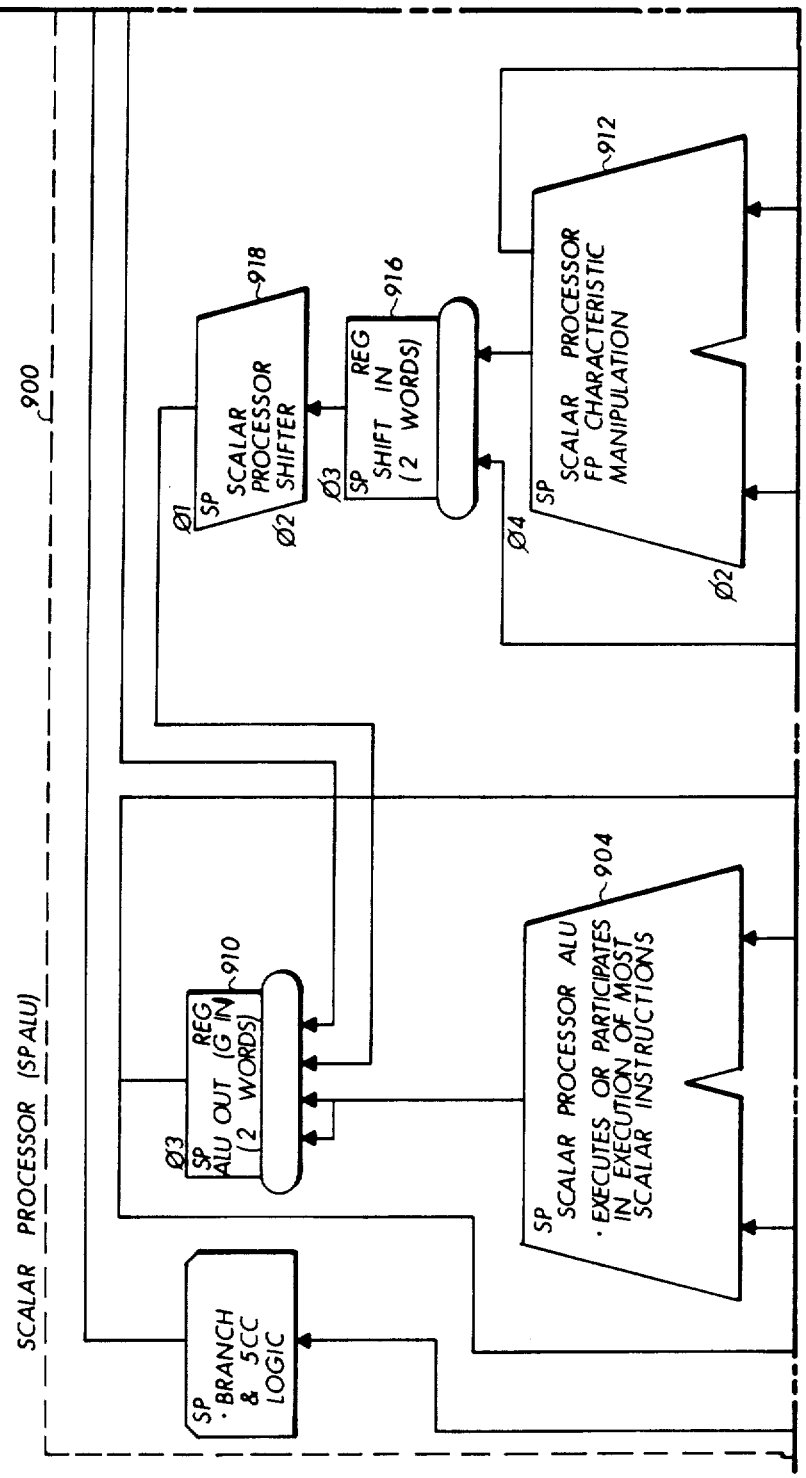
Figure 10C:
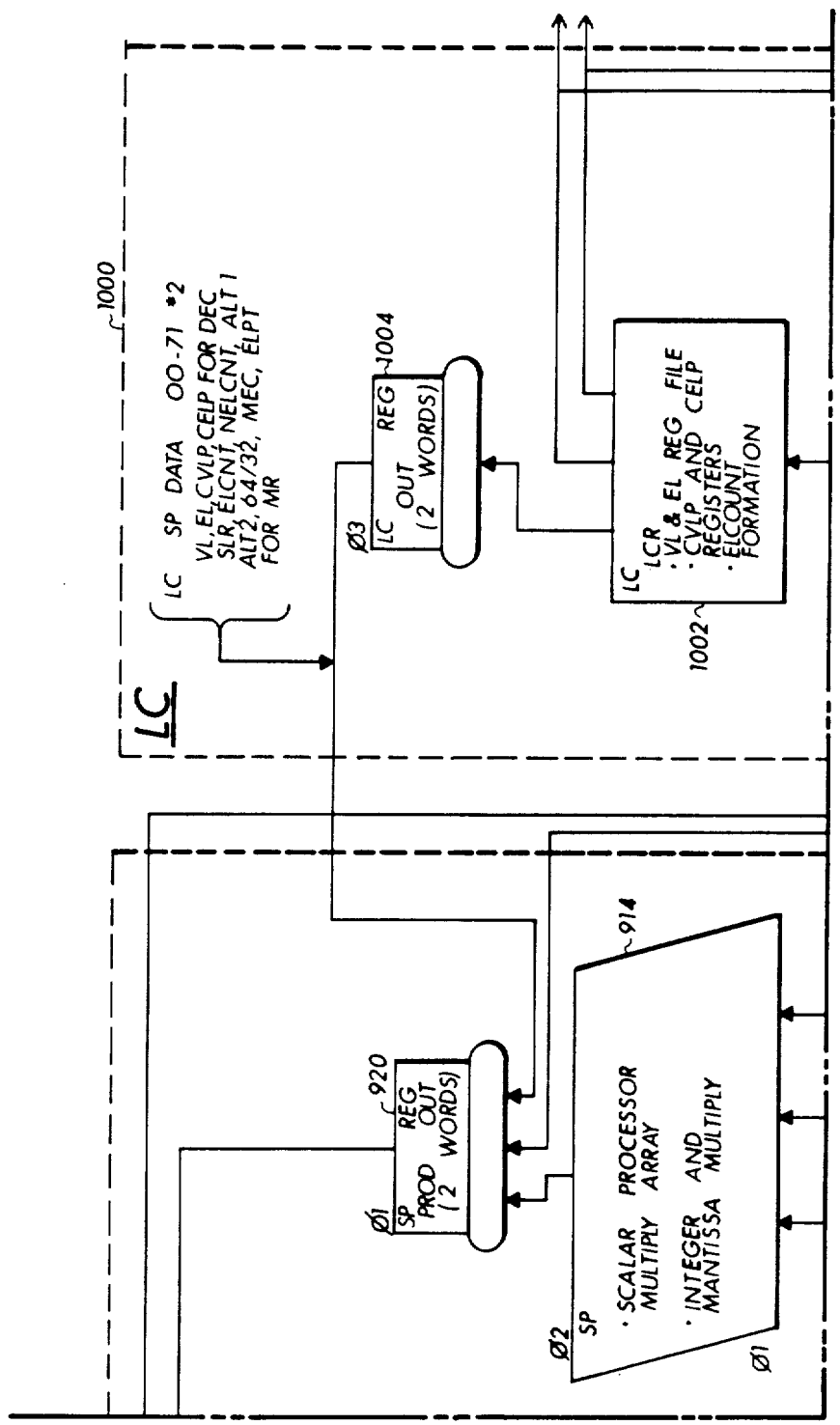
Figure 10:
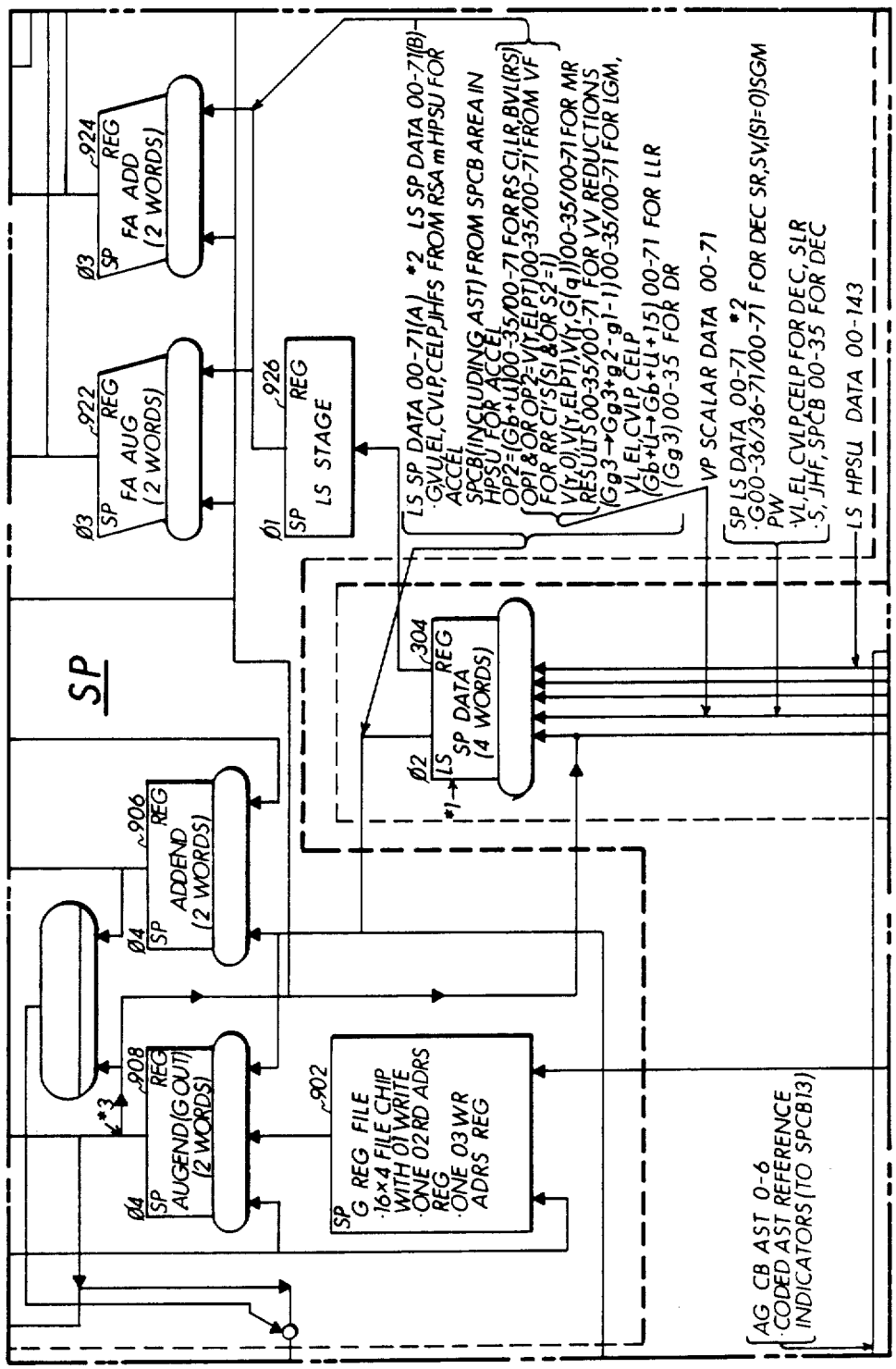
Figure 10H:
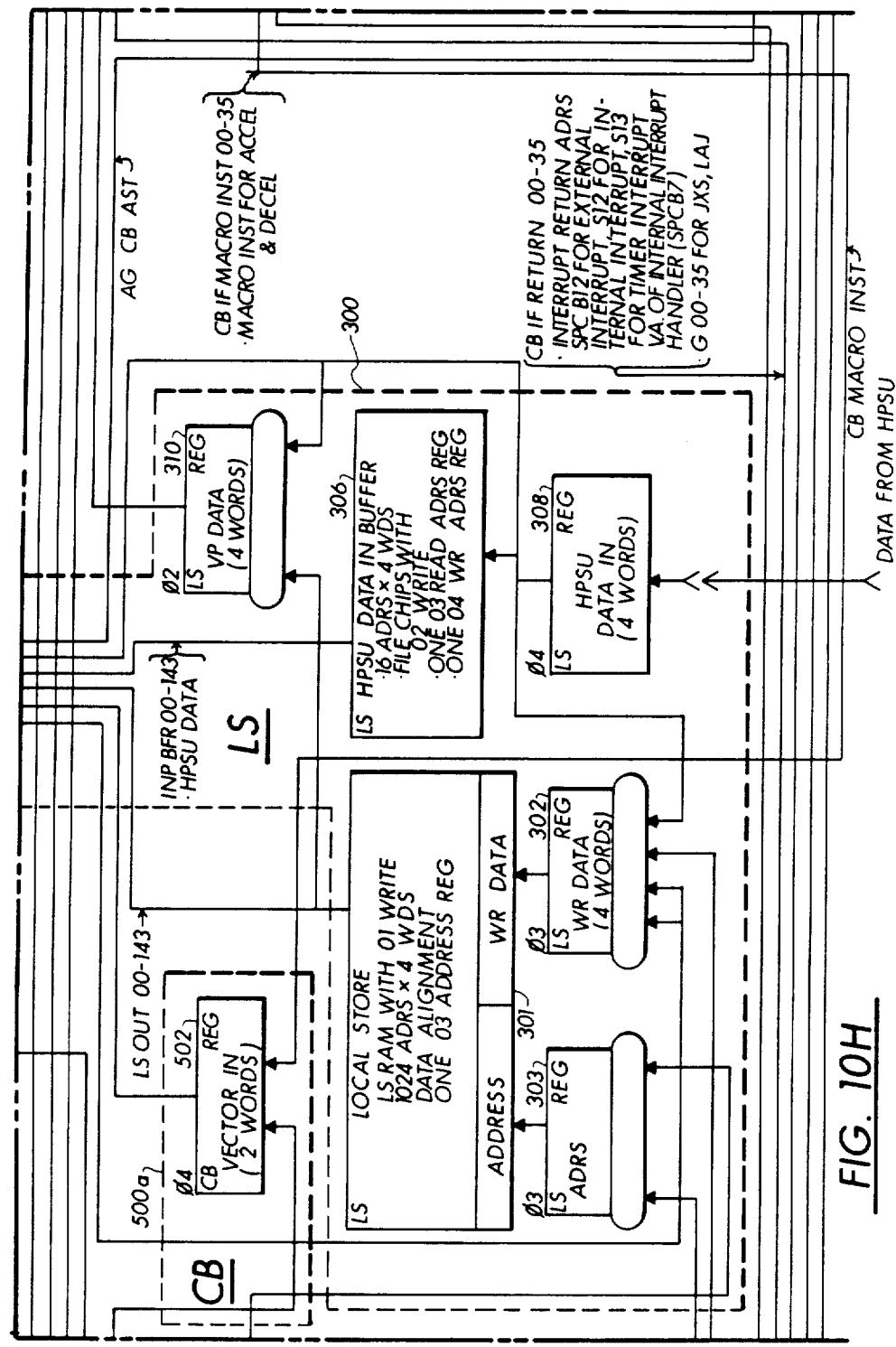
Figure 101:
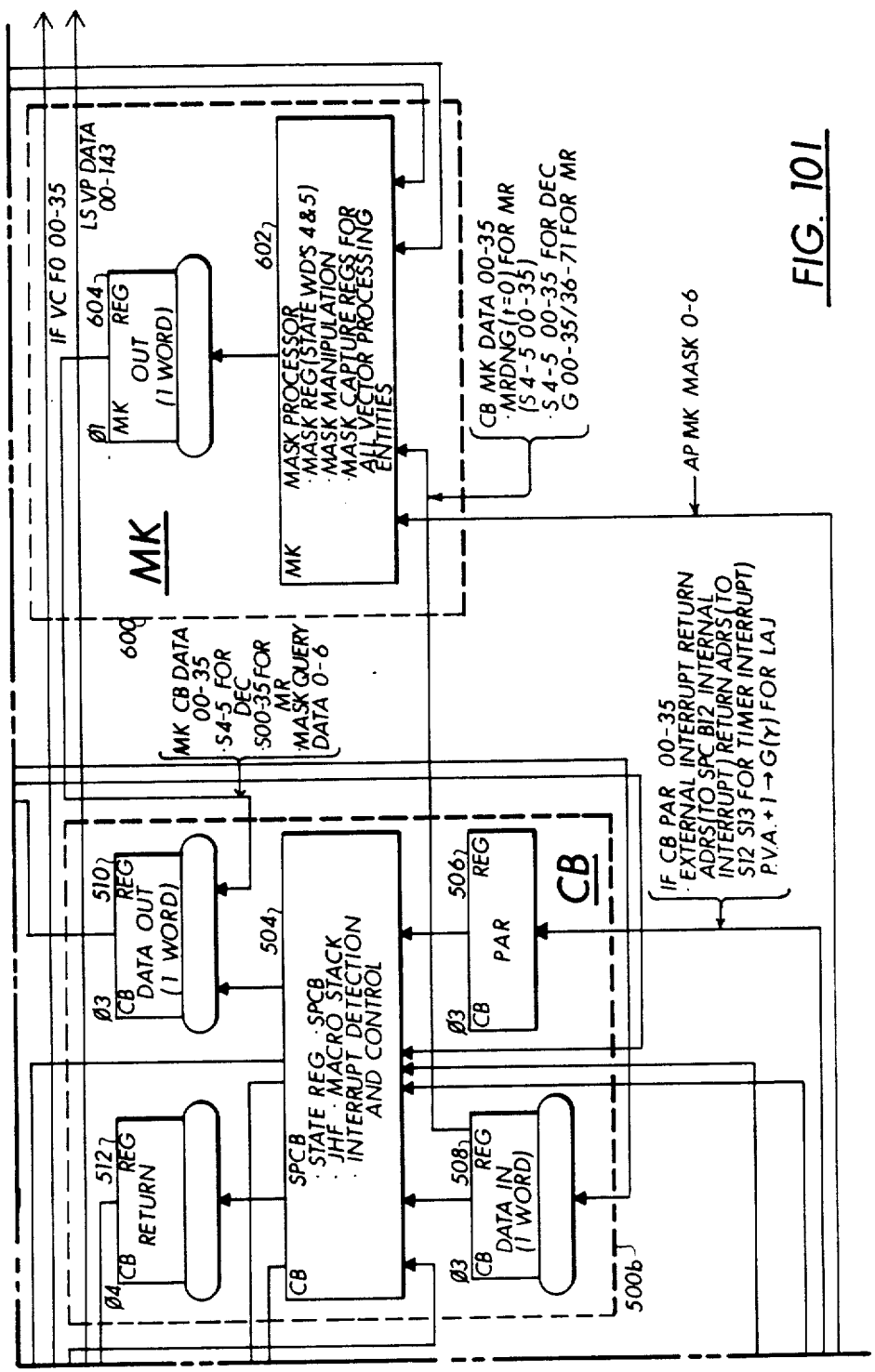
Figure 11A:
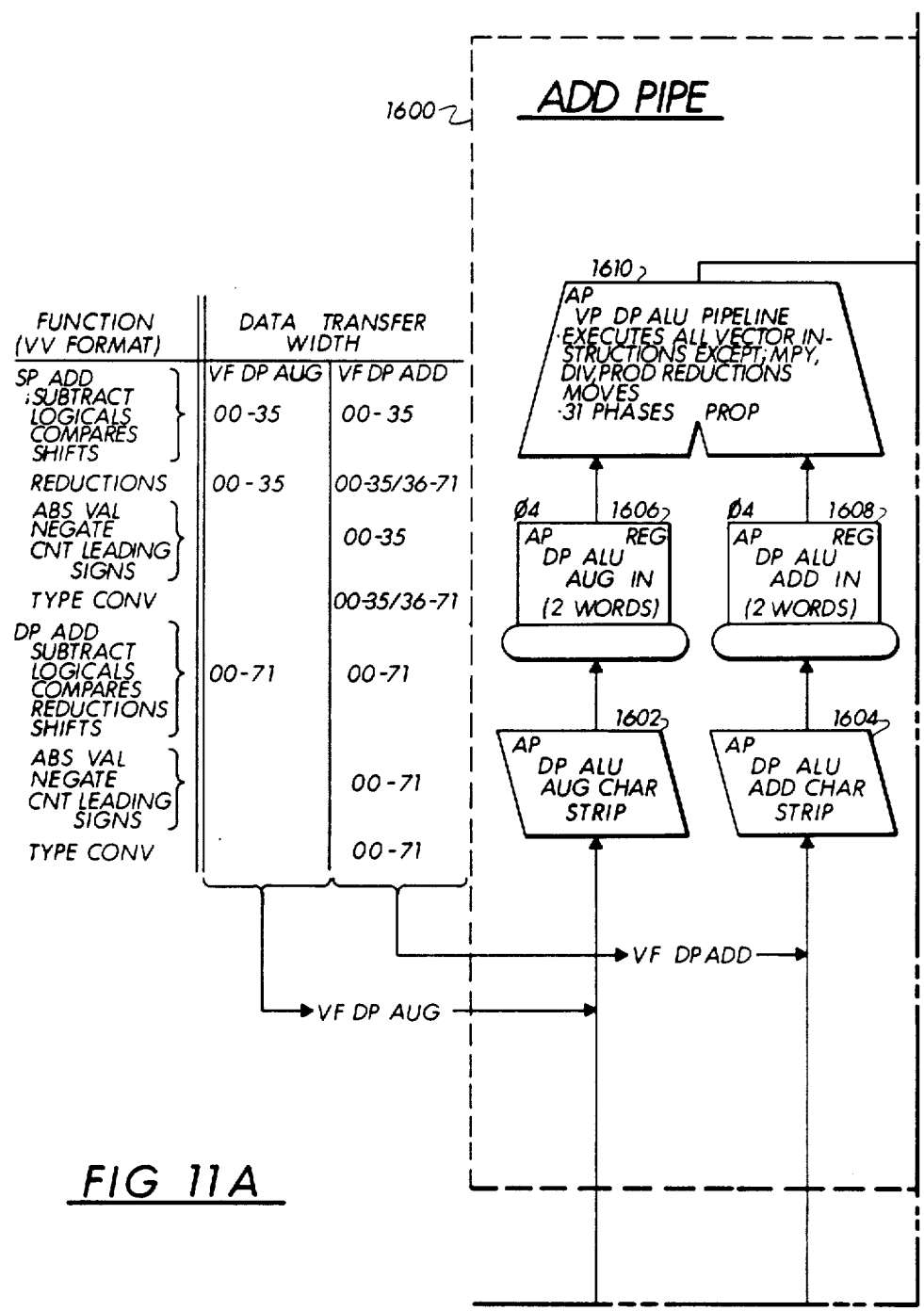
FIGS. 11, 11A-H are detailed logical block diagram of the Vector Processor of FIG. 9.
Figure 11B:
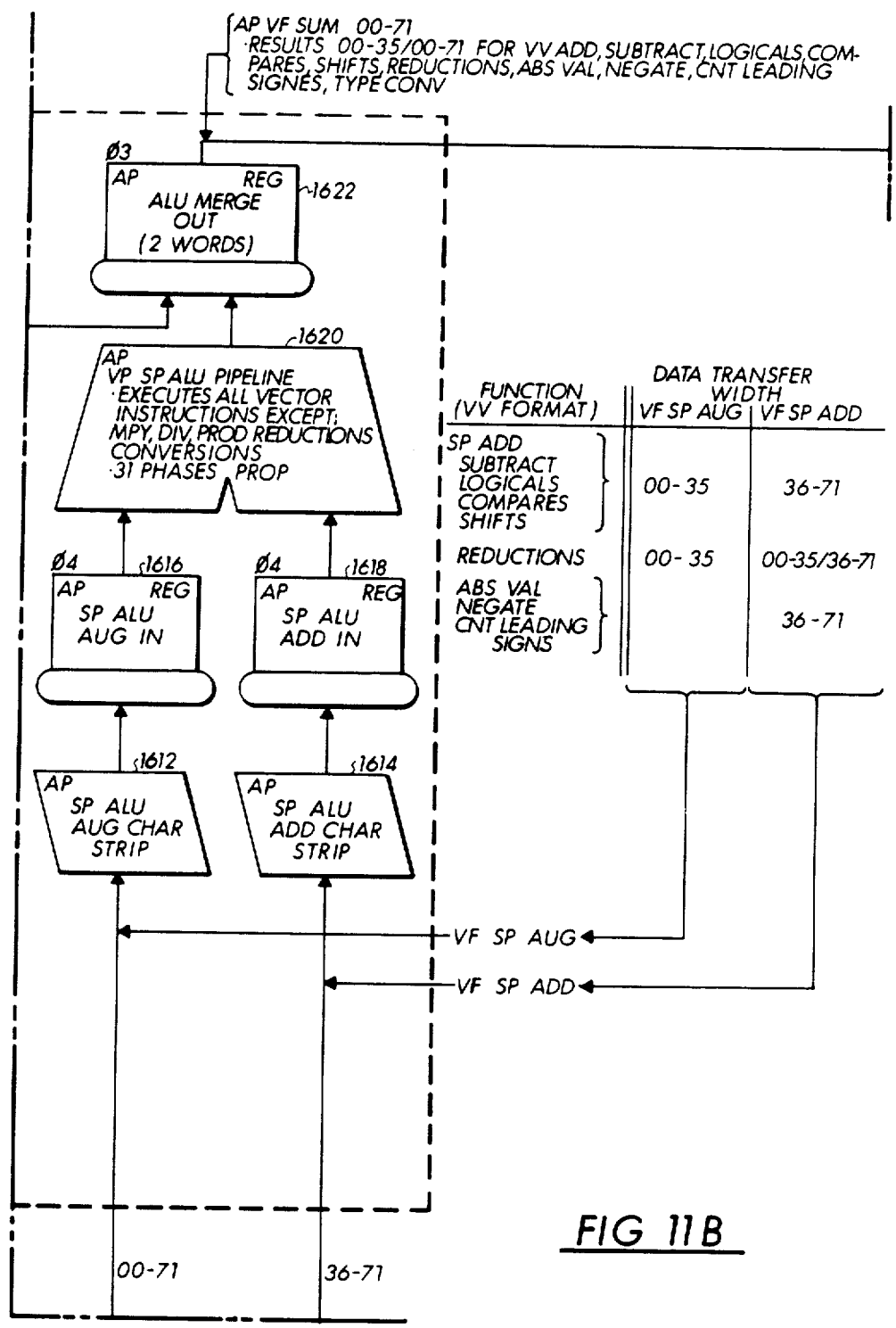
Figure 11C:
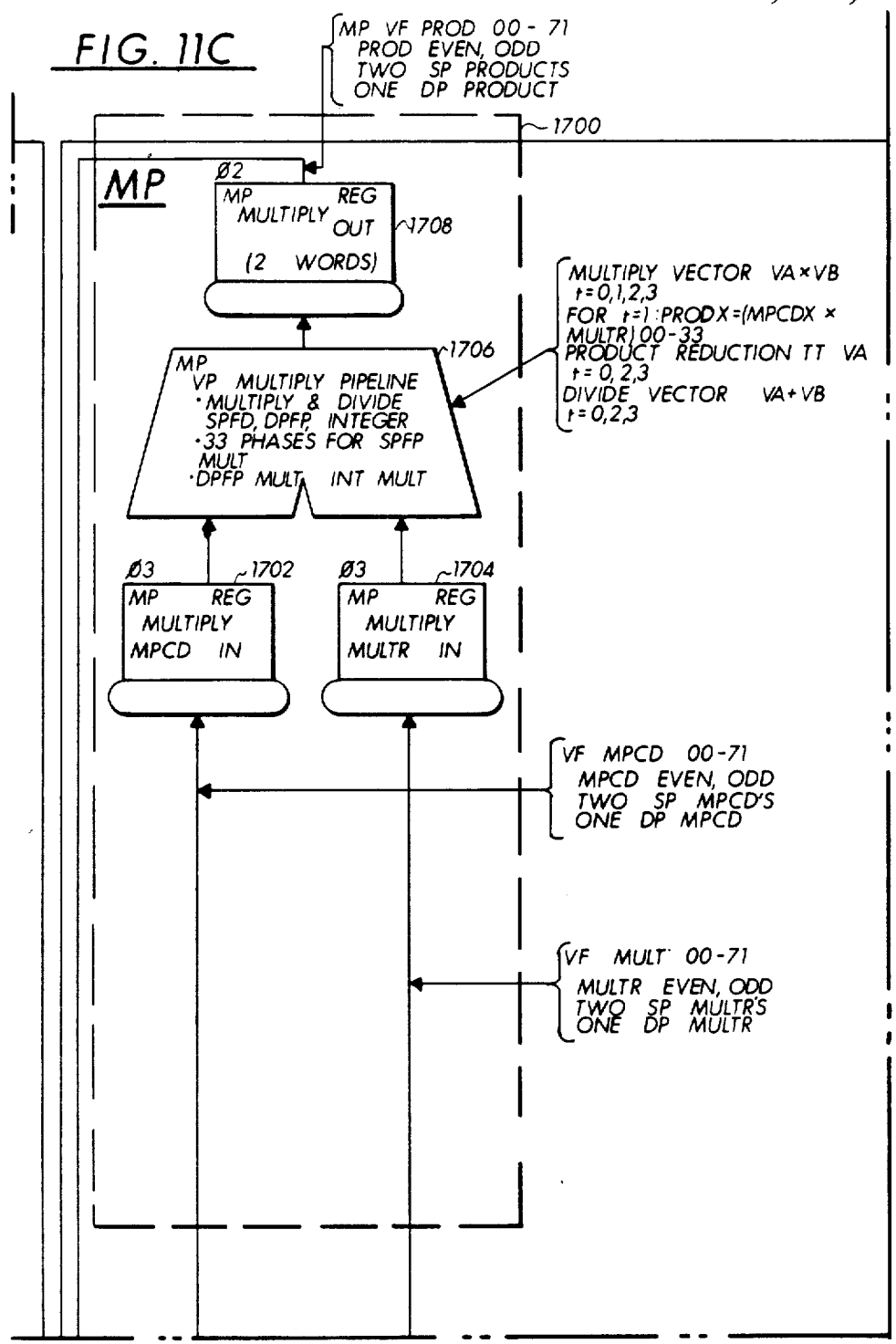
Figure 11D:
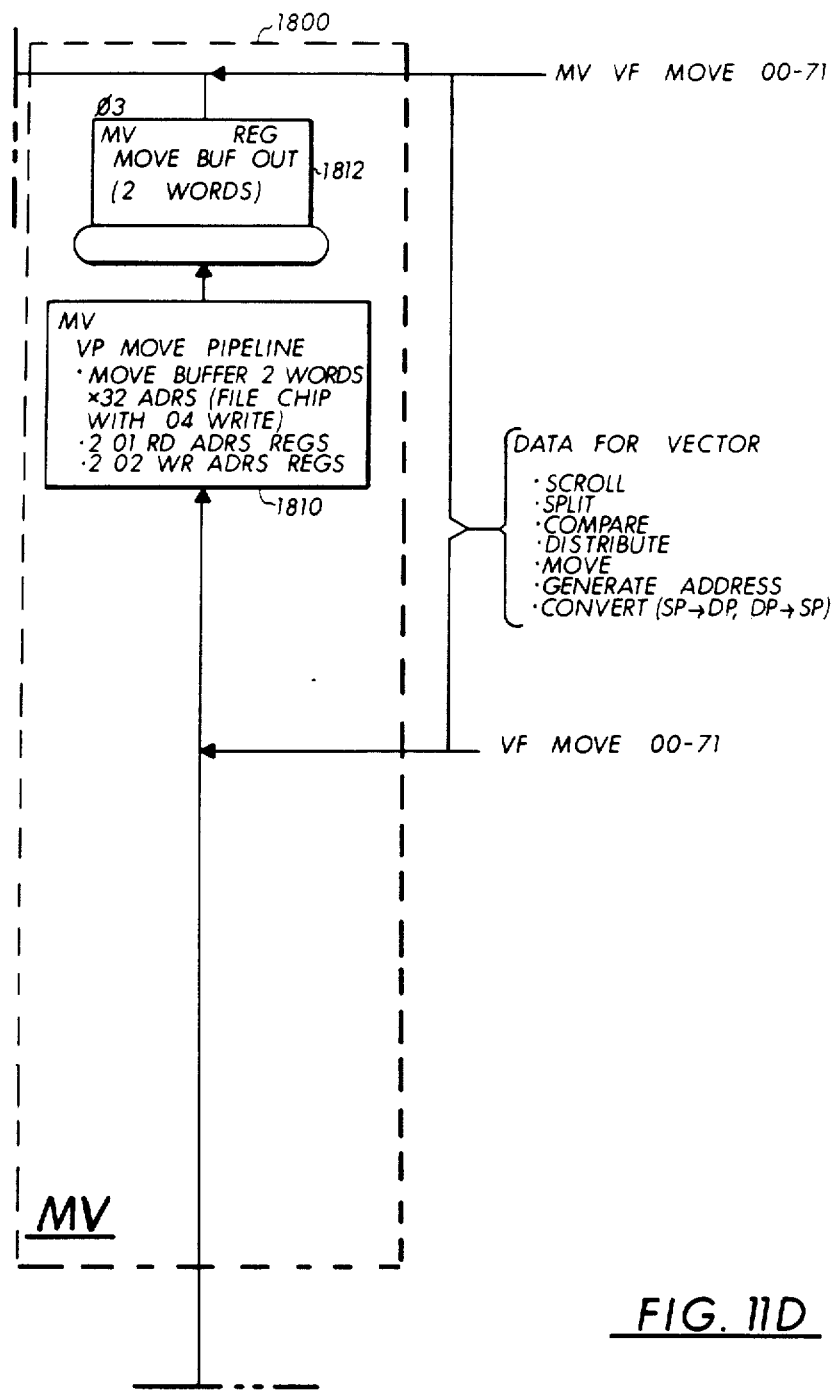
Figure 11E:
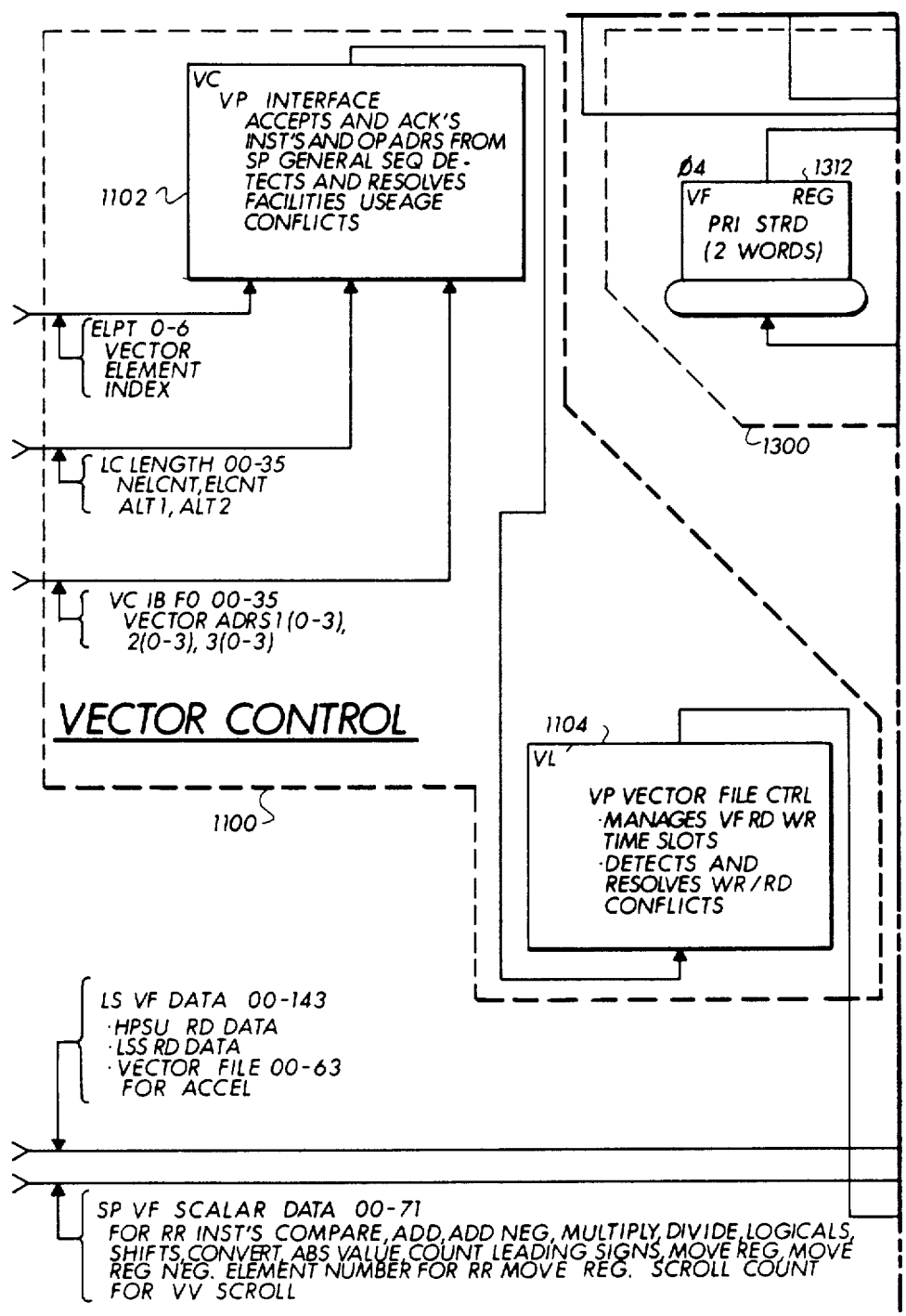
Figure 11F:
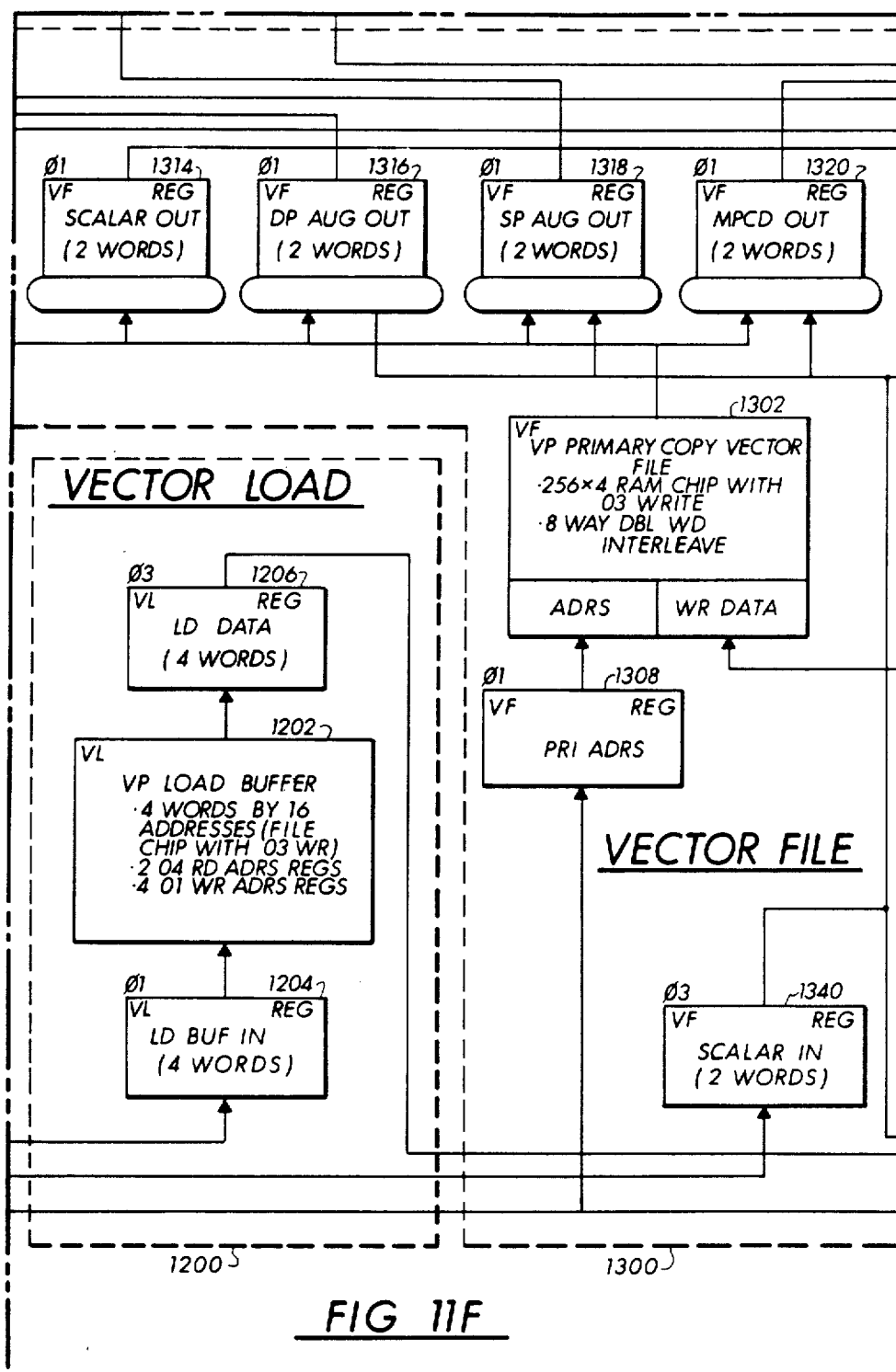
Figure 11G:
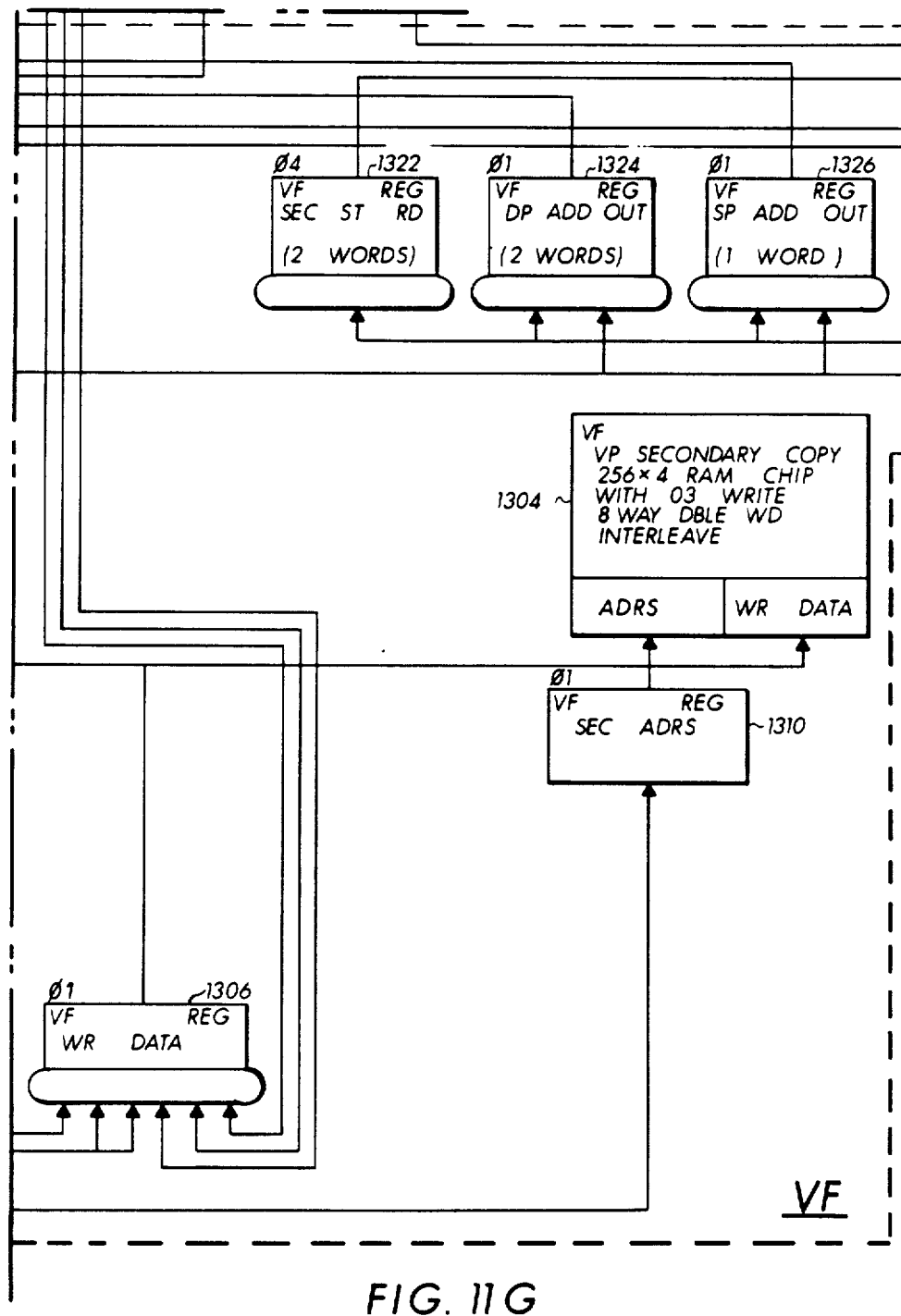
Figures 11, 11H:
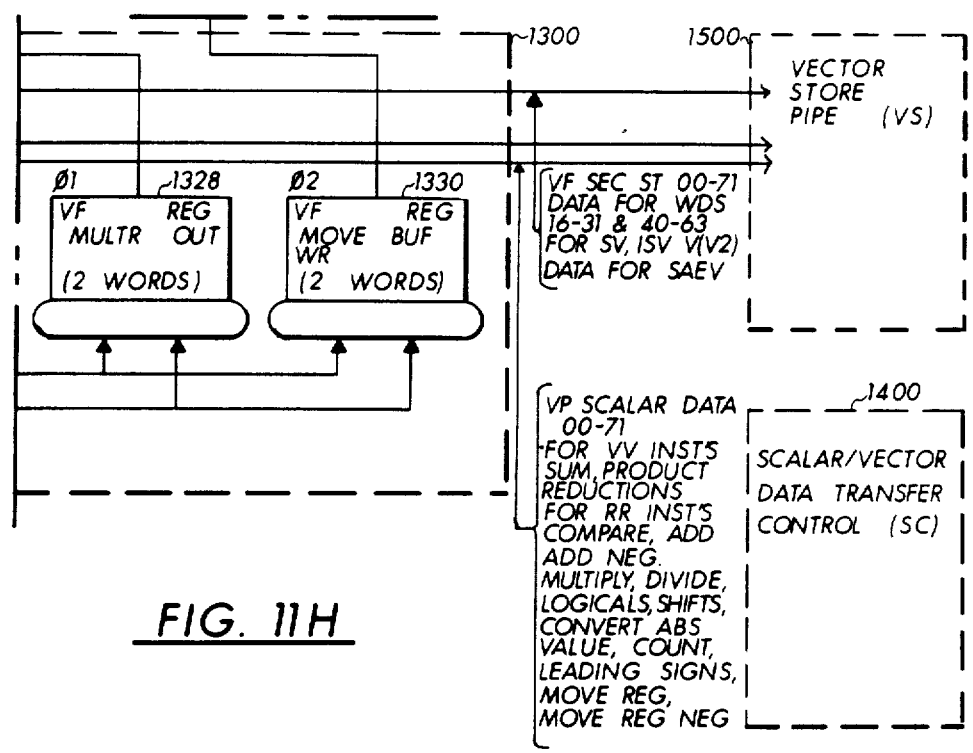

FIGS. 10 and 11 include FIGS. 10A to 10I and FIGS. 11A to 11H and are more detailed logic diagrams of the general block diagrams of FIGS. 8 and 9 and they respectively correspond to the Scalar Processor 150 and the Vector Processor 162 Modules in the Scientific Processor 22. They are discussed at length in a co-pending U.S. Pat. Application Ser. No. 761,201.

The inclusion of the Loop Control logic section in the present Scientific Processor 22 is motivated by the fact that the machine is a Vector Processor. This means that instead of taking data A and data B and adding them together putting the results in data C it takes a whole array A and adds it element by element to array B and then places the results into array C. Further; its inclusion comes from the fact that in the Scientific Processor vector arithmetic is done on a register to register basis. In the present machine there are special registers called vector registers which hold vectors of data over arrays of data and the arithmetic has done a vector register at a time. Now since you cannot, in general, place an entire array into a vector register at one time, and further that almost never will you have an array that exactly fits into a vector register, a vector operation must be done in pieces. This is sometimes called herein strip mining or doing a vector in stripes. The terms strip or stripe will be used often herein and this piece by piece operation will be what is being discussed and the terms are interchangeable.

First, let us discuss a fairly simple example. Suppose you have two statements of FORTRAN do loop 10 for I=one (1) to a thousand (1000) over three arrays A, B and C. This is done by adding B and C element by element and placing the result in A. Since the vector registers in the present processor are 64 elements long, the entire arrays will not fit in the vector registers so you have to do them in strips or stripes and the last strip is going to be an odd size because the entire length of 64 does not divide evenly into one thousand. The way that this will be processed is to do a first strip of 64 elements and a next strip of 64 elements and keep doing these strips of 64 elements until you get to the last piece which is going to be 40 elements long.

Consider that this first instruction is a Build Vector Loop Entry (BVL) and that this BVL is one of the loop control instructions. Now recall that the loop is going to be done over a thousand elements and so the Begin Vector Loop, in this case, is going to be passed a constant length of a thousand and this will be set up in the loop control instruction. The necessary registers to do the vector loop over arrays are going to be a thousand elements long. Now when we come to this load vector instruction this will take data found in the address G1 register and load the elements from there into vector register V1. Now, an implied operand in this load vector operation are vector lengths. The vector lengths come from the loop control section and in this case the vector lengths are going to be called an L count (ELCNT). If a vector instruction is being done, the L count gives the number of elements you wish to process on this pass through the vector loop. All vector instructions are going to be done using the length of L count.

Figure 12:
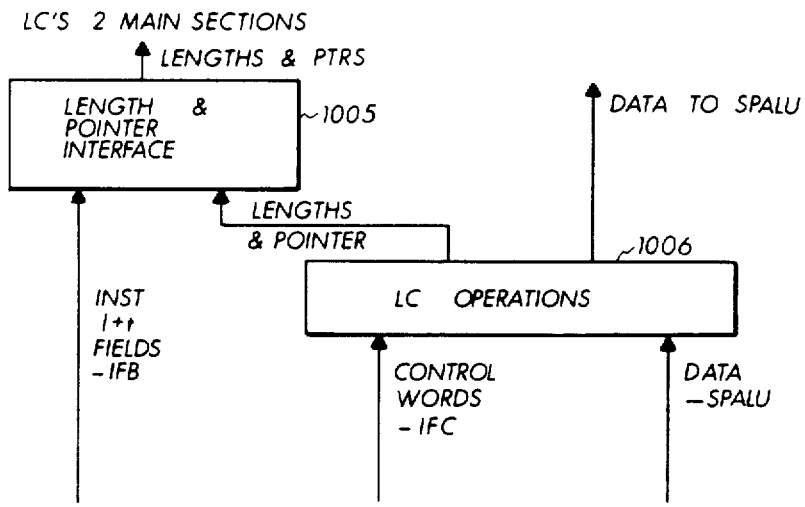
FIG. 12 is a block diagram showing the two main sections of the Loop Control section of the Scalar Processor Module shown in FIGS. 8 and 10.

Consider next an overview of the Loop Control operation. Generally it will tell us what the Loop Control logic selection does and how it is organized. A basic outline is illustrated in FIG. 12 and will be used for the overview. First of all, the load loop control and the store loop control instructions are used for loading up the entire state of the loop control files from the memory and for returning them back to memory.

The Loop Control participates in Scalar arithmetic operations when you are doing Scalar arithmetic on the vector elements pointed to by the element pointer.

Returning to FIG. 12, there are shown the two main sections which the Loop Control section 1000 includes. They are: (1) length and pointer interface section 1005 and (2) LC operations section 1006. Now the operations section comprises the logic for doing the instructions that the Loop Control executes and it includes the files for the Loop Control data. The length and pointer interface 1005 contains the logic for the instruction in which the Loop Control section 1000 participates. So you can see that there is a physical breakdown across the functional lines of the Loop Control that it uses to communicate with the outside world. The data that the Loop Control needs to execute a Build Vector Loop (BVL) instruction or to execute a Load Loop Control instruction or to receive Move data always enters via the Scalar Processor. This is the only data interface that the Loop Control has from the outside world. Likewise, data leaving the Loop Control for the memory or to transmit Move data goes through the Scalar Processor. There are no other direct connections to any of the other data interfaces of the Scientific Processor. The only other interface are the control words which come from the Instruction Flow Control section 400 to control the operations accomplished in the Loop Control. All calculations done by the Loop Control instructions are done in the Loop Control operations section.

Figure 13:
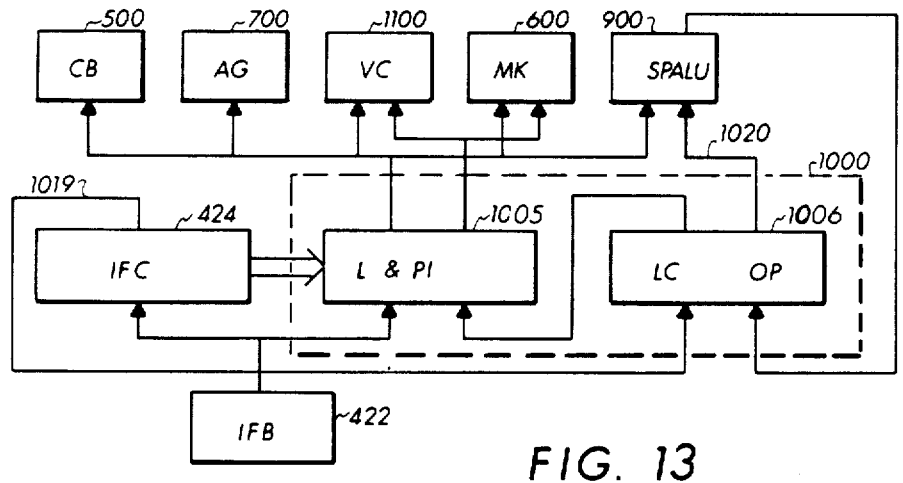
FIG. 13 is a block diagram showing how the Loop Control Section fits into the over-all scientific data processing system.

After the length and the pointer information has been calculated in the LC operation section 1006 they proceed over to the length and pointer interface 1005 where they are available for use in those instructions which require them. So the instructions enter through the instruction stream in which the Loop Control must participate. The control which arrives from the Instruction Flow Control (IFC) section 424 essentially comes from the instruction buffer and goes to the length and pointer interface 1005. What is actually occurring here is the decoding of the length field of the instruction. From the length pointer interface 1005 are lengths and pointers which go off to the various other sections of the Scientific Processor which are actually executing the instruction which has been issued. There are two separate control interfaces and it is important to differentiate between them. As shown in FIG. 13, one interface is the control information for the instructions in which the Loop Control is participating and the other is a control interface for the instructions which the Loop Control itself is required to execute. These latter instructions are under its own control.

The former interface is the Instruction Flow Control (IFC) section 424 which is managing the issuing of instructions in the Scientific Processor and it controls the instruction path that is being followed. The IFB or the Instruction Flow Buffer section 422 contains the instruction caches in its P counter which was previously described. It provides the instructions that go out to the Instruction Flow Control. The interface from the Instruction Buffer 422 enters the length and pointer interface 1005. The broad arrow provides the control interface from the Instruction Flow Control to the length and pointer interface. Within the length and pointer interface the decoding is being performed that goes along with the instruction. This part of the Loop Control is tracking the Instruction Flow Control issue pipe line. It is sending out the appropriate length of pointer to the instructions that are currently flowing through the Instruction Flow interface as it issues instructions to the rest of the machine. Now control words come out of Instruction Flow Control and go off to various sections of the machine and the Loop Control word comes from Instruction Flow Control. It comes through an outer path to the Loop Control operation section. This is where the control words initiate the Loop Control instructions that allow the Loop Control execution instruction to enter. Also note that the data interface from the Loop Control operation section goes to the Scalar Processor (SP) and data is returned from the Scalar Processor back into the Loop Control operation section. The other section of the machine which the Loop Control interfaces with are shown across the top of FIG. 13. These logic sections are the ones which require length and possibly pointer information to execute the instructions that they are receiving from the Instruction Flow Control section 424. Among those are the Mask Processor (MK) 600 which requires lengths and pointers primarily for move and jump instructions and the Vector Control (VC) interface 1100 which, of course, needs length to do any of the vector operations and requires pointers to fetch elements from the Vector Files to be sent over to the Scalar Processor scalar operation. In this case the pointer is used to provide a vector element.

Another section is the Address Generation (AG) section 700 which uses the length to execute the load vector and store vector instruction. These latter are vector operations and they have a length which goes with them. This tells them, via the elements, that the sections for which the AG must generate addresses. It also provides store and load information. The final logic section is the Control Block (CB) section 500. It provides the length supplied to the CB and is done mainly for accounting purposes. There is a register kept in the Control Block section called a quantum timer which decrements for each instruction that is executed and the amount that it decrements for vector instuctions depends partly on how many vector elements that are being executed. Thus, the elements count (ELCNT) basically goes over into the control block section for purposes of deciding how much to decrement that counter.

Returning to FIG. 12 consider again the length and pointer interface 1005. First of all the length and pointer interface provides length information to all vector instructions. It provides the pointer to arithmetic operations performed on vector elements. It also provides the length and/or pointer to all move and jump instructions that use the Mask Processor 600 and its functions. The length and pointer interface also must track the instruction issue pipe line shown in FIG. 15 because it is, in essence, a part of the instruction issue pipeline. It is not in the Instruction Flow Control section 424 but it duplicates many of the registers contained therein for delivering the length and pointer information to the instructions as they need them. This is so because these lengths and pointers become available out of the length and pointer interface at the same time the control word becomes available out of the Instruction Flow Control section.

Figure 14:
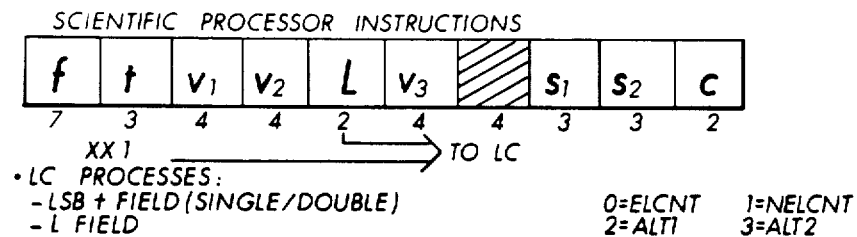
FIG. 14 illustrates the format of a scientific processor instruction with an explanation of the particular bits associated with a Loop Control process.

Referring next to FIG. 14 there is shown the Scientific Processor instruction format. First we have the element field L which is a two bit field that selects a vector length. The two bits provide four signals named the element count (ELCNT), the next element count (NELCNT), the ALT 1 and the ALT 2 fields. Part of the t field also goes along with this. The t field is a three bit field which designates the type of data upon which the instruction is going to execute. The least significant bit (LSB) of the t field indicates whether a single precision or a double precision field is applicable and that goes into the length and pointer interface of the LC. If you have an element count that is too large for the instruction that is being done, the Loop Control uses this LSB bit to trim the element count to 32. The length and pointer interface processes this least significant bit (LSB) of the t field along with the L field to select one of these lengths. These length indications come up at the same time as the control word is made available from the Instruction Flow Control section 424 and both are delivered to the receiving section.

Figure 15:
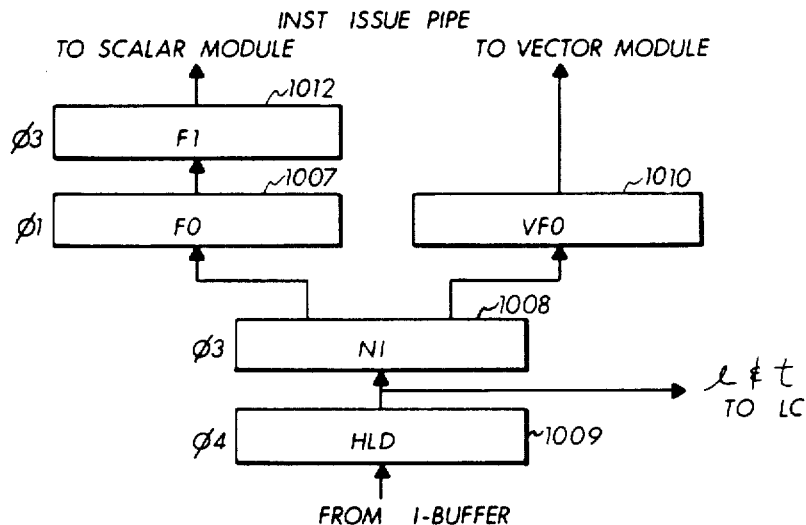
FIG. 15 is a block diagram of an instruction issue pipe showing how it is received from the instruction pipe and how it is separated and sent to the SPM and the VPM.

Next, reconsider FIG. 15 which illustrates the registers in the instruction issue pipeline. Instructions arrive at the bottom from the Instruction Buffer which is a cache containing up to 4K instruction words and enters the hold register 1009. They flow from hold register into the next instruction (NI) register 1008. If they are heading for the Vector Module they go through a register called the VFO register 1010, however, if they are headed for the Scalar Module they pass through the F0 register 1007 and usually through the F1 register 1012. The control words are issued to the Scalar Module out of the F1 register and to the Vector Modules from the VFO register. This is a fully pipelined instruction issue section and it is possible to issue instructions at a rate of 1 per cycle providing there are no other conflicts within the machine. For example, at some particular phase 4 ($\phi 4$), the pipe could read a load G instruction into the hold register. At the next phase 3 ($\phi 3$) it can move into the next instruction (NI) register and in the following $\phi 4$, another load G instruction can enter the hold register. At $\phi 1$ this will move into the FO register and on the next $\phi 3$, if these instructions are not blocked for some reason, this load G instruction will move into the F1. The following load G instruction will be loaded in and in the next phase still another load G can enter the hold register. It is readily seen that instructions can flow through this part of the pipeline at a rate of 1 per cycle.

Now for vector instructions, they follow the first part of the pipeline in the same fashion. They start out in the hold register since all instructions arrive from the Instruction Buffer into the hold register, then move into the next instruction (NI) register and at the following phase 4, provided the rest of the registers are free to issue a vector instruction to the Vector Processor, an add vector, for example, on phase 1 will move into the VFO register. In the following phase 3, this instruction will issue across to the Vector Module and this add vector instruction will move into the next instruction. Now because of the way the interface between the Vector Module and Instruction Flow Control operates, the VFO is always tied up for two cycles when issuing a vector instruction. So on the next phase 1, this add vector instruction in the next instruction NI register is not allowed to move into VFO but will hold there for a cycle. Notice that the instructions move through hold register and next instruction (NI) register in order but because of the fact that the instructions are split and follow different paths after the next instruction register they can get out of order once they have passed through the NI.

Now in some cases there are instructions which are sent to both the Scalar Processor Module and the Vector Processor Modules. These are called dual instructions. For example, the load vector instruction requires participation by both sections and both of the Vector Module and the Scalar Modules that require that vector control and the vector load section in the Vector Module participate in its execution. It requires the Address Generation which gets its instructions from the Scalar Module. So this instruction must hold in the NI until both the FO and VFO registers are free. At that point, the appropriate decode from each side goes into F0 1007 and into VFO 1010 at the same time. So the key points to be made here are first that the instructions stay in order through the next instruction NI register. Next, if there are no conflicts the rate through the F0 1007 and the registers F1 1012 can be as high as one per cycle, although it need not be, if the Scalar Processor or the other processors which take control words from F0 and F1 are not ready.

Next, the maximum rate through the vector F0 latch 1007 is one every two cycles, although it need not be that high if the Vector Module is busy and backed up. Finally, the F0 1007 and the VFO 1010 are, in most cases, completely independent and instructions can go through them independently.

Figure 16:
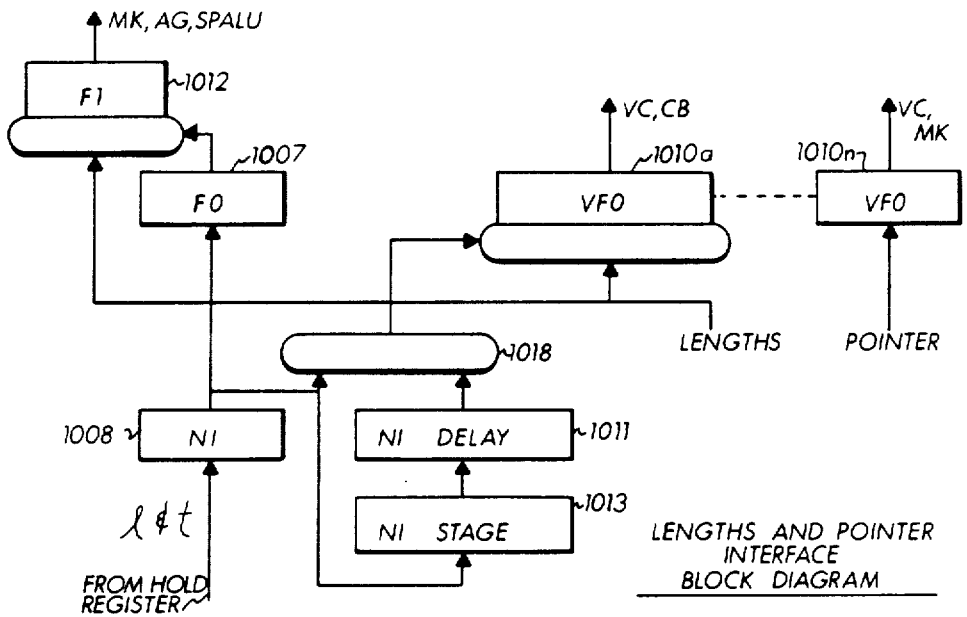
FIG. 16 is a block diagram showing the interface portions of the length and pointer portions of the Loop Control section.

Parts of this instruction issue pipe are in the Loop Control (LC) section as shown in FIG. 16 which illustrates a simplified block diagram of length and pointer interface. Corresponding to the NI register, there is also a small next instruction (NI) register 1008 in the length and pointer interface block diagram. The length L field and the t field enter the NI register 1008 from the hold register. Part of the VFO also exists in Loop Control as does part of the F0 register. Information from the NI or the FO registers select, in the F1 register, the desired length information received by the F1 register. So information coming from the Loop Control and going to other sections of the machine is coordinated with the VFO going to the Vector Control (VC) section and to the Control Block (CB) section to do the accounting of the vector instructions passing through. This information also includes the lengths that were calculated in the Loop Control operation section and selected in the VFO. It was based on information in the next instruction latch. The Vector Control section of the Mask Processor includes pointers which are calculated in the Loop Control operation section and are coordinated in the VFO register. For Scalar instructions or operations which require lengths, the length field and the t bits enter the NI latch pass through the FO register selectors and into the F1 latch. From there lengths are going to the Mask Processor for Move and jump operations. There are also lengths going to the Address Generation section for load vectors and store vectors. Further, length information is sent to the Scalar Processor to generate index vector instructions. Although this is a vector instruction most of the actual work of generating the address is done in the Scalar Processor and therefore the Scalar Processor requires the length in order to execute that instruction. Now since none of the controls for any of the NI, F0 and F1 registers is in the Loop Control, the information comes from the Instruction Flow Control section 424.

Two registers, not in the IFC section, that exist in the Loop Control section are the NI delayed latch 1011 and the NI stage latch 1013. The reason is that a vector instruction can pass through the instruction pipeline, via the NI and into the FO and hold there for various reasons. One possibility is that one of the data items that is required for a vector instruction is not ready. For instance, you may be waiting on mask data to get loaded into the mask or you may be waiting for some Loop Control data to be calculated. A BVL instruction, for example, especially if it is the length that is being used, arrives from the HPSU. To do this, the data must come from the HPSU via the Scalar Processor, and then on to the Loop Control. The Loop Control section has to calculate the element counts and the next element counts and send them over the length and pointer interface of the LC. It is easily realized that delays occur quite often where it is necessary to wait for calculations to be performed on the data passing through the pipeline.

At this point, the other section of the Loop Control operation section will be discussed. Now recall that in the length and pointer interface, control is from the Instruction Flow Control Section 424. So the LC contacts the IFC and receives the length (L) and t field bits from the Instruction Buffer and receives the lengths and pointers from the Loop Control operation section. Now the Loop Control operation section 1006 contains arithmetic generation, this is the part of the logic that does the loop control arithmetic. It contains the Loop Control files, all of the controls for the instructions hat the Loop Control executes.

The following is a short outline of the LC operation section 1006, what it contains, what it accomplishes and what it executes. Those instructions under its control are the Build Vector Loop (BVL), the Jump Vector Loop (JVL), the Begin Element Loop (BEL), the Jump Element Loop (JEL), the Adjust Loop Register Pointer (ALRP), the Load Loop Control Register (LLCR), and the Store Loop Control Register (SLCR). The LC operation section also contains the files that are defined, namely the vector loop files and the element loop files, as well as the pointers in those files i.e. the CVLP pointer and the CELP pointer which point to the Current Vector Loop and the Current Element Loop.

Figure 17:
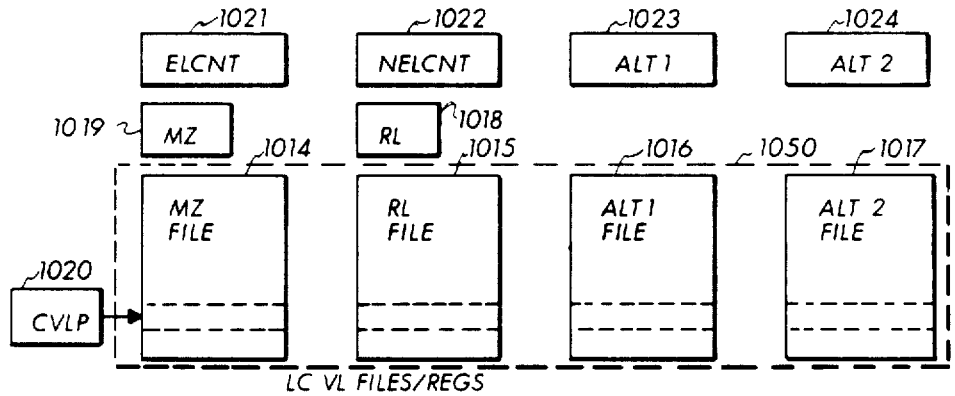
FIG. 17 is a block diagram illustrating the Loop Control Vector Load Files/Registers.

Also included in the LC operation section 1006 is the arithmetic logic which calculates the lengths and pointers and the control for the execution of those instructions which it executes. Now the Loop Control vector loop files and the registers are illustrated in FIG. 17. They consist of the MZ or the strip size file 1014, the remaining length (RL) file 1015, the ALT 1 file 1016 and the ALT 2 file 1017. Also there is a pointer, the CVLP or Current Vector Loop Pointer 1020, which points to a common slice across all of these files. All of these files together will be called the files 1050. This indicates which of the current entries in this file that are used for the current execution level in your loop. There are also registers in this section which contain the currently active copies of all of these files. There is the MZ or current strip size register 1019. Also the current remaining length RL register 1018 which usually contains the current next remaining lengths, a current copy of the element (L) count 1021, a current copy of the next element count 1022, a current copy of ALT 1 1023, and a current copy of ALT 2 1024.

The strip size or MZ file 1014 refers to the loop that is to be set up with the BVL instruction.

Figure 18:
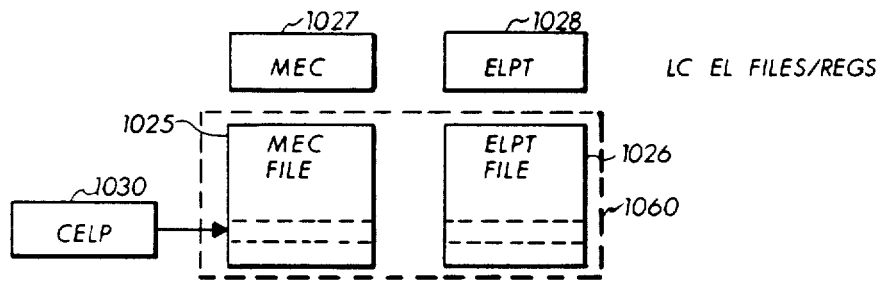
FIG. 18 is a block diagram illustrating the Loop Control Maximum Element count (MEC) Files, the Element Point Files as registers.

As shown in FIG. 18 a very similar arrangement occurs with the element loop (EL) files and registers. There is the MEC file 1025 which is the Maximum Element Count file. The Maximum Element Count is set up by the Begin Element Loop instruction at the beginning of the loop and it determines how many times it will go through the loop. Simultaneously, it clears the ELPT file 1026 entry that is being used and each jump element loop increments the element pointer and the corresponding element pointer file entry. The currently active copies of MEC and ELPT are kept in active registers 1027, 1028 and, of course, there is a current element loop pointer 1030 which points to the current parts of the files 1025, 1026 that are being used.

Next, representative instructions will be discussed in conjunction with the Loop Control logic section. In addition, Loop Control synchronization with the Instruction Flow Control will be described so that Instruction Flow Control can know when the lengths and pointers are ready to be used by the instructions. We are also going to talk about the Scalar Processor synchronization. Data comes from or goes to the Scalar Processor from the Loop Control section and there is some synchronization required at the data interfaces and so we will be talking about what synchronization is required to handle those data exchanges.

Figure 19:
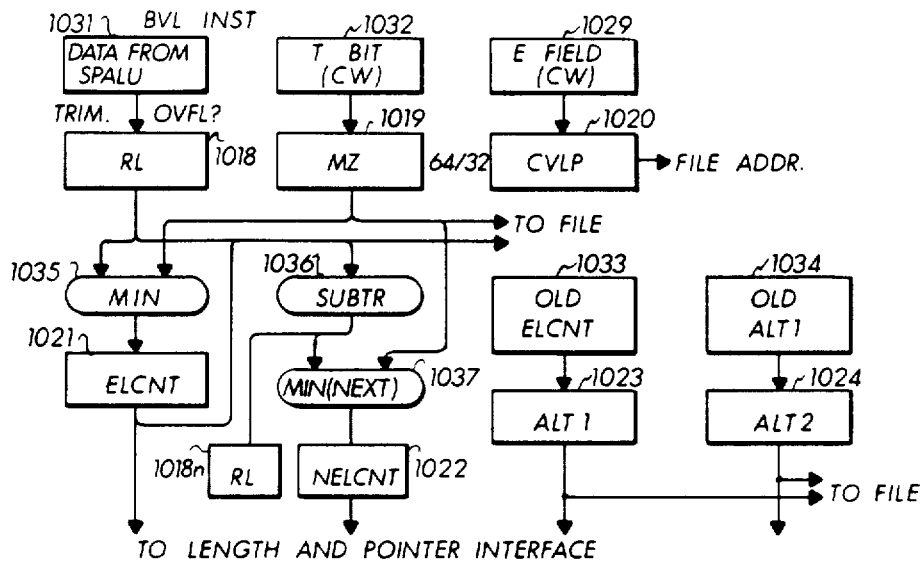
FIG. 19 illustrates a block diagram of the register path of a Begin Vector Loop (BVL) instruction from the Scalar Processor Module to the length and pointer interface.

The first instruction for discussion is the Build Vector Loop (BVL) instruction shown in FIG. 19. The Build Vector Loop instruction starts by getting data from the Scalar Processor 150. This data incudes the total element length of the vectors which are to be executed. Also included is a t bit which is issued to the Loop Control or to the Instruction Flow Control section 424. This, of course, enters into the calculation of the element count (ELCNT) 1021 and next element count (NELCNT) 1022 as does the E field of the instruction control word which is received from Instruction Flow Control 424. That information enters the Current Vector Loop Pointer 1020 and becomes the new file pointer into which you are going to Build the Vector Loop entry. The E field in this instruction is just another name of one of the general register G fields. The t bit then arrives and the control word is copied into the MZ register 1019 and eventually it is written into the MZ file 1019.

When the data finally arrives from the Scalar Processor 1031, it is initially trimmed to a 30 bit length. The vector loop entries only have room for 30 bits of the remaining lengths for the vector, so only vectors with that many elements in them may be done. Whatever elements that remain are sent to the remaining length register 1018. If there are any bits set, among those upper six bits, it causes an overflow interrupt condition which prevents the calculation of a negative 0, thereby sending it over to the Loop Control section. Early in the execution of the BVL instruction, the old element count 1033 is copied into the ALT 1 register 1023 and the old ALT 1 values 1034 are copied into the new ALT 2 register 1024. This is only used in more advanced code optimization techniques. The calculation of the element count 1021 and next element count 1022 is more interesting. First of all, consider the remaining lengths. The RL field 1018 and the MZ field 1019 are compared in MIN comparator 1035 to determine the smaller of the two and it becomes the element count 1021. Now to refer back to the original plan, if you have a vector length of 100 and the single precision vector, the maximum number of elements 1019 (the MZ) also called herein the strip size is 64. Since 64 is smaller than 100 that is the value that is going to be selected for the element count 1021 and that is the value that is going to be used for this pass through the loop. Now on a single precision operation if a BVL, with the length of 17, occurs, the strip size is set to 64, since this is the maximum number of elements that could be done in a strip. The remaining length of 17 really means that only 17 elements remain to be done so the smaller of the two (17) is placed into element count and that is the number that is to be done this time through the loop. Now the element count 1021 is to be subtracted 1036 from the current remaining lengths 1018 so that whatever remaining elements are performed on this pass through the loop is subtracted from the remaining length. The same type of minimum operation is performed with the strip size, and this minimum 1037 is RL 1018 minus the element count. This becomes the next element 1022 or the number of elements that can be done the next time through the loop.

Figure 20:
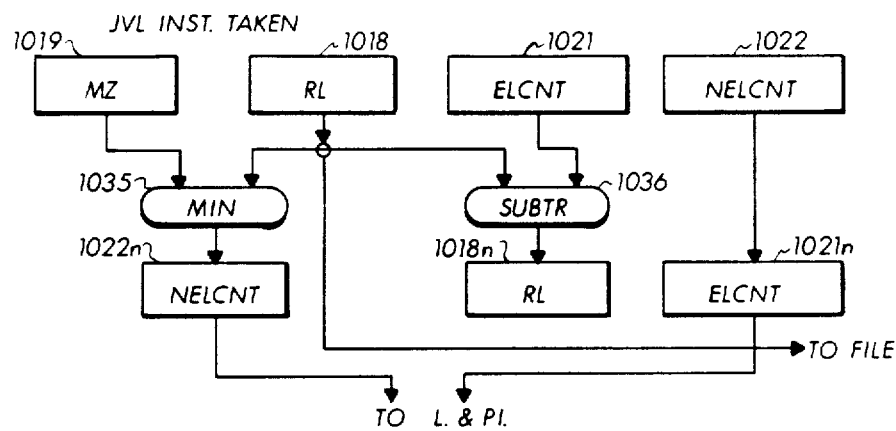
FIG. 20 is a block diagram showing the register path taken by the Jump Vector Load Instruction.

Note what happens with the JVL instruction which is shown in FIG. 20. It actually subtracts the elements from the remaining lengths and stores the result as a new remaining length, and that is the next element count. This is actually implemented in Loop Control by having the LC continously looking ahead to the next JVL instruction to occur. So instead of stopping with a subtraction, a new NELCNT 1022N is formed by actually calculating the lengths that remain after the next JVL is executed and storing that number in the JVL register. It is seen from this description that there is always searching going on in the Loop Control section, and this means that care must be taken before concluding some of the operations, since all discovered inputs must be included.

Now the value that is actually kept in the Loop Control file for the remaining length is the value that you would expect after the execution of a BVL instruction. This is the next remaining length value 1018N. It is only after this value has been written into the LC file and the LC file has been updated that it actually calculates the new remaining lengths that are stored into the active registers. In effect, this is just a look ahead to the next JVL instruction, since it is assumed that this is the next instruction, because that is what usually happens.

After the new strip size information is received to do a remaining length operation on the CVLP from the control word and the new ALT 1 and ALT 2 is received, all of this information is sent to the file. Next, the CVLP comes from the file address as does the RLMZ on an ALT 2 transfer. This is all written into the file.

Now the Build Vector Loop (BVL) instructions accompany the Jump Vector Loop (JVL) instruction and they close the Begin Vector Loop. The operations defined by the Begin Vector Loop in the Loop Control operation is as follows. The next element count, already in existence since a BVL instruction was just executed, sends copies directly into the element count register. As noted, this configuration occurs when a JVL instruction is taken, as illustrated in FIG. 20.

In the case where the Jump Vector Loop (JVL) instruction is not taken there are not any elements processed on the next trip through the loop.

Figure 21:
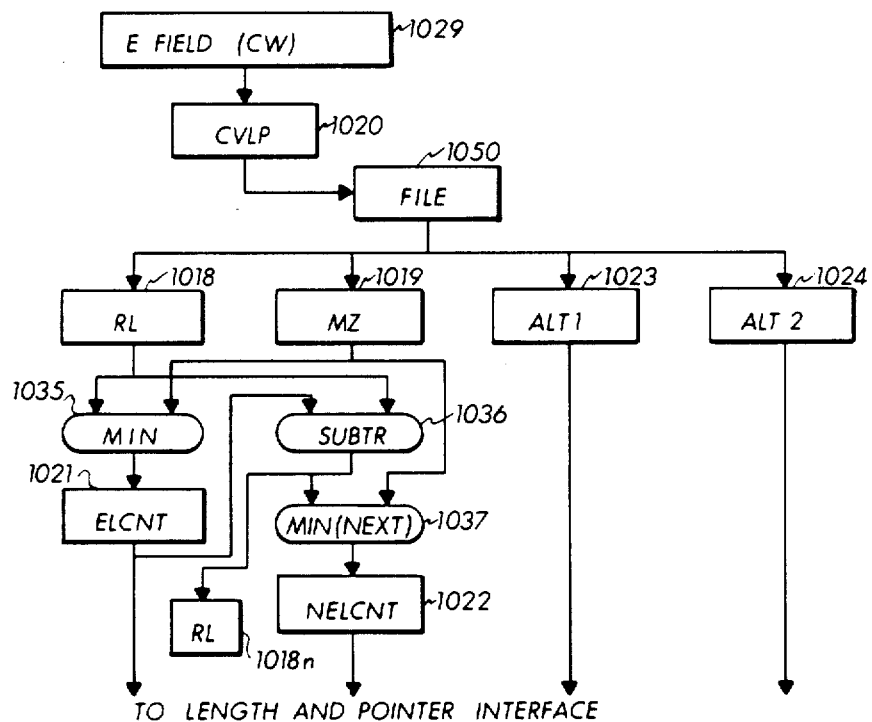
FIG. 21 is a block diagram showing the register path taken by an adjust Current Vector Loop Pointer (CVLP) instruction.

Refer next to FIG. 21 which is the Adjust CVLP instruction sequence. This sequence allows a change of the current Vector Loop pointer so as to read a new set of Vector Loop entries, a new strip size and new remaining length, a new ALT 1 and a new ALT 2 into the active registers.

First, a new E field 1029 is received out of the control word from the Instruction Flow Control. This field moves into the Current Vector Loop Pointer 1020 (CVLP) and that is used to address the File 1050. It reads a new value of ALT 1, 1023 and new value for ALT 2 1024. It also reads new values for remaining lengths and strip sides. The minimum 1035 of the remaining lengths 1018 (RL) and strip size 1019 (MZ) enters the element count register (ELCNT) 1021. The remaining length 1018 is subtracted 1036 from the ELCNT 1021 and the minimum 1037 count between that difference 1036 and the strip size MZ, 1019 becomes your next element count 1022. The result of that subtraction is also stored in the remaining length register 1018N so that we are prepared for the next JVL instruction. The main items to remember about Loop Control is; (1) it is always in the BVL/JVL sequence; (2) it is always assumed that a Jump Vector Loop instruction is about to occur and the jump is going to be taken; and (3) it has the values that are necessary to execute the Jump Vector Loop precalculation.

Moving next to the Begin Element Loop instruction shown in FIG. 22 together with the Jump Element Loop instruction taken shown in FIG. 23 and not taken as illustrated in FIG. 24, the Begin Element Loop takes a length field 1033 (1) out of the control word. This control word (CW) is an F1 time control word and it includes a length field (1) for a Loop Control instruction.

Now this length field (1) is used to make a selection of what is to be stored in the Maximum Element Count register 1027 (MEC). The selections include: the Element Count, the Next Element Count, the ALT 1 and the ALT 2. Now, at the same time, the Element Pointer 1028 (ELPT) register is cleared to 0 because as we go through a BEL/JEL loop, this register (ELPT) is incremented by one. These successive numbers are used to fetch successive elements out of the Vector File. After both the MEC 1027 and the ELPT 1028 register have been calculated, the Vector File is written. Of course, the file address is CELP 1030 and that address is from the E field 1029 of the control word.

Now the Begin Element Loop instruction, as was mentioned earlier, is a jump instruction because if you start at an element count of 0 that means that it is not desired to process any elements so a jump is performed to the Instruction Flow Control to start the loading of a new sequence.

The Instruction Flow Control (IFC) calculates the new P counter and everything else that is necessary to perform the jump. The case of the Jump Element Loop taken is shown in FIG. 23. It is a fairly simple illustration. It takes the ELPT 1028 and adds one to it and then returns it to the ELPT 1028N, as well as writing it into the Vector File. Now when the Jump Element Loop instruction is not taken, as shown in FIG. 24, it is very much like the adjust CELP where we start with an E field 1029 from the control word. This field goes into the Current Element Pointer 1030 (CELP) which addresses the Vector File. The data in the file is finally loaded into the MEC register 1027 and the ELPT register 1028.

Figure 25:
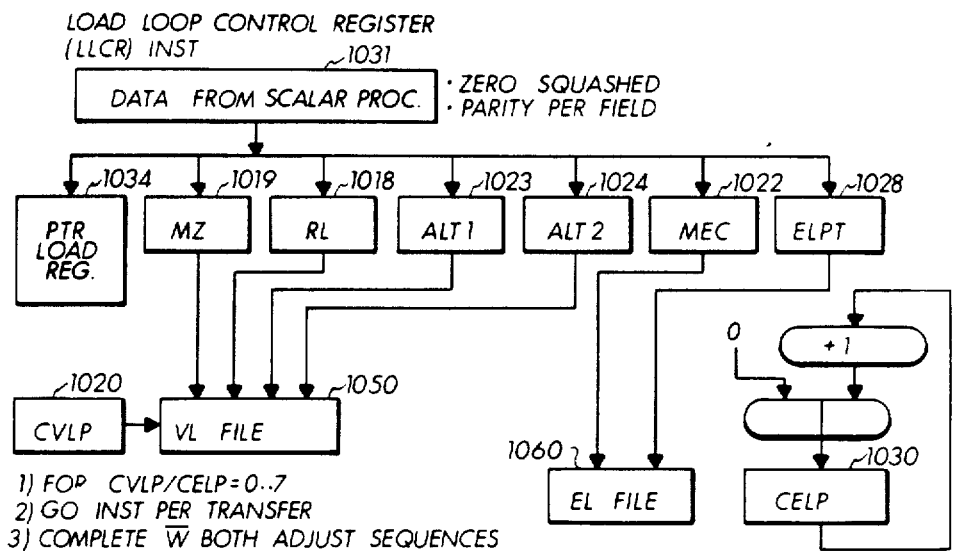
FIG. 25 is a block diagram showing the register path taken by a Load Loop Control (LLCR) instruction.

The next instruction to be considered is the Load Loop Control Register (LLCR) instruction shown in FIG. 25. As previously mentioned, all of the data that ever comes to Loop Control comes from the Scalar Processor. As shown in FIG. 25 the data enters from the Scalar Processor via 1031. While the double word is 72 bits wide as far as a programmer is concerned, in order to save a few pins on cards it was decided to narrow the 0 zone of the word and only send approximately 62 bits. So the 0's are narrowed down to this data transfer from the Scalar Processor to the Loop Control.

Figure 26:
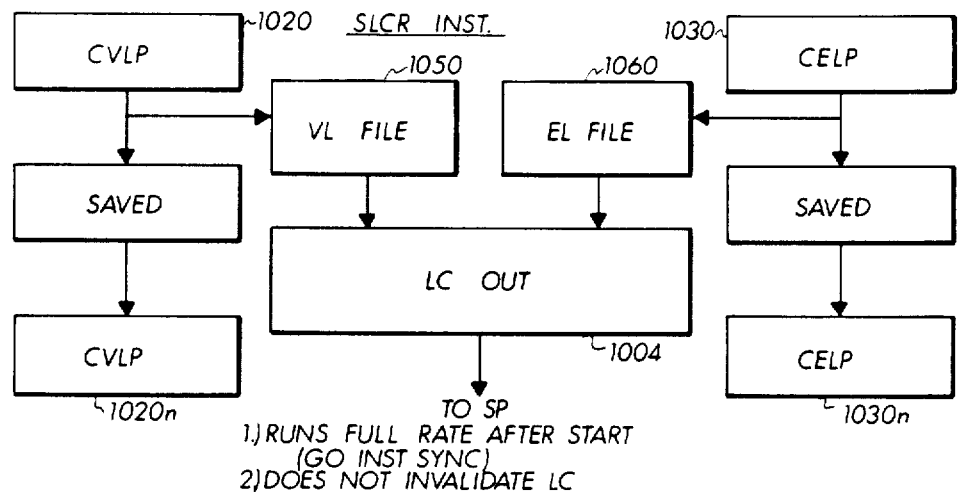
FIG. 26 is a block diagram showing the register path taken by a Store Loop Control (SLCR) instruction.

As shown in FIG. 25, the new CVLP 1020 and CELP 1030 that is loaded and passed into the pointer load register 1034. The MZ field out of this double word comes through the RL field. The RL field comes into the active RL register 1018 and also for the ALT 1 field 1023, the ALT 2 field 1024, the MEC field 1027 and the ELPT field 1028. They are all read in from the Scalar Processor interface to the active registers. Now from the active registers, the information is written into the files as shown. The MZ, RL, ALT 1 and ALT 2 are defined to be part of the VL file 1050 and they go into the VL file address under the control of the CVLP 1020. As ,this loading is going on, these pointers are initially cleared to 0 and are incremented by 1 as the data is loaded into the selective entries of the EL file 1060 and the Vector Loop file. The Save Loop Control Register (SLCR) instructions is shown in FIG. 26 and is a continuation of the LLCR instruction shown in FIG. 25.

Figure 27:
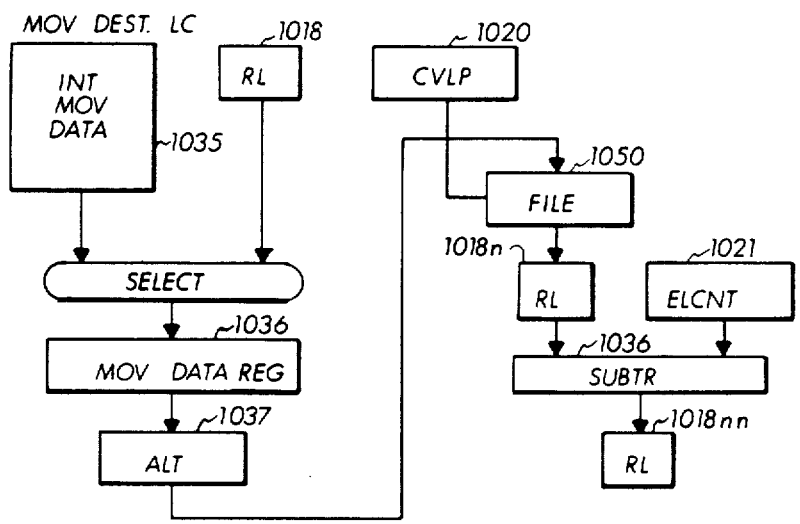
FIG. 27 is a block diagram showing the register path taken when the destination of a Loop Control is moved.
Figure 28:
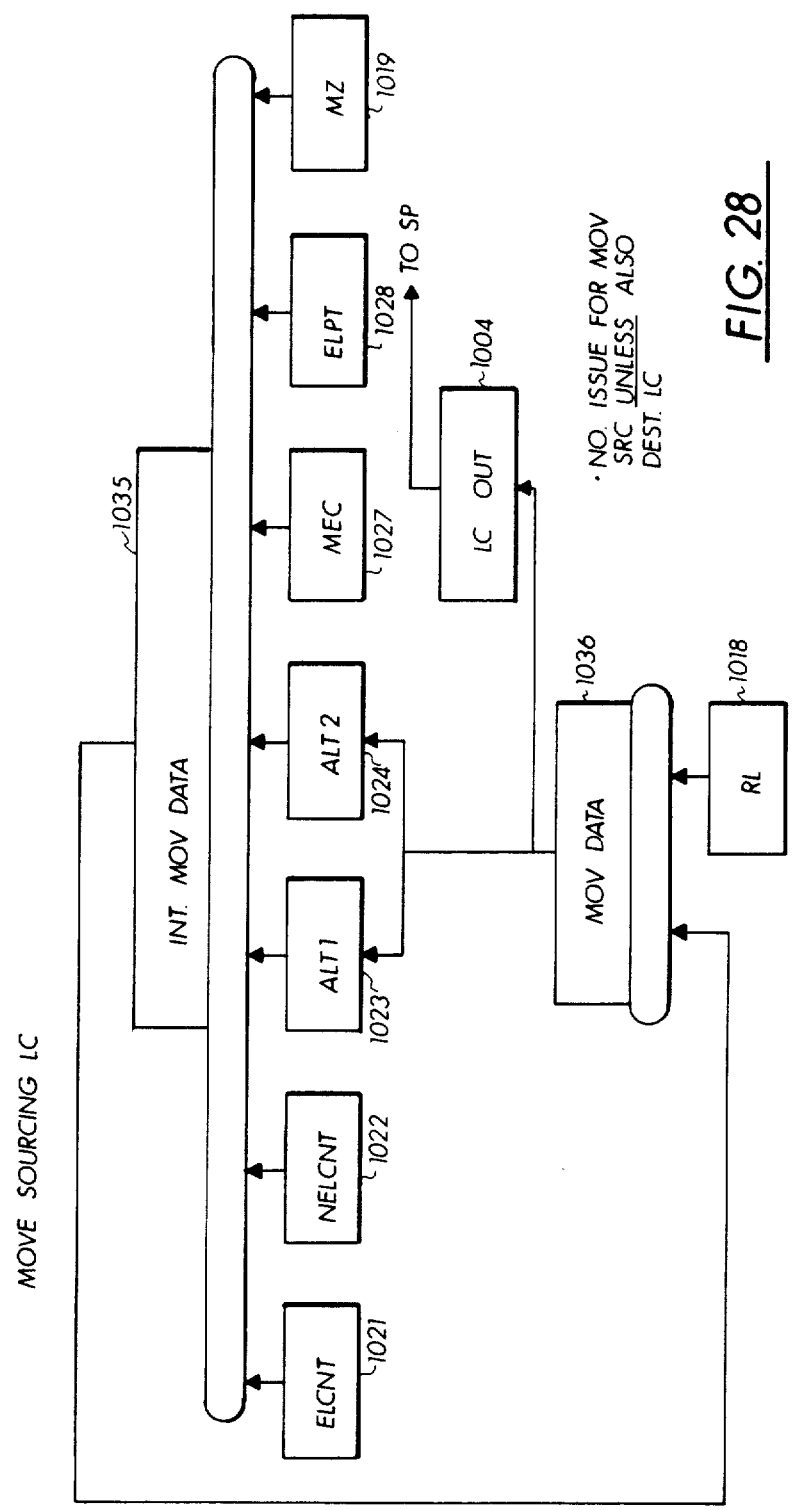
FIG. 28 is a block diagram showing the register path taken when the source of a Loop Control is moved.

The next instruction to be discussed is shown in FIG. 27. It illustrates a Move operation which is done where the destination of the Move is in the Loop Control section. The Move destination Loop Control section can have its data entered either internally or externally. External data from the outside world always enters from the Scalar Processor via the remaining length (RL) registers. On an internal loop control move, if the Move destinates the Loop Control section the move data enters through the internal move data register 1035. The input selection is made and it goes into the move data register 1036. So no matter where the data originates, it eventually enters the move data register and from there goes to an active ALT register 1037. The only things that you can move to in Loop Control operations are the ALT 1 and ALT 2 fields. This sequence showing the source of the Move operation is illustrated in FIG. 28.

Now after the move has progressed far enough so that it has stored the data into the appropriate ALT register 1037, the CVLP 1020 is used to address the file 1050. The data is then written into the Vector Loop file at the address location under the appropriate ELCNT 1021 entry. The CVLP 1021 is used to address the file 1050 and since all instructions in Loop Control terminate by comparing for a JVL instruction and having their remaining length presubtracted from the JVL instruction, it is necessary to presubtract the ELCNT 1021 and return it into the remaining length registers 1018.

The next Loop Control operation is the sychronization of the LC section with the Instruction Flow Control section. The Instruction Flow (IF) sychronization breaks down into 3 parts. The first part is to determine the time when the lengths and pointers are available for use. Remember the earlier discussion about the issue pipeline, wherein a vector instruction came up for execution but the required length was not available which prevented its issue for any various reasons. To achieve synchronization, they must communicate this fact to one another. A second part is to determine when the Loop Control section is busy. Unlike most of the other sections of the machine, the Loop Control section is not a pipeline. The Loop Control section does one instruction at a time. Loop Control instructions move through the IF completely pipelined, but as the move from the F1 register 1012 enters the Loop Control section, the instruction is executed by itself, and so while the Loop Control control logic can control the rest of the machine, doing anything that it wants to, it can only handle a single instruction at a time.

Instruction Flow Control keeps track of the resources required over each instruction before that instruction can issue. First, however, each vector instruction requires a valid length. Now if a vector instruction comes up and the length is not valid, the instruction will be held in the VFO register 1010 as was previously discussed. The IF must know when the length of that instruction again becomes valid so that the instruction can issue and move out of VFO 1010 and be executed in the Vector Control section. To do this the instructions move through the instruction issue pipeline by having the IF clear a flipflop for a particular resource when the ELCNT 1021 validates the length. However, it is the responsibility of the LC to set up again when the length becomes valid.

Figure 29:
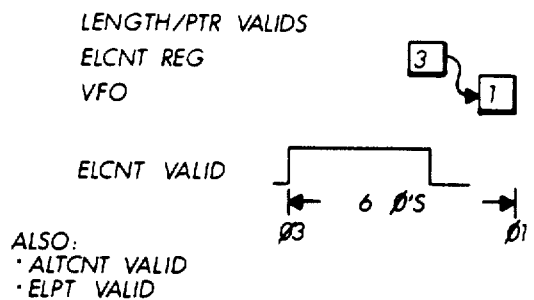
FIG. 29 is a simplified timing diagram showing the relative positions of the length and pointer valid bits.

For example, as shown in the timing diagram of FIG. 29, assume that we are calculating in the ELCNT register 1021. The ELCNT register 1021 is going to be resolved on a phase 3 and again there will be a valid length in it. The earliest that the VFO 1010 could issue this instruction is 2 phases later, at phase 1. There is a signal from the Loop Control section to the Instruction Flow Control section called the IFC/LC count valid signal. The ELCNT valid signal is a one cycle pulse which precedes by 6 phases the earliest possible use of the ELCNT signal itself.

After the data for the Build Vector Loop arrives at the Loop Control section and enters the register that it requires to calculate the ELCNT, the ELCNT valid pulse should drop to a low condition. It should have been up for a cycle before the ELCNT register contents were interpreted. Two phases later the VP issue signal will go to a high condition and this instruction will move across from the Instruction Flow Control section to the Vector Control section. There are 3 basic valid pulses from the Loop Control section. First, is the ELCNT valid signal which controls the element count (ELCNT) and the next element count (NELCNT).

Second is the ALT count valid signal which is used to indicate that an ALT register has just been made valid. Finally, there is the element point (ELPT) valid signal which is used to indicate that the element pointer has just been made valid. There are two ALT registers which operate together on a valid signal and two ELCNT registers which taken together produce a valid signal. This means that if the element count is invalid and you have a vector instruction that wants to use an ALT count as a length it may issue one even though the one requiring an element count or a next element count may not do so. Of course the same holds true the other way around. The element pointer valid controls the element pointer and has the same timing relationship, except that it applies to the ELPT register.

The Instruction Flow Control uses the condition of having any valid designators which produce a low signal to imply that Loop Control is busy. This means that the Loop Control section still has not finished its earlier calculation and is therefore busy and will not take another instruction.

Figure 30:
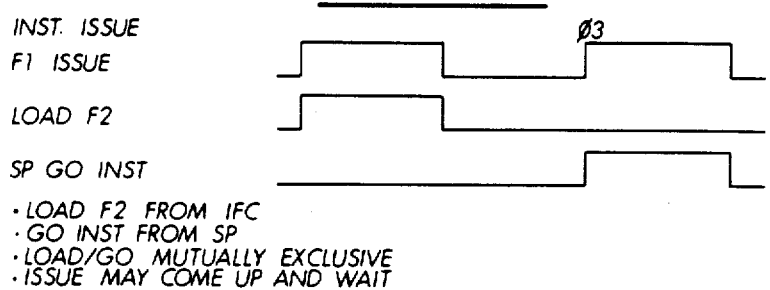
FIG. 30 is another timing diagram showing the pulses present and their relative positions during the issuance of an instruction.

Consider next, FIG. 30 which is another timing diagram illustrating the issuance of an instruction. There are a few ways that an instruction can issue and this holds true throughout the Scalar Processor. This discussion applies for any section that takes control words out of the F1 latch. In such an event there is going to be an F1 issue signal and there are also two other signals. One is the load F2 signal which comes from the IF, and the SP GO instruction, which comes from the Scalar Processor. These two signals arise as the instruction moves from the F1 register which you may remember is the last register in the Instruction Flow Control instruction issue pipeline. It then enters into F2 which most logic sections use as their first stage of instruction execution control. So the only way that an instruction may be issued is when there is an F1 issue and either a load F2 or a GO instruction. A load F2 signal and a GO instruction cannot arise at the same time, one or the other may issue the instruction; however, there is always an F1 issue signal. Basically these signals come from the Scalar Processor section. At the same time that there is an F1 issue signal to the Scalar Processor, there is also a load F2 signal. The GO instruction that the SP section provides moves the instruction out of the F2 register and along the SP instruction issue pipeline. Since IF section does not know when that will happen, the SP sends this instruction back to the IF and the IF takes that as a cue that whatever was in the F1 has just been issued. In a sense, the load F2 has been issued to start a stream of completely overlapped instructions. These instructions are going to be executed at a rate of one per cycle and they move through the instruction pipe at one per cycle. As this stream enters the Scalar Processor section and starts issuing, they are going to be continuously fed into the Scalar Processor section with the GO instruction. Since these are basic signals that are used to coordinate instructions issued from the F1 to the F2, all sections which take control words from the F1 must use the load F2 and the GO instruction as signals to issue their instructions. This does not apply just to the Scalar Processor even though that is their primary application. So the load F2 signal comes from the IFC GO instruction which, in turn, comes from the Scalar Processor. The load F2 and the GO instruction are mutually exclusive signals and either one may cause the issuance of the F1 signal.

Scalar Processor sychronization is only necessary for data transfers because the data interface to the Loop Control arrives entirely via the Scalar Processor so the sychronization with the Scalar Processor coordinates data transfers. Most of these transfers are initiated by augend valid signals. The load loop control and store loop control first start a GO instruction.

Figure 31:
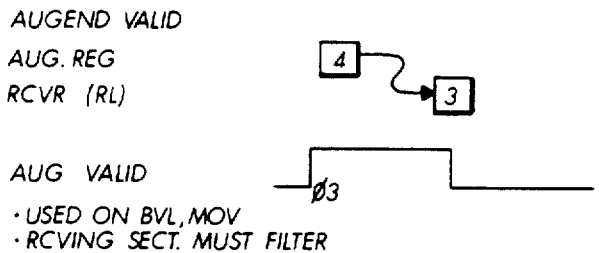
FIG. 31 is still another timing diagram showing the pulses present and their position during the validation of an augend.

Now the augend register in the Scalar Processor is a general purpose transmitter substantially coupled to almost any other section that requires data from it. Therefore the augend valid signal is a basic coordination signal throughout the Scalar Processor Module. As shown in the timing diagram of FIG. 31, the augend registers operate on a phase 4, one phase earlier the augend valid signal goes high so on a phase 3, just prior to augend register being made valid, the augend valid pulse will be elevated. Now, in most cases, the receiver latch is the remaining length register and a decision is made on the third phase ($\phi 3$) between the augend register and the receiver latch. This allows only one cycle to get the augend valid pulse from the Scalar Processor. During this period you must also enable your latches so that they are ready to receive the data. Generally, that is the timing that is repeatedly seen as a standard data transfer mechanism. Loop Control uses this data transfer coordination on the Build Vector Loop instruction. Remember that the original remaining lengths whether they were from the Local Store or the HPSU, are calculated in the Scalar Processor. After coming from a G register they will all pass through the Scalar Processor and end in the RL register by way of the augend register. Also any move data entering from the outside world must first be translated via the Scalar Processor and only then will it go to the Loop Control. So the Loop Control is coordinated and the augend is valid. Another point that should be made about the augend valid signal is that the receiving section must filter them. Augend valid signals comes up any time the Scalar Processor is sending something into the augend register. It is the responsibility of the section expecting to receive data from the augend registers to know when to look at the augend valid signal. If there are several move operations occurring in a row; for example, going to the Mask section, and one to the Loop Control section; the Mask and Loop Control sections have to be able to sort out which augend valid signal applies to the Mask and which augend valid applies to the Loop Control.

Figure 32:
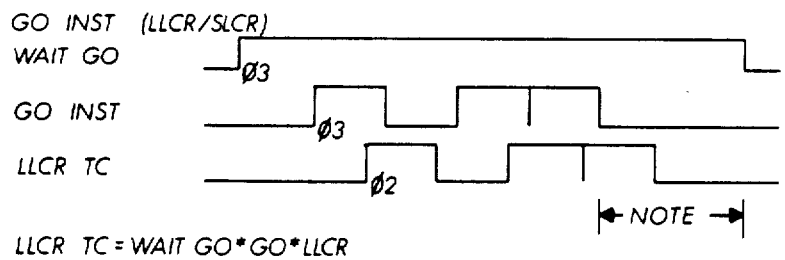
FIG. 32 is a further timing diagram showing the initiation of a GO instruction. This instruction occurs during a Load Loop Control (LLCR) or a Store Loop Control (SLCR)

The GO instruction, in conjunction for the LLCR and the SLCR instructions, are shown in FIG. 32. The augend GO instruction is also used to coordinate the load loop control and store loop control instructions. Now this is a somewhat non standard use of the GO instruction but it is used in the Loop Control for performance reasons. It operates in the following manner. When the Loop Control knows that it is going to make eight (8) double word transfers for a Loop Control operation, it brings up a condition called the wait/go instruction condition. This condition starts at phase 3 and,. stays active throughout the entire load loop control process. When the GO instruction comes up, there is a corresponding timing change in the Loop Control, called the load loop control timing change shown as the bottom timing diagram of FIG. 32. For each GO instruction a load loop control timing chain is seen following behind it. The presence of this load loop control timing chain means that you have just received a GO instruction from the Scalar Processor and there is a load loop control instruction in process.

In a natural load loop control you will see eight (8) GO instructions, in addition, to the one upon which the load loop control instruction might have been issued. Load loop control instructions may issue either on a load F2 or a GO instruction. However, it is always subsequent to that that there are eight (8) more GO instructions. The reason that this particular data transfer is coordinated on a GO instruction, and is not coordinated on an augend valid signal in Loop Control, is that the augend valid signal is not given enough time to provide all of the enable signals that are required in Loop Control.

To be more specific of the details within the Loop Control, the vector register length overflow interrupt and related topics will now be discussed.

First, consider what causes this interrupt and where it comes from in the instruction. The element count zero or the element count abort are related to this interrupt and cause similar things to happen, so these ideas will also be discussed. The effect that this interrupt has on the Vector Control section, on the Scalar operands in the machine, on the Mask Processor and on the Address Generation section, also will be reviewed in the general overview.

This interrupt is caused by an element count that is greater than the t bit for a particular vector. This means that either a single precision vector operation is being performed and the element count that is selected has a value greater than 64 or a double precision vector instruction is being done and the element count is greater than 32. A combination of these operations is also possible.

The second way that this interrupt may operate is where the element point is greater than the t bit would imply for an RR format operation. To explain, this will occur where an element pointer greater than 63 has been selected and a single precision arithmetic operation is being performed on a vector element. It will also occur if the element point is greater than 31 and a double precision arithmetic operation is being done on a vector element.

Another cause for the occurence of this interrupt is where a mask parameter (Mask PARM) has been selected and the element count is greater than 64. A still further cause is where a jump operation is being done on the mask and the element counts that are selected are greater than 64. Remember that all of the jumps that select the mask use an element count since they are treating it as a bit vector of the length element count. Note also that jumps on individual mask bits use the element pointer, if the element pointer selected is greater than sixty-three (63).

Consider next, the ELCNT ZERO/ELCNT ABORT instructions. The terms L count abort or L count overflow are used interchangably so the term L count abort is often used throughout the machine as a signal name. First of all, if the element count is 0 or if a Vector File length overflow is received the instruction is a no operation or no op. This instruction then has the same effect as doing nothing, since the pipelines of the Scientific Processor never run. Thus, if an add vector is selected with an element count of 0, the Add Pipe will never go and if you do an overflow or a vector move with an element count of 0 it will never run. Exactly the same thing is true for the Multiply Pipe. In this situation the instruction is aborted as it is issued.

As the instruction moves from the VFO out to the Vector Control that part of the instruction is thrown away and that is what is meant by the instruction being aborted as issued. So the instruction becomes a no op although it does take longer than doing a regular no op in the machine but it has the same effect and again if the length =0 it is handled just about like the overflow or the L count abort in the machine since they are both no ops.

Figure 33:
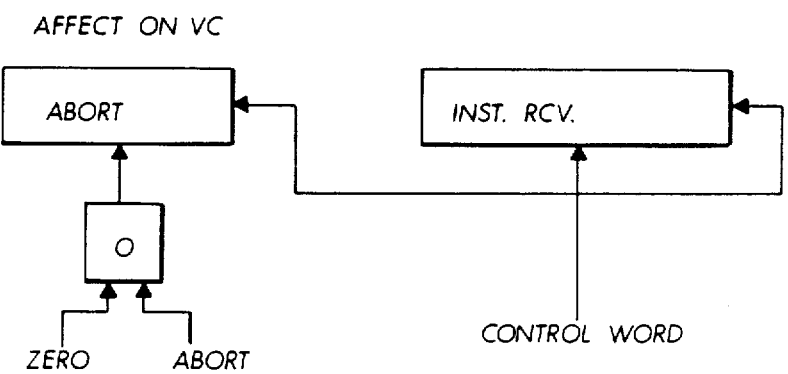
FIG. 33 is a simple block diagram illustrating the effect on the Vector Control (VC) of the receipt of the Control Word (CW), and the receipt of either a zero or an abort signal.

Next, consider the effect of the Loop Control on the Vector Control section as illustrated in FIG. 33. There, the instruction receive latch shown has the control word entering from the VFO. An abort designator is controlled in exactly the same as the instruction receive latch in Vector Control and has the same timing. The element count 0 and the element count abort lines generated in the Loop Control are generated essentially at the same time as the VFO. They are joined together in the OR gate to becomes an abort designator in the Vector Control. The Vector Control uses this to key the rest of the operations in the case of an element count 0 or an element count abort. Vector Control has to change the interpretation of the instruction received because it is necessary to go through the required operation to make the instruction into a no op instruction.

Now scalar operands and aborted instructions fall into three different categories. First of all, there are the broadcast G's as vector operands. Any vector operand in the Scientific Processor selects a G register to be replicated or broadcast to make up the Vector to be used as part of the Vector operation. In that case the G register that is coming across from the Scalar Processor section to the Scalar interface on the Vector Module has to be thrown away along with the instruction. Now since broadcast G vector instructions are coordinated at the data interface after the issue, it takes special logic to take in the G register operand in the Scalar control section when it gets there. Another instruction that is thrown into this category is the generate index vector instruction because the data that is being generated to fill the vector register and the generate index vector are generated by the Scalar Processor. The Scalar operands are also involved in this abort or element count 0 instruction.

In this case, it is an abort on the element pointer instruction because when there is a Scalar instruction referencing a Vector element for a Scalar move or Scalar arithmetic, the element pointer selects a particular V register element and goes through the Scalar interface section of the Scalar Module over to the Scalar Processor. Since the coordination is at the data interface this operand is thrown away along with the instruction. The third variety of Scalar operands involved here are the reduction operation results. It has a vector length of 0 on a reduction operation. This produces a single Scalar result which is sent over to the Scalar Processor to be stored in a J register. It also has to be handled in the case where there is an element count of 0 when the element count overflows.

Since the two instruction issue registers in the IF pipeline FO and VFO, are independent of these operations, the Vector operation can issue an instruction to the Vector register of the Vector Control section to start processing and also one to the Scalar Processor to read the G operand necessary for the Vector operation. The instructions can issue independently so the destruction of the contents of the G register happens at the data interface in the Scalar Control section at a later time. The Scalar Control section aborts this instruction for the Vector Module however, the Scalar Processor section and the Instruction Flow section are not at all effected by an element count of 0 or an element count overflow and they issue as if the element count was normal.

Now the generate index vector instruction is placed into this category by the test and loop control logic to see if the element count is 0 or if the element count is going to overflow. If the element count going to the Scalar Processor section is zero it is forced to be a one so that a single data transfer always occurs on the generate index vector even if the vector length would indicate the instruction should be a no op. This allows the Scalar Control section in the Vector Module to have a data operand to coordinate on and to execute the instruction completely.

If there is a Vector instruction which has a V register operand and a broadcast G register operand and it is attemtping to produce a Vector result there are a number of different machine paths possible; each of which will produce an abort operation. Now first of all the Instruction Flow section is going to wait for both the FO and VFO to be simultaneously available because this is a dual module instruction. When they are, the add vector will move into the VFO and an operation called a read G op to the Vector side will enter the FO in the Scalar Module. This will cause the G register, G1, which is used in the Vector side to be read out of the Scalar Processor and sent over to the Vector Module. The two pieces of the instruction become independent and can issue independently. The Add vector moves across from the Vector Module as soon as the L count is ready and it can start the abort sequencing at that point. A following Vector instruction can then move through NI and FO and this later allows bit coordination to happen at the Scalar interface. This add vector maybe returned to the VFO, but the Scalar Processor is free to run and this allows a completely overlapped operation. If there are other completely overlapped Scalar operations occuring it can move into the F1 and the F2 register of the Scalar Processor, since the G operand can be read and sent over to the Scalar Control section before this add vector has actually been issued to the Vector Module.

When an element pointer is used to select the Vector operation, the operand FO and VFO are tied together. This means that the abort is made easier to handle because since the FO and VFO are tied together, the Instruction Flow Control can handle all of the necessary processing and control needed to abort the instruction. The abort happens for the Scalar Module as the instruction is moving from the FO into the F1 latch and it happens again for the Vector Module as the instruction is moving from the VFO into the instruction receive latch. Because of the way that reduction instructions are handled in the Scientific Processor, the reduction instruction case can be placed into the same case as the selection of an element of the Vector register using the element pointer. This allows the same sort of control to apply.

The next thing to be described is the effect of aborted instructions upon the Mask Processor. Its first effect is to block the issuance of the regular Mask (MK) vector. The Mask Processor gets a copy of the instructions, the Vector issues and a pipe selects a pipeline interface to feed the mask bits. The Mask Processor then shuts down its pipeline interface. It also causes an instruction aborted condition to come up, if appropriate, or a compare aborted instruction designator to be initiated in the Mask Processor because the Mask Processor has special handling to do if there is the instruction issued to the vector compare. As required, the Mask Processor will insert a mask valid signal to be returned to the Instruction Flow Control. For instance, if it was a compare operation that was being performed, a new mask signal is generated, and as previously noted, the pipelines will not run during an aborted instruction. Since it is never running, a pipe complete signal is never sent. This necessitates the sending of a mask valid signal which would normally come at the completion of a Vector compare. This, in turn, requires a long-winded logical sequence of a no op instruction wherein all of the calculations of the necessary parameters of the Mask Processor are redone to handle an abort case. So four signals: (1) the mask valid, (2) the state valid, (3) the compare complete and (4) the clear mask busy are used to coordinate the Mask Processor and the Instruction Flow Control section. They must be phased in, where a Vector instruction which references the Mask is being thrown away.

An aborted instruction also has an effect on Address Generation. The abort or element count 0 takes effect after the Address Generation has completed a translation process but before the Address Generation section makes a request to memory. A Vector Load operation requires a base register containing the data from a G register in the Scalar Processor. The Address Generation section first takes that G register which contains a virtual address and translates it into a read only memory address. That is one way to speed up the throughput of the machine. If the element count is not available at the time that the load vector is issued, the Address Generation section will still start performing the translation process. So at least that part may be done before the element count is ready and this allows the start of memory requests. At the time that it is ready to make requests, it checks the element count and if the element count is 0, or the element count is in an overflow condition, the instruction is thrown away at this point in Address Generation. However, if the element count is a reasonable size, then the AG goes on to make many requests to the memory section.

In all cases that have been described, the Loop Control sends separate abort and 0 signals off to the Vector Control section and the Instruction Flow section and it sends those two signals OR'ed together to the Mask Processor and to the Address Generation section. The Scalar Processor has some special handling done to its element count for the generate index vector as previously mentioned. This interrupt signal originates in Loop Control and these signals are brought up and then propagated throughout the rest of the Scientific Processor, shutting down sequences in various parts of the machine just as they are getting started in most cases.

A Vector abort interrupt occurs when there is an element count that is too large for the associated t bit of the instruction and an order for Vector Processor Module issue is made or the Scalar abort signal is present.

This means that something is being done to a move or conditional jump instruction that is being issued. The abort signal that is sent to the Instruction Flow Control section causes a state in the Instruction Flow called hold for interrupt. The hold for interrupt logic causes the IF to stop issuing instructions as soon as possible because it is known that an interrupt is arriving even though it has not passed all of the way through the Control Block section. As previously stated the instruction that is currently in the next instruction latch of the Instruction Flow Control at the time the hold interrupt is initiated will not issue. The Instruction Flow Control will then wait for the interrupt signal from the Control Block section to be activated. This causes the IF section to wait for the entire machine to return to normal operation. Any time that an interrupt pulse arrives from the Control Block section to the Instruction Flow Control, there is an interrupt process. The Instruction Flow Control section waits for the entire Scientific Processor to return to normal and then tells the Control Block Section to proceed with whatever interrupt handling that happens to be necessary. This concludes the description of the Vector File length overflow and the abort interrupt signals that cause them.

Loop control also participates in acceleration and deceleration of the Scientific Processor. It has a shadow copy of all of the files which are selected for most loop control instructions during both acceleration and deceleration. This allows the acceleration and deceleration code which is contained in the Control Block section and that is more fully explained in the Control Block description given in a co-pending application Ser. No. 761,201 assigned to the present assignee. As to the Loop Control the acceleration and deceleration codes each store a constant therein. For example, the acceleration code loads the vector registers from the activity Control Block by doing Vector Loads under the acceleration load, so the constant lengths of 64 can be stored in the Loop Control section and used for these Vector Load instructions of the acceleration code. Also there are lengths which are kept in the Register Save Area (RSA) which the acceleration code must calculate. For instance, the Local Store area of the Scientific Processor, which can be up to 4K but need not be, has its lengths stored in a Register Save Area and only the amount of Local Store that is being used is actually accelerated from the Register Save Area and the instruction which accelerates the Local Store are very much like Vector Load instructions except that they have a different destination. Instead of destinating in a vector register, the destination is to be the Local Store area of a RAM which is in the Scientific Processor. Loop Control is consequently a normal operation during acceleration with two minor exceptions. First of all, for most Loop Control instructions, the shadow area of the loop control files is selected. Secondly, the JVL instruction in acceleration load does not update the copied file of the remaining lengths. So, if you go into a BVL/JVL loop in acceleration code, only the active copy of the remaining length which is kept in a register external to the file is going to be updated by the subtraction that goes on in the JVL instruction. To accelerate the Local Store, the BVL operation uses the calculated length of the Local Store. It brings that into the shadow area of Loop Control file and also into the active remaining length register. The acceleration of Local Store instructions is done under the control of a jump Vector Loop instruction. This is an acceleration load which does not write back into the file but continues decrementing the active remaining length register. For deceleration, an adjust loop control instruction is used to read the length which was stored in the file by the BVL, but not modified by the JVL, to start the same sequence again and decelerate the Local Store segment.

Figure 34:
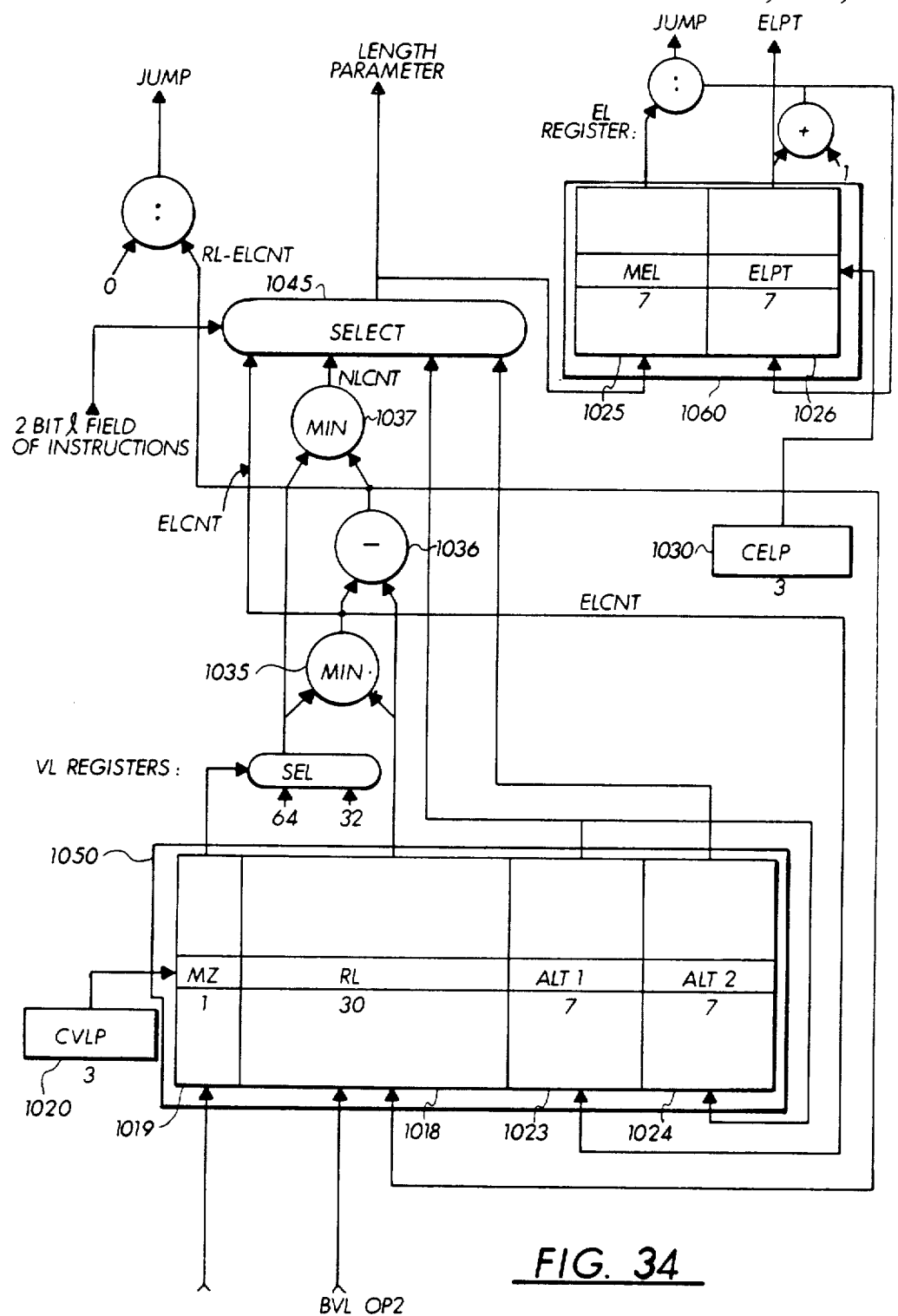
FIG. 34 is a detailed logic diagram of the overall loop control logic used in the simplified block diagram of FIG. 12.

Refer finally to FIG. 34 which shows a detailed logic diagram of the overall loop control circuit. There are three kinds of loop control registers implemented within the processor hardware. There are eight 45-bit Vector Loop (VL) registers 1050 and eight 14-bit Element Loop (EL) registers 1060. There are also two three-bit pointers called Current Vector Loop Pointer (CVLP) 1020 and Current Element Loop Pointer (CELP) 1030. The CVLP 1020 always identifies one of the eight VL registers 1050 as providing the current vector loop parameters. Similarly, the value in CELP selects one of the eight EL registers 1060 for controlling element loops. Each of these registers will not, be described.

VL Registers 1050

Each of the eight VL registers can be used to hold parameters defining the iteration of a loop over strips of a vector. Each register consists of four distinct fields, which are:

| Number of Bits | Name of Field and Description |
| --- | --- |
| 1 | Maximum size (MZ) 1019. If MZ is zero, then up to 64 elements perstrip may be processed. If MZ contains one, then either single- or double- word operands may be processed, and then it limits the values of ELCNT and NELCNT (defined below) to 32. The value of MZ is declared upon entry into loop. |
| 30 | Remaining length (RL) 1018. The unsigned integer number of elements remaining to be processed by this loop. This is initialized to the starting vector length (or DO-loop count) and is decremented by the strip size processed on each pass. Note that given RL and MZ and the number of words in a vector register, the number of elements to be processed on a particular pass through the loop is completely determined. Called ELCNT, it is heavily used throughout the machine, though it does not have a separate field in the VL register. Similarly, the number of elements to be processed on the next subsequent pass is also available and is called NELCNT. Algebraically ELCNT=MIN (RL.64−32*MZ) and NELCNT=MIN (RL−}ELCNT,64−32*MZ). |
| 7 | First alternate element count (ALT1) 1023. Can be used instead of ELCNT or NELCNT by certain vector instructions. A program may calculate a value and place it into this field. The value is not affected by MZ, and its validity is evaluated only when used by execution of an instruction. |
| 7 | Second alternate element count (ALT2) 1024. Similar to ALT1. |

EL Registers 1030

Each of the eight EL registers 1030 can be used to hold parameters defining the iteration over elements of a strip. Each EL register has two fields, which are:

| Number of Bits | Name of Field and Description |
|---|---|
| 7 | Maximum element count (MEC) 1025. This field is initialized upon entry into the element loop. Values 0-64 are possible. |
| 7 | Element pointer (ELPT) 1026. This value is used as the index for iterating on elements within a strip. An instruction (JEL) is provided that is executed after each pass through an element loop, which increments ELPT by one, testing it against the MEC value. ELPT is used by scaler instructions for indexing into vector registers. |

L Register mapping

The contents of the VL 1050 and EL registers 1060 are manipulated only by certain control instructions. Therefore it is unnecessary to define internal formats for these registers, other than to indicate the number of bits of information per field. However when this information is placed into main storage, its format must be defined. These registers can be stored by means of an instruction specifically for that purpose and also upon activity deceleration when they are stored in the Register Save Area. The format used is the same in both cases. Note that the CVLP 1020 and CELP 1030 values are always stored and loaded along with the VL 1050 and EL register 1060 contents.

When placed into storage, VL register zero and EL register zero share the first double word; VL register one and EL register one share the next double word, and so on. The format of each double word is:

| Word | Bits | Contents |
|---|---|---|
| Even | 0-2 | Not used (except first two double words-see below) |
| Even | 3 | Not used |
| Even | 4 | Maximum size (MZ) from V |
| Even | 5 | Not used |
| Even | 6-35 | Remaining length (RL) from VL |
| Odd | 0-1 | Not used |
| Odd | 2-8 | First alternate (ALT1) from VL |
| Odd | 9-10 | Not used |
| Odd | 11-17 | Second alternate (ALT2) from VL |
| Odd | 18-19 | Not used |
| Odd | 20-26 | Maximum element count (MEC) from EL |
| Odd | 27-28 | Not used |
| Odd | 29-35 | Element pointer (ELPT) from EL |

Bits not used are written as zeros on stores and ignored on loads, with the following exceptions: bits 0-2 of the first even word are used for CVLP, and bits 0-2 of the second even word are used for CELP.

Loop Control Register Use

The purpose of the Loop Control Registers is, as their name implies, the efficient control of the parameters involved in executing program loops. As mentioned above, each source language DO loop can be implemented as a pair of nested loops, with the inner loop being limited to some maximum size, namely the strip size. This is illustrated by the following example:

```
C           EXAMPLE ONE
C           SINGLE LOOP STANDARD FORTRAN FORM
            DO 10 I = 1,N
10          A(I) = B(I)
C                                    EQUIVALENT DUAL LOOP
EXPANDED FORM
            DO 11 II = 1,N,64
            DO 10 I = II, MIN (II+63,N)
10          A (I) = B (I)
11          CONTINUE
```

The inner loop of a pair is called the element loop; the outer loop is called the vector loop. The Build Vector Loop (BVL) and the Jump to Vector Loop (JVL) are used to begin and end a vector loop, respectively. The Build Element Loop (BEL) and Jump to Element Loop (JEL) begin and end an element loop.

Notice that in most cases, such as the above example, the innermost BEL and JEL are not need because vector instructions themselves implicitly operate on all elements of a strip. However, the BEL and JEL are required for loops other than the innermost, as shown by the following example.

```
C           EXAMPLE TWO
C           STANDARD FORTRAN FORM
            DO 20 J = 1,M
            DO 10 I = 1,N
10          A (I,J) = B (J)
20          CONTINUE
C           EQUIVALENT EXPANDED FORM
            DO 21 JJ = 1,M,64
            DO 20 J = JJ,MIN(JJ+63,M)
            DO 11 II = 1,N,64
            DO 10, I = II,MIN(II+63,N)
10          A (I,J) = B (J)
11          CONTINUE
20          CONTINUE
21          CONTINUE
```

In this case B is treated as a vector by the outer DO loop, but each element of B becomes a broadcast scalar with respect to the inner DO loop. B can be loaded a strip at a time by a vector load instruction coded at the level of the outer vector loop. The outer element loop then establishes a pointer (ELPT) that sequences through successive elements o B, and for each one executes the inner vector loop. The form of the SVP assembly coding to execute the second example is as follows:

```
1:                  L    G0,ADCON(A)    LOAD ADDRESS OF A
2:                  L    G1,ADCON (B)   LOAD ADDRESS OF B
3:                  BVL  L4,M           BUILD JJ-VECTOR
                                        LOOP
4:  JJVECTOR        LV   V1,G1          LOAD STRIP OF B
5:                  BEL  L4,SKIP        BUILD J-ELEMENT
                                        LOOP
6:  JELEMENT        LR   G3,G0          START BASE REGISTER
                                        FOR A
7:                  LR   G2,V1          GET AN ELEMENT OF B
8:                  BVL  L5,N           BUILD II-VECTOR
                                        LOOP
9:  IIVECTOR        MV   G2,V2          BROADCAST B(J)
```

-continued

| | | | |
|---|---|---|---|
| 10: | SV | V2,G3 | STORE STRIP OF A |
| 11: | A | G3,(64) | UPDATE ADDRESS TO NEXT STRIP |
| 12: | JVL | L4,IIVECTOR | CLOSE INNER VECTOR LOOP |
| 13: | A | G0,N | UPDATE TO NEXT COLUMN OF A |
| 14: SKIP | JEL | L0,JELEMENT | CLOSE OUTER ELEMENT LOOP |
| 15: | A | G1,(64) | UPDATE TO NEXT STRIP OF B |
| 16: | JVL | L0,JJVECTOR | CLOSE OUTER VECTOR LOOP |

Admittedly, optimization of this code is possible. Nonetheless it illustrates the basic use of the VL and EL registers and their instructions. The first BVL (line 3 of the above example)sets up a vector loop of length M, and selects VL register 4 to hold the loop parameters. Of particular interest is the number of elements to be processed per strip by succeeding vector operations. This number (the current ELCNT value) is used by the LV and BEL instructions (lines 4 and 5).

The BVL at line 8 establishes a new (inner) vector loop of length N and sets up parameters for the vector instructions between it and its JVL (line 12). When that JVL exits to line 13, the inner vector loop defined by VL register 5 is complete and the JVL reestablishes VL register 4 as the current vector loop definition. The mechanism involved in this is the 3-bit Current Vector Loop Pointer (CVLP) 1020, which always points to one of the eight VL registers 1050, and defines it as current information.

The handling of element loops is entirely analogous. A 3-bit Current Element Loop Pointer (CELP) 1030 always selects one of the eight EL registers 1030 as current and is managed by the BEL ad JEL instructions.

An element loop is analogous, in a way, to a single vector instruction. In this example the element loop iterates through the elements of B obtained on that strip, the number of which is given by the outer ELCNT, just as is the LV length. In principle, things that occur in vector loops are vector instructions and element loops; things that occur in element loops are scalar instructions and vector loops.

Note that the values on JEL and JVL do not correspond to their matched BEL and BVL, but indicate values for the next outer loop.

Loop Interchanging

It can be seen that in the standard FORTRAN form of the second example the relative positions of the two DO statements could be exchanged (swapping the statement labels correspondingly) without altering the net numeric effect of the code. This would specify processing A by rows instead of by columns. Although the numeric results would be the same, the maximum processing speed would be less. The reason for this is that the B vector would have to be read N times instead of once. Thus it can be seen that the ability to interchange the nesting sequence of program loops can yield speed optimization in some cases. Of course it may not always be numerically possible, nor is there necessarily a significant speed differential, depending on the particular code.

Interchanging of loops in the expanded form is also possible though there are more possibilities. In addition to the ordering shown above in Example 2 (21,20,11,10), there are five other possibilities: (21,11,20,10), (21,11,10,20), (11,10,21,20), (11,21,10,20) and (11,21,20,10). Some interchanges are prohibited. Specifically loop 20 must be within loop 21, and loop 10 must be within loop 11. In other words an element loop must always be within its corresponding vector loop.

Stripwise Access

Most often arrays are processed one vector (row or column) at a time, with that vector broken down into a series of strips. However, sometimes it becomes expedient to process an array by handling the first strip of each vector followed by the next strip of each vector, etc. This method of access is called stripwise access as opposed to vectorwise access. In performing matrix multiplication the number of storage accesses can be substantially reduced using stripwise access for one of the source arrays.

As can be seen, the primary difference is in how the vector address is updated for the next execution of each vector load or store instruction. For vectorwise access, the next strip will begin one stride beyond where the last element of the current strip was obtained. For stripwise access, the next strip will begin at the same relative position the current one started but transposed laterally to a different column or plane.

Stripwise access can be illustrated by the (21,11,10,20) permutation of the loops in the second FORTRAN example above. The Expanded FORTRAN would then read:

| C | EXPANDED FORTRAN |
|---|---|
| | DO 21 JJ = 1,M,64 |
| | DO 11 II = 1,N,64 |
| | DO 10 I = II,MIN(II+63,N) |
| | DO 20 J = JJ,MIN(JJ+63,M) |
| 20 | A(I,J) = B(J) |
| 10 | CONTINUE |
| 11 | CONTINUE |
| 21 | CONTINUE |

Loop Control Register Operation

The above discussion and examples should provide at least a fair understanding of the construction and operation of the Loop Control Register. The following generalizations and principles can now be appreciated.

There are eight VL and eight EL registers, used for vector loop and element loop parameters respectively. Though functionally independent, corresponding VL and EL registers are mapped together and generally used together. There are two 3-bit pointers called Current Vector Loop Pointer (CVLP) 1020 and Current Element Loop Pointer (CELP) 1030 that form part of machine state. The CVLP always identifies one of the eight VL registers as the current vector loop definition. This definition supplies four values (ELCNT, NELCNT, ALT1, ALT2) which are available to all vector instructions for use as strip lengths. The 2-bit 1 field of the instruction selects one of these four.

Execution of a Build Vector Loop (BVL) instruction sets CVLP to a new value specified in the instruction and establishes the loop parameters in the select VL register. The corresponding Jump to Vector Loop (JVL) instruction modifies these parameters for each new pass until the full length is completed. It then exits from the loop, and in so doing sets CVLP to the new value specified in the JVL. For correct nested operation, this new value should be the value that CVLP had prior to the corresponding BVL. Compiling this correct value is trivial in all cases except the last one just prior to a subroutine return. That case is resolved by the reasonable convention that saves and restores the entire L register contents at all subroutine boundaries. This is conveniently handled by the SLR and LLR instructions.

The use and handling of CELP and the EL registers is analogous, and similar statements apply. The CELP selects an EL register; the ELPT field value of which is used by scalar instructions to pick one of the elements of a vector register.

It should be noted that the loop control registers and instructions have been defined such that zero is a valid loop count value. A zero value for either a vector loop or an element loop will generally cause the enclosed operations to be executed zero times. This is not strictly true, since reductions and scalar operations in a vector loop are still executed.

In view of the foregoing description and discussion of the invention and a preferred embodiment, it can be seen that the various stated objectives and purposes of the invention have been achieve. It is of course understood that various changes in logical circuit arrangement, circuit selection, and functionality will become apparent to those skilled in the art after having considered the teaching, without departing from the spirit and scope of the invention. Accordingly, what is intended to be protected by Letters Patent is set forth in the claims.

We claim:

1. In a vector oriented scientific data processing system, a control mechanism for controlling program loops comprising:
   a first plurality of registers for storing a plurality of vector loop parameters;
   a current vector loop pointer register coupled to said first plurality of registers to select one of the first plurality of registers to provide current vector loop parameters;
   a second plurality of registers for storing a plurality of element loop parameters;
   a current element loop pointer register coupled to said second plurality of registers to select one of the second plurality or registers to provide current element loop parameters;
   a loop manipulation means having an input and an output means, coupled via its input means to the selected register of said first plurality of registers and by its output means to the selected register of said second plurality of registers, said loop manipulation means to provide at its output means an output signal indicative of the length of the loop stored in the selected register of said first plurality of registers; and
   said selected register of said second plurality of registers to provide an output signal indicative of a selected element in said length of the loop stored in the selected register of said second plurality of registers to provide a system for efficiently precomputing loop lengths and thereby enhancing the speed of the vector oriented scientific data processing system.

2. The invention as set forth in claim 1 wherein said loop manipulation means includes a first and a second selection means, a first and a second minimum determining means and a subtracting means serially connected one to another whereby said first selection means selects the strip size of the vector loop.

3. The invention as set forth in claim 2 further comprising an equality means coupled to the serial interconnection means between said subtracting means and said second minimum determining means to provide a jump output signal when the subtracted signals equal zero.

4. The invention as set forth in claim 1 further comprising an incrementing means coupled to said second plurality of registers to provide an incremented element point parameter output signal.

5. In a vector oriented data processing system, a control mechanism for controlling program loops comprising:
   a plurality of vector loop registers for storing a plurality of vector loop parameters;
   a three-bit current vector loop pointer register coupled to said plurality of vector loop registers to select one of them;
   a plurality of element loop registers for storing a plurality of element loop parameters;
   a three-bit current element loop pointer register coupled to said plurality of element loop registers to select one of them;
   a loop manipulation means having an input and an output means coupled via its input means to the plurality of vector loop registers;
   said loop manipulation means coupled via its output means to said plurality of element loop registers, said loop manipulation means to provide at its output means an output signal indicative of the length of the program loop by a count of the total elements in the program loop; and
   the selected one of said plurality of element loop registers to provide as an output signal a number indicative of a particular one of the elements in the program loop length.

6. The invention as set forth in claim 5 further comprising an equality means coupled to the serial interconnection means between said subtracting means and said second minimum determining means to provide a jump output signal when the subtracted signals equal zero.

7. The invention as set forth in claim 5 further comprising an incrementing means coupled to said second plurality of registers to provide an incremented element point parameter output signal.

8. In a vector oriented data processing system, a control mechanism for controlling program loops comprising:
   a first plurality of vector loop registers for storing a plurality of vector loop parameters;
   a current vector loop pointer register coupled to said plurality of vector loop registers to select one of them;

a plurality of element loop registers for storing a plurality of element loop parameters;

a current element loop pointer register coupled to said plurality of element loop registers to select one of them;

a loop manipulation means having an input and an output means coupled via its input means to the plurality of vector loop registers and by its output means to said plurality of element loop registers;

said loop manipulation means including a first selection means coupled to said plurality of vector loop registers to provide element size information to said loop manipulation means.

9. The invention as set forth in claim 8 wherein said loop manipulation means further includes a first and a second minimum determining means, a subtracting means and a second selection means serially connected one to another and the serially connected combination is coupled between said first selection means and said plurality of element loop registers.

10. The invention as set forth in claim 9 further comprising an equality means coupled to the serial interconnection means between said subtracting means and said second minimum determining means to provide a jump output signal when the subtracted signals equal zero.

11. The invention as set forth in claim 8 further comprising an incrementing means coupled to said second plurality of registers to provide an incremented element point parameter output signal.

12. The invention as set forth in claim 11 further comprising means for providing a selection signal to said selection means to selectively determine a single output signal from four input signals.

13. In a vector oriented scientific data processing system, a control mechanism for controlling program loops occurring during operation of the system comprising:

a plurality of vector loop registers for storing vector loop parameters;

a current vector loop pointer register coupled to said plurality of vector loop registers to select one of them;

a plurality of element loop registers for storing element loop parameters;

a current element loop pointer register coupled to said plurality of element loop registers to select one of them;

a program loop manipulation means having an input means coupled to said plurality of vector loop registers and an output means coupled to said plurality of element loop registers;

said program loop manipulation means further comprising:

an element strip size selection means, a first minimum count determining means coupled to said element strip size selection means, a subtracting means coupled to said first minimum count determining means a second minimum count determining means coupled to said subtracting means and an element count selection means coupled to said first and second minimum count determining means;

a field of an instruction signal coupled to said element count selection means to select the signal to be coupled to the output of said loop manipulating means indicating a particular element in said program loop.

* * * * *